United States Patent

Nakamura et al.

[11] Patent Number: 5,986,984
[45] Date of Patent: Nov. 16, 1999

[54] OPTICAL INFORMATION PROCESSING DEVICE HAVING SWITCHABLE OPTICS FOR USE WITH PLURAL MEDIA TYPES

[75] Inventors: Keiji Nakamura; Masahisa Shinoda; Takeshi Utakouji; Norihiro Watanabe; Nobuo Takeshita; Hideaki Kobachi; Masaharu Ogawa; Eiji Yokoyama; Kouichi Komawaki; Kenjiro Kime, all of Tokyo, Japan

[73] Assignee: Mitsubishi Denki Kabushiki Kaisha, Tokyo, Japan

[21] Appl. No.: 08/596,876

[22] Filed: Feb. 9, 1996

[30] Foreign Application Priority Data

| Feb. 20, 1995 | [JP] | Japan | 7-030750 (P) |
| Jun. 13, 1995 | [JP] | Japan | 7-146515 (P) |
| Jun. 16, 1995 | [JP] | Japan | 7-150411 (P) |
| Dec. 8, 1995 | [JP] | Japan | 7-320534 (P) |

[51] Int. Cl.$^6$ .................................................. G11B 7/095
[52] U.S. Cl. .......................... 369/44.23; 369/54; 369/58; 369/112
[58] Field of Search .......................... 369/44.11, 44.23, 369/44.27, 44.14, 54, 58, 111, 112

[56] References Cited

U.S. PATENT DOCUMENTS 5,729,510  3/1998  Kasahara et al. .................... 369/44.14

FOREIGN PATENT DOCUMENTS

| 0228227 | 7/1987 | European Pat. Off. . |
| 0470807 | 2/1992 | European Pat. Off. . |
| 61-094246 | 5/1986 | Japan . |
| 6-90800 | 11/1994 | Japan . |
| 6-333255 | 12/1994 | Japan . |
| 7-98431 | 4/1995 | Japan . |

OTHER PUBLICATIONS

Patent Abstracts of Japan, vol. 18, No. 330, P1758, for JP6–76460, Jun. 22, 1994.
Patent Abstracts of Japan, vol. 11, No. 2, P532, for JP61–180935, Jan. 6, 1987.
Patent Abstracts of Japan, vol. 95, No. 2, for JP7–37259.
Patent Abstracts of Japan, vol. 17, No. 536, P1620, for JP5–144075, Sep. 27, 1993.

*Primary Examiner*—W. R. Young

[57] ABSTRACT

The reference character 5 denotes a supporting shaft holding base, which holds the lower end of a supporting shaft 103 coated with fluororesin with a small frictional coefficient. The reference characters 107a and 107b are tracking magnets bipolar-magnetized in the right and left direction, which are fixed to a fixing base 1 by bonding. The character 108 denotes a mirror for reflecting a light beam 2 incident from the front in the vertical upward direction. The character 6 denotes a lens holder formed of a plastic material, or the like, with light weight and high stiffness, which holds objective lenses 3 and 4 corresponding to a plurality of optical information recording media with different substrate thicknesses and different recording densities at positions eccentrically displaced by almost equal distances from the supporting shaft 103.

27 Claims, 53 Drawing Sheets

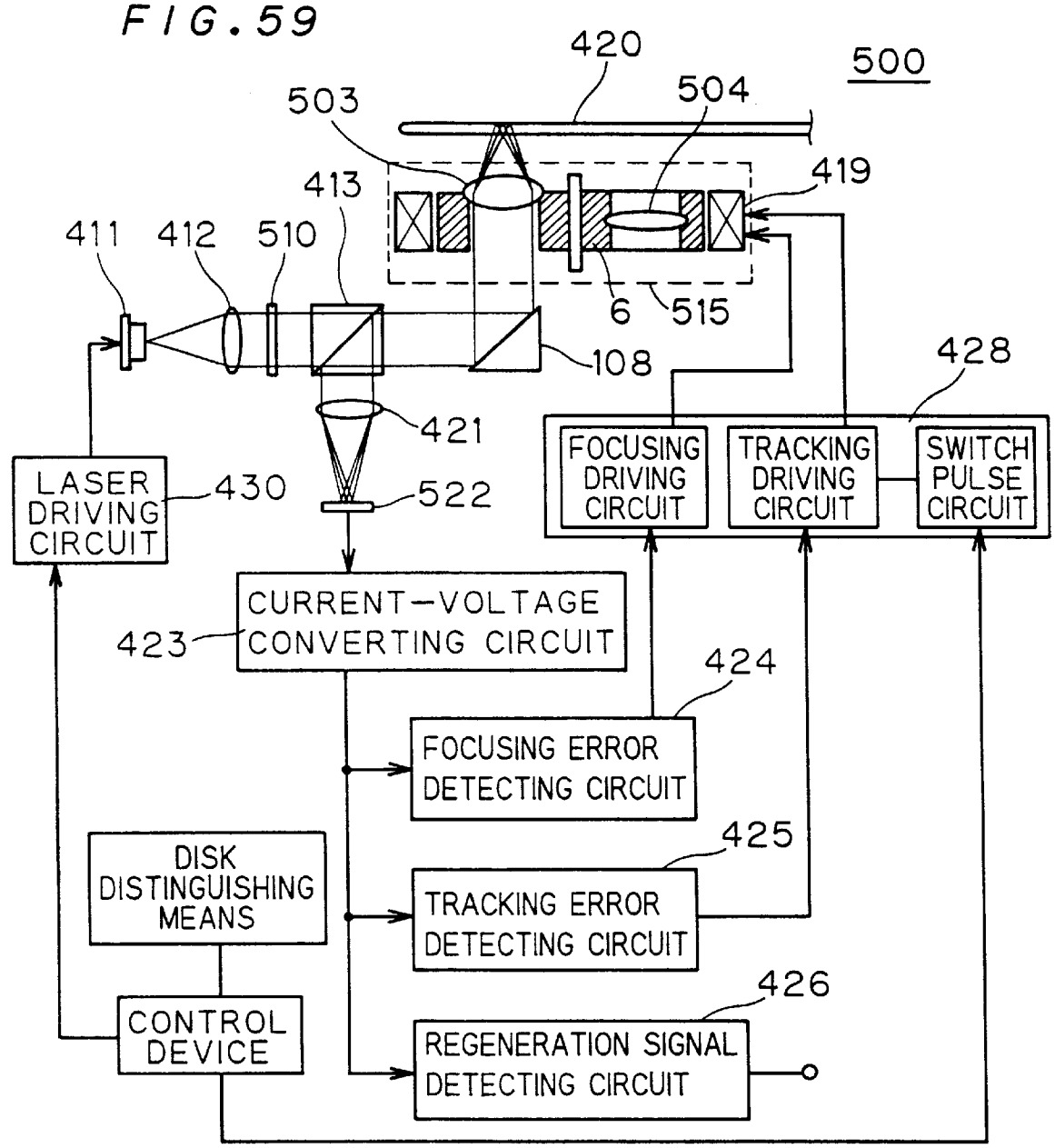

OPTICAL INFORMATION PROCESSING DEVICE HAVING SWITCHABLE OPTICS FOR USE WITH PLURAL MEDIA TYPES

BACKGROUND OF THE INVENTION

1. Field of the Invention

The present invention relates to objective lens driving devices and optical information recording/regenerating devices, and particularly to an objective lens driving device and an optical information recording/regenerating device for recording or regenerating information to a plurality of optical information recording media of different kinds with different substrate thicknesses, different recording sensitivities, etc. in a single optical information recording/regenerating device.

2. Description of the Background Art

Optical information recording/regenerating devices have widely spread which optically record and regenerate information using a laser beam such as a semiconductor laser beam, as a light source. In an optical information recording medium used in such a device, e.g., in a read-only compact disc, information is carved in the form of spiral unevenness at intervals of about 1.6 µm on a 1.2 mm thick polycarbonate substrate. The laser beam is applied onto the information surface through the 1.2 mm thick polycarbonate substrate to detect information as a change in intensity of reflected light.

Generally, it is common that the laser beam is applied through a transparent substrate by the optical information recording/regenerating devices as described above, but optical information recording/regenerating media having substrate thicknesses and information track pitches different from those of the compact disc are appearing in order to achieve recording densities higher than that of the compact disc. However, to regenerate such optical information recording media with different substrate thicknesses and track pitches with a conventional optical information recording/regenerating device has been extremely difficult or impossible.

This is due to the following facts: First, since the objective lens for condensing and applying the light beam onto the optical information recording medium is designed so that the aberration becomes the smallest for the thickness of the used substrate, large aberrations occur for a substrate with a different thickness and a light spot which is condensed enough to regenerate information is not formed. Second, the difference in track pitch means a difference in recording density of the optical information recording medium, so that recording and regeneration of information are difficult without using an objective lens dedicated for that recording density.

One method for solving this problem is to switch objective lenses to adapt to different optical information recording media. A conventional optical information recording/regenerating device, however, has an objective lens driving device which is finely movable for focus adjustment and tracking adjustment, but the objective lens driving device does not have a function of switching objective lenses adapted to the respective different optical information recording media.

First Conventional Example of Optical Information Recording/Regenerating Device FIG. 67 is a perspective view of a conventional objective lens driving device. In the figure, 2 is a light beam, which forms a light spot 201 with an objective lens 116. The objective lens 116 is attached to a lens holder 115 formed of a plastic material with small weight and high stiffness, the lens holder 115 having a bearing 118 formed of an aluminum material, for example. A balancer 117 is also provided facing to the objective lens 116. Furthermore, the lens holder 115 is equipped with a focusing coil 119 and tracking coils 121a and 121b. The lens holder 115 is turnable and rotatable on the bearing 118 and a shaft 103 provided on the fixed side, and the focusing coil 119 is disposed in a magnetic field formed by a focusing magnet 104 provided on the fixed side and focusing yokes 105a and 105b. The tracking coils 121a and 121b are disposed in a magnetic field formed by bipolar-magnetized magnets 107a and 107b (not shown but disposed in symmetrical positions) provided on the fixed side.

FIG. 68 is a diagram showing an optical system in the conventional optical information recording/regenerating device. The light beam 2 emitted from a semiconductor laser 202 passes through a diffraction grating 203 for tracking sensor, a half prism 204, a collimator lens 205 and directed at a sending up mirror 206 to impinge upon the objective lens 116 to form the light spot 201. The light spot is formed on the medium (not shown) and its reflected light reversely travels to pass through a focus sensor lens 207 due to the half prism 204 to be received at a photodetector 208. At the photodetector 208, the focusing error and the tracking error of the light spot 201 are detected as well as information signal on the medium (not shown), according to which feedback control is applied to the objective lens driving device.

In order to correct the focusing error of the light spot 201, desired current is applied to the focusing coil 119 to control the lens holder 115, and in turn, the objective lens 116 in the direction shown by arrow C in the FIG. 67 with the electromagnetic force obtained by the interaction with the magnetic field produced by the focusing magnet 104, thus providing control in the focusing direction.

In order to correct the tracking error of the light spot 201, a desired current is applied to the tracking coils 121a and 121b to turn the lens holder 115 around the supporting shaft 103 in the direction shown by the arrow D in the figure with the electromagnetic force obtained by the interaction with the magnetic field produced by the tracking magnets 107a and 107b (not shown but disposed in symmetrical positions), thus providing control in the tracking direction of the objective lens 116.

FIG. 69 is a diagram showing the relation between the optical information recording medium 202 and the objective lens 116 in the conventional optical information recording/regenerating device. The light beam 2 entering the objective lens 116 is condensed by the objective lens 116 and passed through the layer of the plastic substrate 204 to read the information pit 203. As the refractive index of the substrate 204 is different from that in the air, an objective lens 116 specialized for a determined thickness must be provided. The thickness (d1) of the substrate is 1.2 mm in the well-known CD (compact disc), and in order to adapt to an optical information recording medium with a substrate thickness 0.6 mm, another exclusively designed objective lens must be used.

The information pit 203 differs according to the recording density. In the CD, for example, the track pitch is about 1.6 µm and the pit width is about 0.5 µm, and then the size of a read light spot 201 is about 1.5 µm in diameter. If the track pitch is the half (0.8 µm), then the pit width is also reduced and the size of the read light spot 201 must be about 1 µm in diameter. Then, the numerical aperture of the objective lens 116 must also be changed, and a specialized objective lens is then needed.

In the conventional objective lens driving device shown in FIG. 67, however, though the lens holder 115 is turnable and up-and-down movable, its movable range is limited to a range for focusing adjustment and tracking adjustment, where a plurality of lenses can not be appropriately switched and used Second Conventional Example of Optical Information Recording/Regenerating Device Optical information recording/regenerating devices having a plurality of objective lenses also exist. As an example, FIG. 70 shows an optical information recording/regenerating device provided with a plurality of objective lens driving devices.

In FIG. 70, 211*a* and 221*b* denote objective lens driving devices having objective lenses 209 and 210. The reference characters 212*a* and 212*b* denote controlling coils for controlling radial feed provided on the objective lens driving devices 211*a* and 211*b*, 213 denotes a base, 214*a* and 214*b* denote radial direction controlling magnetic circuits fixedly provided on the base 213, 215*a* and 215*b* denote shafts fixedly provided on the base 213 for forming moving axes of the objective lens driving devices 211*a* and 211*b*, and 216 denotes a disk-like optical information recording medium. Application of a desired current to the radial direction controlling coils drives the objective lens driving devices 211*a* and 211*b* in the direction shown by the arrow B to make radial feed, and then the objective lenses 209 and 210 can be moved in the diameter direction of the optical information recording medium 216, i.e., in the direction shown by the arrow B.

Here, if the objective lenses 209 and 210 are objective lenses corresponding to optical information recording media with substrate thicknesses 0.6 mm and 1.2 mm, recording and regeneration suitable for the respective media can be performed. If two kinds of objective lenses having different light condensing characteristics (e.g., numerical aperture) are provided to adapt to media with different recording densities, recording and regeneration suitable for the respective recording densities can be performed.

Third Conventional Example of Optical Information Recording/Regenerating Device

FIG. 71 shows an important part of an optical information recording/regenerating device shown in Japanese Patent Laying-Open No. 6-333255 as another example. In the figure, 601 denotes an optical information recording medium having a substrate thickness t1 and 601*a* denotes a signal surface. 602 denotes an objective lens for the substrate thickness t1 and 603 denotes an objective lens for a substrate thickness t2 (here, t2 is assumed to be larger than t1), where both lenses are held by the lens holder 604 to be integrally driven by an objective lens driving mechanism not shown. 605 denotes a beam separating mirror including a mirror surface 605*a* and a half mirror surface 605*b*.

Next, the operation thereof will be described. The laser beam 606 emitted from a light source not shown impinges upon the beam separating mirror 605 from the right and is first separated into transmitted light and reflected light at the half mirror surface 615*b*, and the reflected light enters the objective lens 603. The transmitted light is totally reflected at the mirror surface 605*a* to enter the objective lens 602. Now, as the thickness of the optical information recording medium 601 is t1, the objective lens driving mechanism not shown controls so that the laser beam 607 coming from the objective lens 602 focuses on the signal surface 601*a* of the optical information recording medium 601. At this time, the laser beam 608 is also coming from the objective lens 603, but since it is a lens for an optical information recording medium with a thickness larger than t1, it focuses on the farther side of the signal surface 601*a* not to affect recording or regenerating. This way, in the case of an optical information recording medium with the thickness t1, the objective lens 602 is selected to record or regenerate information. In the case of an optical information recording medium with the thickness t2, the objective lens 603 is selected to record or regenerate information, then the laser beam 607 emitted from the objective lens 602 focuses on this side of the signal surface 601*a* not to affect the recording or regenerating at all.

In the half mirror surface 605*b*, its transmission factor and reflection factor can be set to the most suitable values in advance in accordance with optical characteristics of optical information recording media recorded or regenerated with the objective lens 602 and the objective lens 603.

Fourth Conventional Example of Optical Information Recording/Regenerating Device Another example is an optical information recording/regenerating device disclosed in Japanese Patent Laying-Open No. 7-98431. FIG. 72 is a schematic sectional view of a compound objective lens provided in the conventional optical information recording/regenerating device and FIG. 73 is a schematic sectional view of an optical system of the conventional optical information recording/regenerating device.

In FIG. 72, 704 denotes an objective lens and 707 denotes a hologram lens. The hologram lens 707 is formed on a substrate 709 transparent to the light beam 703 and it has a coaxial grating pattern 707*a*, of which center coincides with the objective lens 704. It is designed so that the diffraction efficiency of the first-order diffraction light of the hologram lens 707 is less than 100 percent and the transmitted light (zero-order diffraction light) 761*a* of the light beam 703*a* also has sufficient intensity.

In FIG. 73, 702 is a radiation light source, such as a semiconductor laser. The light beam 703 emitted from the radiation light source 702 is made almost parallel by the collimator lens 722, transmitted through the beam splitter 736 to enter the hologram lens 707 and the objective lens 704, and is condensed upon the optical information recording medium. The light beam reflected at the optical information recording medium reversely passes along the original light path, and the transmitted light 761 is transmitted through the hologram lens again, reflected at the beam splitter 736, condensed by the convergent lens 721, and enters the photodetector 707.

Next, the operation will be described. The objective lens 704 is designed so that, when the light beam 761 transmitted through the hologram lens 707 without diffracted enters there, it can form a condensed light spot at the diffraction limit on the optical information recording medium with a thin substrate The first-order diffraction light 764 diffracted at the hologram lens 707 is condensed onto the optical information recording medium with a thick substrate by the objective lens 704. Here, the first-order diffraction light 764 is aberration-corrected so that it can be condensed to the diffraction limit onto the optical information recording medium with a thick substrate.

This way, as this optical head device always has two focuses, it can form a suitable light spot either on an optical information recording medium with a thick substrate and an optical information recording medium with a thin substrate to record or regenerate information.

Output of the photodetector 707 is operated to produce a focusing error signal and a tracking error signal, according to which the objective lens 704 is drive-controlled to correct the focusing error and tracking error of the light spot.

The optical information recording/regenerating device of the first conventional example constructed as described above has a problem that a plurality of objective lens driving devices are needed or the device is large-sized or complicated with a large number of parts to adapt to differences of recording density and substrate thickness of the optical information recording media with which information is recorded or regenerated, thus providing an considerable increase in cost.

The optical information recording/regenerating device of the second and third conventional example constructed as described above has a disadvantage of inferior efficiency of use of laser beam, where an expensive high-output semiconductor laser must be used as a light source to cover the disadvantage.

As for the point of previously setting the transmission factor and the reflection factor of the half mirror surface to predetermine values in accordance with the optical characteristics of the optical information recording medium, variations can not be avoided in manufacturing, which needs strict manufacturing control and selection.

Furthermore, the transmission factor and the reflection factor of a half mirror surface are generally frequency dependent and the semiconductor laser serving as a light source causes fluctuation of frequency depending on environment temperature and optical output, so that the transmission factor and reflection factor can not necessarily be kept at predetermine values. Fluctuation of transmission factor and reflection factor causes fluctuation of the light amount of the laser beam applied onto the optical information recording medium, which will cause deterioration of quality of recording signal and regenerating signal.

The optical information recording/regenerating device of the third and fourth conventional example constructed as described above in which the light beam emitted from a light source is always separated into a plurality of light beams by a hologram lens has a problem that the efficiency of use of the light beam is poor and an expensive high power semiconductor laser must be used as a light source.

Furthermore, as a plurality of light beams always exist in the same optical path, they may interfere with each other or one beam may become stray light to deteriorate quality of regenerating signal, or to cause offset in focusing or tracking error signal.

Moreover, a hologram lens is very expensive and has bad productivity, resulting in a high price of the optical head.

SUMMARY OF THE INVENTION

A first aspect of the present invention is directed to an objective lens driving device, comprising: a lens holder held turnable around an axis line and up-and-down movable along the axis line; a plurality of objective lenses provided on the lens holder in positions eccentrically displaced by almost equal distances from the axis line; driving means for driving a light spot on an optical information recording medium in a focus direction and a direction across a track by operation of moving up and down the lens holder along the axis line and operation of turning the lens holder around the axis line; and means for outputting a distinguishment signal corresponding to a kind of the optical information recording medium; wherein one of the plurality of objective lenses is selected according to the distinguished signal and moved into a luminous flux to form a predetermine light spot corresponding to the kind of the optical information recording medium.

According to the objective lens driving device of the first aspect of the present invention, with a lens holder held rotatable around the axis line and up and down movable along the axis line and a plurality of objective lenses provided on the lens holder in positions eccentrically displaced by almost equal distances from the axis line, an objective lens is selected corresponding to differences in substrate thickness and recording density of an optical information recording medium and moved into a luminous flux to form a light spot to record/regenerate information, which provides an optical information recording/ regenerating device with a simple structure and a small number of parts and of low price and small size, and capable of recording or regenerating optical information recording media with different substrate thicknesses and recording densities under the most suitable optical conditions. Especially, as the method of defining the operation direction of the lens holder and the method of defaming the operation center can be separated, switch of the objective lenses can be made smoothly. Furthermore, as it is dynamically well-balanced in the turning direction, operations in the up and down and turning directions can be stable without any change when any of the objective lenses are selected.

Preferably, according to a second aspect of the present invention, the lens holder has steps which differ for each of the plurality of objective lenses in portions where the plurality of objective lenses are to be mounted.

According to the objective lens driving device according to the second aspect of the present invention, even if a plurality of objective lenses with different specifications held by the lens holder are selected and used, the positional relation between the optical information recording medium and the lens holder is constant, so that the movable amount in the focusing direction can be constant, thus providing stable operation and small-sizing and simplifying the objective lens driving device.

Preferably, according to a third aspect of the present invention, the operation of turning the lens holder around the axis line and the operation of selecting and moving into the luminous flux one of the plurality of objective lenses are made by using the driving means in common.

According to the objective lens driving device of the third aspect of the present invention, the means for selecting the objective lenses and moving the objective lens into a luminous flux and the means for turning the lens holder about the supporting axis can be implemented using the same driving device, thus providing an objective lens driving device which is low-priced and small-sized with a small number of parts.

Preferably, according to a fourth aspect of the present invention, the objective lens driving device further comprises center point restoring force generating means of the same number as or a larger number than the objective lenses to generate a center point restoring force for each of the plurality of objective lenses.

According to the objective lens driving device of the fourth aspect of the present invention, as it is configured to generate a center point restoring force for each of the plurality of objective lenses, the operation center position of each objective lens can easily be defined and stable and reliable control operation can be achieved for each objective lens. Furthermore, as the repulsion force generated when selecting and moving the objective lens can be small, a small-sized and lowpriced objective lens driving device can be obtained.

Preferably, according to a fifth aspect of the present invention, the objective lens driving device further comprises means for limiting a turning range of the lens holder to limit a range of movement of the plurality of objective lenses.

According to the objective lens driving device of the fifth aspect of the present invention, as the range of moving the objective lens is limited, the objective lens will not over move when selected and moved, thus providing quick positioning.

Preferably, according to a sixth aspect of the present invention, the objective lens driving device further comprises means for detecting which of the plurality of objective lenses is being selected.

According to the objective lens driving device of the sixth aspect of the present invention, it is distinguished which of the plurality of objective lenses is being selected, thus providing quick and correct selection of the objective lens.

Preferably, according to a seventh aspect of the present invention, the objective lens driving device further comprises means for detecting a turned position of the lens holder.

According to the objective lens driving device of the seventh aspect of the present invention, as the rotating position of the lens holder is detected, it can be distinguished which of the plurality of objective lenses is being selected, so that the objective lens can be selected quickly. Furthermore, a restoring force can be electrically generated to the lens holder, reducing the number of parts, and providing stable control operation without mechanical restriction of the operation range.

Preferably, according to an eighth aspect of the present invention, the driving means comprises transverse direction driving means for driving the lens holder in a direction across the track, and the transverse direction driving means is of the same number as or a larger number than the number of the plurality of objective lenses.

According to the objective lens driving device of the eighth aspect of the present invention provided with the transverse direction driving means for driving the lens holder in the direction across the track of the same number as or a larger number than the number of objective lenses, the driving force can be obtained efficiently to reduce the power consumption of the device. Furthermore, it can easily be adapted to an increase of the rotation number of the optical information recording media.

Preferably, according to a ninth aspect of the present invention, the operation of turning the lens holder around the axis line and the operation of selecting and moving into the luminous flux one of the plurality of objective lenses are made by using the driving means partially in common.

According to the objective lens driving device of the ninth aspect of the present invention, the means for selecting the objective lens and moving the objective lens into a luminous flux and the means for turning the lens holder about the supporting axis are partially shared, so that the objective lens can be moved efficiently.

Preferably according to a tenth aspect of the present invention, the plurality of objective lenses are arranged in positions almost symmetrical about the supporting axis line on the lens holder.

According to the objective lens driving device of the tenth aspect of the present invention, as the plurality of objective lenses are arranged almost symmetrical about the supporting axis line on the lens holder, members for driving are symmetrically arranged, which removes the necessity of providing extra driving members, reducing the number of parts to provide a low-priced and small-sized objective lens driving device.

An eleventh aspect of the present invention is directed to an objective lens driving device, comprising: a lens holder held turnable around an axis line and up-and-down movable along the axis line; a plurality of objective lenses provided on the lens holder in positions eccentrically displaced by almost equal distances from the axis line; driving means for driving a light spot on an optical information recording medium in a focus direction and a direction across a track by operation of moving up and down the lens holder along the axis line and operation of turning the lens holder around the axis line; means for outputting a distinguishment signal corresponding to a kind of the optical information recording medium; and luminous flux path changing means for changing a path of a luminous flux according to the distinguishment signal to cause the luminous flux to selectively enter one of the plurality of objective lenses; wherein a predetermine light spot is formed corresponding to the kind of the optical information recording medium.

According to the objective lens driving device of the eleventh aspect of the present invention including means for distinguishing substrate thicknesses of optical information recording media to select an objective lens which the luminous flux enter according to differences in substrate thickness and recording density, the rotation amount of the lens holder can be reduced and the lens holder can easily be well-balanced about the supporting axis, which removes the necessity of a member such as a balancer, providing a low-priced and small-sized objective lens driving device.

A twelfth aspect of the present invention is directed to an objective lens driving device, comprising: an elastic member having flexibility in an up and down direction of an axis line almost perpendicular to an optical information recording medium surface; a lens holder provided to be supported by the elastic member and turnable around the axis line as a supporting point; a plurality of objective lenses provided on the lens holder in positions eccentrically displaced by almost equal distances from the axis line; driving means for driving a light spot on an optical information recording medium in a focus direction and a direction across a track by operation of moving up and down the lens holder along the axis line and operation of turning the lens holder around the axis line; and means for outputting a distinguishment signal corresponding to a kind of the optical information recording medium; wherein one of the plurality of objective lenses is selected according to the distinguishment signal and moved into a luminous flux to form a predetermine light spot corresponding to the kind of the optical information recording medium.

According to the objective lens driving device of the twelfth aspect of the present invention which includes an elastic member movable in the up and down direction of the axis line almost perpendicular to the optical information recording medium surface, a lens holder held by the elastic member and supported rotatable around the axis line as a supporting point and a plurality of objective lenses provided in positions displaced by almost equal distances from the axis line on the lens holder, the objective lenses are selected corresponding to differences in substrate thickness and recording density of optical information recording media and moved into a luminous flux to form a light spot to record and regenerate information, thus providing an objective lens driving device with which an optical information recording/regenerating device can be realized which is low-priced and small-sized with simple structure and a small number of parts and which can apply recording/regenerating to optical information recording media with different substrate thicknesses.

A thirteenth aspect of the present invention is directed to an optical information recording/regenerating device, comprising: a light source; a plurality of objective lenses provided on a single lens holder; means for moving and setting the plurality of objective lenses provided on the lens holder to a position where a light beam emitted from the light source is incident; means for selecting an objective lens suitable for an optical information recording medium; and driving means for correcting a focusing error and a tracking error of a light spot condensed by the selected objective lens on the optical information recording medium by driving the lens holder.

According to the optical information recording/regenerating device of the thirteenth aspect of the present invention, as objective lenses corresponding to different kinds of optical information recording media are exclusively provided, a light spot can be formed with an objective lens the most suitable for each optical recording medium. Accordingly, good recording or regenerating characteristics can be realized with a single optical information recording/regenerating device, thus providing an optical information recording/regenerating device of low price and small size.

A fourteenth aspect of the present invention is directed to an objective lens driving device, comprising: a lens holder held turnable around an axis line and up-and-down movable along the axis line; a plurality of objective lenses provided on the lens holder in positions eccentrically displaced by almost equal distances from the axis line; driving means for driving a light spot on an optical information recording medium in a focus direction and a direction across a track by operation of moving up and down the lens holder along the axis line and operation of turning the lens holder around the axis line; a fixing base holding the lens holder; and means for outputting a distinguishment signal corresponding to a kind of the optical information recording medium; the driving means having a plurality of coils provided on the lens holder and a plurality of magnets fixed to predetermine positions on the fixing base, the plurality of coils having power supplying means for electric power supply, wherein one of the plurality of objective lenses is selected according to the distinguishment signal and moved into a luminous flux to form a predetermine light spot corresponding to the kind of the optical information recording medium.

According to the objective lens driving device of the fourteenth aspect of the present invention which includes a lens holder held turnable about an axis line and up and down movable along the axial line and a plurality of objective lenses provided on the lens holder in positions eccentrically displaced by almost equal distances from the axis line, the objective lens being selected corresponding to differences in substrate thickness and recording density of optical information recording media and moved into a luminous flux to form a light spot to record/regenerate information, an optical information recording/regenerating device can be realized with simple structure and a small number of parts, low-priced and small-sized, and capable of recording or regenerating of optical information recording media with different substrate thicknesses and recording densities under the most suitable optical conditions.

Preferably, according to a fifteenth aspect of the present invention, the power supplying means is provided being divided almost symmetrically about a line connecting the axis line and the center between the plurality of objective lenses.

According to the objective lens driving device of the fifteenth aspect of the present invention, the repulsion force generated by the power supplying means does not depend on the driving direction of the objective lens and is constant if any of the objective lenses is selected, which provides stable driving control of the objective lenses.

Preferably, according to a sixteenth aspect of the present invention, the power supplying means is comprised of a flexible printed wiring board.

According to the objective lens driving device of the sixteenth aspect of the present invention, the electrically connecting work between the lens holder and the fixed portion is simplified to improve the workability, and the shape of the power supplying means is stably formed and driving control of the objective lenses can be made stably. Furthermore, a damping effect of the movable portion can be obtained, enabling stable track jump operation.

Preferably, according to a seventeenth aspect of the present invention, the power supplying means is arranged so that one end of each of its forward path and its backward path is positioned in the vicinity of the center of gravity of the lens holder.

According to the objective lens driving device of the seventeenth aspect of the present invention, the repulsion force generated by the power supplying means is applied in the vicinity of the center of gravity of the lens holder, not affecting drive of the objective lenses, so that control can be made stably.

Preferably, according to an eighteenth aspect of the present invention the lens holder has a coil positioning portion, and the power supplying means has its one end fixed to the coil positioning portion.

According to the objective lens driving device of the eighteenth aspect of the present invention, positioning of the power supplying means on the lens holder side can easily be achieved and the workability is improved. Furthermore, the shape of the power supplying means is stably formed and the driving control of the objective lenses can be made stably.

Preferably, according to a nineteenth aspect of the present invention, the lens holder has means for restricting movement of the power supplying means at a position facing the coil positioning portion.

According to the objective lens driving device of the nineteenth aspect of the present invention, the shape of the power supplying means is formed stably and the driving control of the objective lenses can be achieved stably.

Preferably, according to a twentieth aspect of the present invention, the means for restricting movement of the power supplying means is an almost cylindrical boss formed to project from the lens holder surface.

According to the objective lens driving device of the twentieth aspect of the present invention, the lens holder and the restricting means can be formed as one and therefore the number of parts can be reduced and the working processes can also be reduced.

Preferably, according to a twenty-first aspect of the present invention, the fixing base has a coil positioning portion, and the power supplying means has its one end fixed to the coil positioning portion.

According to the objective lens driving device of the twenty-first aspect of the present invention, positioning of the power supplying means on the fixed side can easily be made and the workability is improved. Furthermore, the shape of the power supplying means can be formed stably and driving control of the objective lenses can be made stably.

Preferably, according to a twenty-second aspect of the present invention, the flexible printed wiring board has its main surface arranged vertical to the optical information recording medium.

According to the objective lens driving device of the twenty-second aspect of the present invention, as the repulsion force by the power supplying means working in the turning direction is stable, driving control of the objective lenses can be made stably.

Preferably, according to a twenty-third aspect of the present invention, the plurality of objective lenses are arranged at an angle almost symmetrical about the supporting axis on the lens holder, and the number of the plurality of coils is equal to or larger than the number of the plurality of objective lenses, at least two of the coils being arranged at an angle almost the same as the arrange angle of the plurality of objective lenses.

According to the objective lens driving device of the twenty-third aspect of the present invention, the number of magnets can be minimized, reducing the number of parts, which provides an objective lens driving device of low price, with reduced working steps.

Preferably, according to a twenty-fourth aspect of the present invention, the plurality of objective lenses respectively have different aperture diameters, and one of the plurality of objective lenses having the smallest aperture diameter is disposed in a position close to the rotation center of the optical information recording medium.

According to the objective lens driving device of the twenty-fourth aspect of the present invention, the objective lenses will not collide with the turntable and an objective lens driving device with high reliability is obtained, and the freedom of design of the mechanical portion is increased.

Preferably, according to a twenty-fifth aspect of the present invention, the plurality of objective lenses respectively have different working distances, and one of the plurality of objective lenses having the largest working distance is disposed in a position close to the rotation center of the optical information recording medium.

According to the objective lens driving device of the twenty-fifth aspect of the present invention, the objective lenses will not collide with the turntable and an objective lens driving device with high reliability is obtained, and the freedom of design of the mechanical portion is increased.

Preferably, according to a twenty-sixth aspect of the present invention, the plurality of objective lenses are arranged at an angle almost symmetrical about the supporting axis line on the lens holder, and the driving means has a plurality of magnetic materials in positions corresponding to the plurality of coils of the lens holder, at least two of the plurality of magnetic materials being arranged at an angle almost the same as the arrange angle of the plurality of objective lenses.

According to the objective lens driving device of the twenty-sixth aspect of the present invention, the neutral position of the plurality of objective lenses can be maintained with a minimum number of magnets, so that the number of parts can be reduced and an objective lens driving device of low price can be obtained, and the working steps can also be reduced.

Preferably, according to a twenty-seventh aspect of the present invention, the lens holder has a plurality of cut portions in positions corresponding to the plurality of coils of the lens holder, and the magnetic materials are inserted and fixed in the plurality of cut portions.

According to the objective lens driving device of the twenty-seventh aspect of the present invention, the magnetic materials can easily be positioned to improve the workability and stable magnetic damper effect is obtained so that driving control of the objective lenses can be made stably.

Preferably, according to a twenty-eighth aspect of the present invention, the plurality of magnetic materials are integrally formed to the lens holder.

According to the objective lens driving device of the twenty-eighth aspect of the present invention, the lens holder and the means for holding the neutral positions of the plurality of objective lenses can be formed as one, reducing the number of parts and the working steps.

Preferably, according to a twenty-ninth aspect of the present invention, the lens holder has a projection projecting in a direction toward the fixing base to limit a turning range of the lens holder with contact between an upper surface of the fixing base and the projection.

According to the objective lens driving device of the twenty-ninth aspect of the present invention, as the range of turning the lens holder can easily be limited without increasing the number of parts, the driving control of the objective lenses can be made stably, resulting in a low-priced objective lens driving device, with a less number of working steps.

According to a thirtieth aspect of the present invention, the fixing base has a first fixing base serving as a base and a second fixing base holding the lens holder, the first fixing base having a spherical portion which is partially spherical on a lower surface side and a lowered step portion on an upper surface side corresponding to the spherical portion, the second fixing base being faxed to the step portion of the first fixing base.

According to the objective lens driving device of the thirtieth aspect of the present invention, the objective lens driving device can be made thinner, resulting in down-sizing of the optical head device, and the optical information recording/regenerating device.

Preferably, according to a thirty-first aspect of the present invention, the fixing base has on its lower surface side a spherical portion which is partially spherical, the spherical portion having its center in the vicinity of an intersection of a plane parallel to an optical information recording medium including a principal point of the objective lens and the axis line.

According to the objective lens driving device of the thirty-first aspect of the present invention, the moved amount of the objective lens in the plane direction is small when inclination angle of the objective lens driving device is adjusted and the objective lens can be held almost at the center in the light beam, so that an optical head device with good quality of regeneration signal is obtained. Furthermore, the movable amount of the objective lens driving device in the tracking direction can be larger.

Preferably, according to a thirty-second aspect of the present invention, the plurality of coils are electrically connected in series.

According to the objective lens driving device of the thirty-second aspect of the present invention, it is satisfactory to use a single conventional driving circuit for driving the objective lens driving device, resulting in an optical information according/regenerating device of low price.

Preferably, according to a thirty-third aspect of the present invention, the plurality of coils are formed by continuous winding.

According to the objective lens driving device of the thirty-third aspect of the present invention, the coils can be formed as one, which reduces the number of parts and provides an objective lens driving device of low price, with a reduced number of working steps.

Preferably, according to a thirty-fourth aspect of the present invention, the magnetic material is cylindrical.

According to the objective lens driving device of the thirty-fourth aspect of the present invention, the shape of the magnetic material can be made easily, and an objective lens driving device of low price can be obtained.

Preferably, according to a thirty-fifth aspect of the present invention, the means for restricting movement of the power supplying means is a cubic wall formed to project from the lens holder surface.

According to the objective lens driving device of the thirty-fifth aspect of the present invention, as the shape of the power supplying means can be formed easily and stably, driving control of the objective lenses can be made stably.

Preferably, according to a thirty-sixth aspect of the present invention, the fixing base has a hole into which a supporting shaft serving as the axis line can be inserted, a cylindrical portion formed almost coaxial with the hole, a plurality of side walls and a spherical portion.

According to the objective lens driving device of the thirty-sixth aspect of the present invention, the fixing base can be formed as one, so that the number of parts is reduced and an objective lens driving device of low price can be obtained, and the working steps can also be reduced.

Preferably, according to a thirty-seventh aspect of the present invention, the fixing base is a sintered material containing iron.

According to the objective lens driving device of the thirty-seventh aspect of the present invention, the fixing base can be formed into a complicated form, resulting in an objective lens driving device with good driving efficiency.

Preferably, according to a thirty-eighth aspect of the present invention, the fixing base is a sheet material containing iron.

According to the objective lens driving device of the thirty-eighth aspect of the present invention, the fixing base can be made easily, and a low-priced objective lens driving device can be obtained.

Preferably, according to a thirty-ninth aspect of the present invention, the lens holder has an engaging portion for positioning arrangement of the plurality of objective lenses and fixing the plurality of objective lenses by engagement.

According to the objective lens driving device of the thirty-ninth aspect of the present invention, the lens holder can be made easily and a low-priced objective lens driving device can be obtained, and as the plurality of objective lenses can be disposed at a close distance, the operation of switching the objective lenses can be made stably.

Preferably, according to a fortieth aspect of the present invention, the plurality of coils have a plurality of sets of coils electrically connected in series, the sets of coils electrically connected in series being connected in parallel.

According to the objective lens driving device of the fortieth aspect of the present invention, as the driving efficiency of the objective lens driving device is improved, performance of the optical information recording/regenerating device can be improved and the power consumption can be reduced.

Preferably, according to a forty-first aspect of the present invention, the number of plurality of magnets is equal to or larger than the number of plurality of coils.

According to the objective lens driving device of the forty-first aspect of the present invention, the good driving efficiency and the simple driving circuit improve the performance of the optical information recording/regenerating device and reduce the power consumption. Furthermore, an objective lens driving device of low price and with good workability can be obtained.

Preferably, according to a forty-second aspect of the present invention, the plurality of objective lenses are arranged at an angle almost symmetrical about the supporting axis line on the lens holder, the number of the plurality of magnets is equal to or larger than the number of the plurality of objective lenses, and at least two of the magnets are arranged at an angle almost symmetrical about the supporting axis on the lens holder.

According to the objective lens driving device of the forty-second aspect of the present invention, the number of coils can be minimized, so that a low-priced objective lens driving device with a reduced number of parts can be obtained, and also with a reduced number of working steps.

A forty-third aspect of the present invention is directed to an optical information recording/regenerating device, comprising: an objective lens driving device including, a lens holder held turnable around an axis line and up-and-down movable along the axis line, a plurality of objective lenses provided on the lens holder in positions eccentrically displaced by almost equal distances from the axis line, driving means for driving a light spot on an optical information recording medium in a focus direction and a direction across a track by operation of moving up and down the lens holder along the axis line and operation of turning the lens holder around the axis line, and means for outputting a distinguishment signal corresponding to a kind of the optical information recording medium, wherein one of the plurality of objective lenses is selected according to the distinguishment signal and moved into a luminous flux to form a predetermine light spot corresponding to the kind of the optical information recording medium; a light source serving as a source of the light spot; a first optical element for dividing a light beam emitted from the light source into a plurality of light beams at a predetermine ratio; a second optical element for almost transmitting the divided light beams and reflecting the reflected light beam reflected from the optical information recording medium at a predetermine angle to change the light path; a third optical element for making the light beam transmitted through the second optical element almost parallel; a fourth optical element for almost totally reflecting the light beam made parallel and the reflected light beam reflected from the optical information recording medium at a predetermine angle to cause the light beam to enter a selected one of the plurality of objective lenses; and a light receiving element for receiving the reflected light beam having its optical path changed by the second optical element.

A forty-fourth aspect of the present invention is directed to an optical information recording/regenerating device, comprising an objective lens driving device, comprising, a lens holder held turnable around an axis line and up-and-down movable along the axis line, a plurality of objective lenses provided on the lens holder in positions eccentrically displaced by almost equal distances from the axis line, driving means for driving a light spot on an optical information recording medium in a focus direction and a direction across a track by operation of moving up and down the lens holder along the axis line and operation of turning the lens holder around the axis line, means for outputting a distinguishment signal corresponding to a kind of the optical information recording medium, and luminous flux path changing means for changing a path of a luminous flux according to the distinguishment signal to cause the luminous flux to selectively enter one of the plurality of objective lenses, wherein a predetermine light spot is formed corresponding to the kind of the optical information recording medium; a light source serving as a source of the light spot; a first optical element for dividing a light beam emitted from the light source into a plurality of light beams at a predetermine ratio; a second optical element for almost transmitting the divided light beams and reflecting the reflected light beam reflected from the optical information recording medium at a predetermine angle to change the light path; a third optical element for making the light beam transmitted through the second optical element almost parallel; a fourth optical element for almost totally reflecting the light beam made parallel and the reflected light beam reflected from the optical information recording medium at a predetermine angle to cause the light beam to enter a selected one of the plurality of objective lenses; and a light receiving element for receiving the reflected light beam having its optical path changed by the second optical element.

A forty-fifth aspect of the present invention is directed to an optical information recording/regenerating device, comprising: an objective lens driving device including, an elastic member having flexibility in an up and down direction of an axis line almost perpendicular to an optical information recording medium surface, a lens holder provided to be supported by the elastic member and turnable around the axis line as a supporting point, a plurality of objective lenses provided on the lens holder in positions eccentrically displaced by almost equal distances from the axis line, driving means for driving a light spot on an optical information recording medium in a focus direction and a direction across a track by operation of moving up and down the lens holder along the axis line and operation of turning the lens holder around the axis line, and means for outputting a distinguishment signal corresponding to a kind of the optical information recording medium, wherein one of the plurality of objective lenses is selected according to the distinguishment signal and moved into a luminous flux to form a predetermine light spot corresponding to the kind of the optical information recording medium; a light source serving as a source of the light spot; a first optical element for dividing a light beam emitted from the light source into a plurality of light beams at a predetermine ratio; a second optical element for almost transmitting the divided light beams and reflecting the reflected light beam reflected from the optical information recording medium at a predetermine angle to change the light path; a third optical element for making the light beam transmitted through the second optical element almost parallel; a fourth optical element for almost totally reflecting the light beam made parallel and the reflected light beam reflected from the optical information recording medium at a predetermine angle to cause the light beam to enter a selected one of the plurality of objective lenses; and a light receiving element for receiving the reflected light beam having its optical path changed by the second optical element.

A forty-sixth aspect of the present invention is directed to an optical information recording/regenerating device, comprising: an objective lens driving device including, a lens holder held turnable around an axis line and up-and-down movable along the axis line, a plurality of objective lenses provided on the lens holder in positions eccentrically displaced by almost equal distances from the axis line, driving means driving a light spot on an optical information recording medium in a focus direction and a direction across a track by operation of moving up and down the lens holder along the axis line and operation of turning the lens holder around the axis line, a fixing base holding the lens holder, and means for outputting a distinguishment signal corresponding to a kind of the optical information recording medium, the driving means having a plurality of coils provided on the lens holder and a plurality of magnets fixed in predetermine positions on the fixing base, the plurality of coils having power supplying means for electric power supply, wherein one of the plurality of objective lenses is selected according to the distinguishment signal and moved into a luminous flux to form a predetermine light spot corresponding to the kind of the optical information recording medium; a light source serving as a source of the light spot; a first optical element for dividing a light beam emitted from the light source into a plurality of light beams at a predetermine ratio; a second optical element for almost transmitting the divided light beams and reflecting the reflected light beam reflected from the optical information recording medium at a predetermine angle to change the light path; a third optical element for making the light beam transmitted through the second optical element almost parallel; a fourth optical element for almost totally reflecting the light beam made parallel and the reflected light beam reflected from the optical information recording medium at a predetermine angle to cause the light beam to enter a selected one of the plurality of objective lenses; and a light receiving element for receiving the reflected light beam having its optical path changed by the second optical element.

According to the optical information recording/regenerating device of the forty-third to forty-sixth aspects of the present invention, different kinds of objective lenses respectively corresponding to different kinds of optical information recording media are selected and moved onto a light beam to form a light spot, which provides a low-priced and small-sized optical information recording/regenerating device.

Preferably, according to forty-seventh through fiftieth aspects of the present invention, the optical information recording/regenerating device further comprises a current voltage converting circuit, a focusing error generating circuit, a tracking error generating circuit, a regeneration signal detecting circuit, a circuit generating a pulse current when an objective lens corresponding to the distinguishment signal in the plurality of objective lenses is not disposed in an optical path, and a driving device driving circuit for driving the objective lens driving device.

According to the optical information recording/regenerating device of the forty-seventh through fiftieth aspects of the present invention, a low-priced and small-sized optical information recording/regenerating device can be obtained which can record and regenerate information with different kinds of optical information recording media.

A fifty-first aspect of the present invention is directed to an optical information recording/regenerating device in which a laser beam emitted from a laser light source is led to an objective lens by a single optical path system and condensed and applied onto an optical information recording medium by the objective lens to optically record or regenerate information, comprising: a plurality of objective lenses having the most suitable optical characteristics corresponding to different kinds of the optical information recording media; means for selecting one of the plurality of objective lenses corresponding to a kind of the optical information recording medium subject to recording or regenerating; and means for switching light intensity of the laser beam emitted from the laser light source corresponding to the selected objective lens.

According to the optical information recording/regenerating device of the fifty-first aspect of the present invention, with two objective lenses provided, the light intensity of the laser beam emitted from the light source is switched while switching the two objective lenses according to different kinds of optical information recording media, producing the effects of using the laser beam effectively and performing stable regeneration with detected electric signal having predetermine magnitude.

Preferably, according to the optical information recording/regenerating device of a fifty-second aspect of the present invention, the means for switching the light intensity of the laser beam includes high frequency current value switching means for switching a value of a high frequency current applied to the laser light source together with a driving current for recording or regenerating to a different value corresponding to the selected objective lens.

According to the optical information recording/regenerating device of the fifty-second aspect of the present invention, as the high frequency superpose current injected into the semiconductor laser is switched as the optical output is switched, noise of the semiconductor laser can be suppressed independent of the optical output, producing the effect of stable regeneration.

A fifty-third aspect of the present invention is directed to an optical information recording/regenerating device in which a laser beam emitted from a laser light source is led to an objective lens by a single optical path system and condensed and applied onto an optical information recording medium by the objective lens to optically record or regenerate information, comprising: a plurality of objective lenses having the most suitable optical characteristics corresponding to different kinds of optical information recording media; means for selecting one of the plurality of objective lenses corresponding to a kind of the optical information recording medium subject to recording or regenerating; a photodetector receiving a laser beam reflected from the optical information recording medium; signal detecting means for detecting an information signal and an error signal from an output signal of the photodetector; and means for switching an amplification degree of the signal detecting means corresponding to the selected objective lens.

Preferably, according to a fifty-fifth aspect of the present invention, the means for switching an amplification degree of the signal detecting means includes voltage converting means for converting an output current of the photodetector into a voltage, and means for switching a value of load resistance of the voltage converting means.

According to the optical information recording/regenerating device of the fifty-third and fifty-fifth aspects of the present invention, the reflected light from the optical information recording medium is detected to switch the amplification degree of the electric circuit generating the electric signal while the objective lens is switched according to the kind of the optical information recording medium, which produces the effect of enabling stable regeneration with predetermine magnitude of signal independent of the kind of the optical information recording medium.

Preferably, according to a fifty-fourth aspect of the present invention, the optical information recording/regenerating device further comprises means for switching light intensity of the laser beam emitted from the laser light source corresponding to the selected objective lens. According to the optical information recording/regenerating device of the fifty-fourth aspect of the present invention, as the switch of the light intensity and the switch in the electric circuit are made at the same time, the laser beam can be utilized effectively and signals with predetermine magnitude are obtained independent of the kinds of the optical information recording media, thus providing stable regeneration.

Preferably, according to a fifty-سixth aspect of the present invention, the plurality of objective lenses individually have different aperture diameters or numerical apertures.

Preferably, according to a fifty-seventh aspect of the present invention, the plurality of objective lenses individually have different aperture diameters or numerical apertures.

According to the optical information recording/regenerating device of the fifty-sixth and fifty-seventh aspects of the present invention, since the two objective lenses have different aperture diameters or numerical apertures, condensed light spots of different sizes are obtained, enabling recording or regenerating with optical information recording media with different recording densities.

Preferably, according to a fifty-eighth aspect of the present invention, the signal detecting means includes means for correcting the amplification degree of the signal detecting means on the basis of a kind of the information recording medium and magnitude of the reflected laser beam.

According to the optical information recording/regenerating device of the fifty-eighth aspect of the present invention, the switch of the light intensity and the switch in the electric circuit are corrected on the basis of the electric signal obtained from the reflected light from the optical information recording medium, which provides signals with predetermine magnitude independent of the kinds of the optical information recording media, thus providing the effect of stable regeneration.

A fifty-ninth aspect of the present invention is directed to an optical information recording/regenerating device including a dividing element for dividing a laser beam emitted from a laser light source at least into three laser beams, in which the three laser beams are led to an objective lens, and condensed and applied as three condensed light spots upon an optical information recording medium by the objective lens, the three laser beams reflected at the optical information recording medium are detected at a photodetector to optically record or regenerate information, and a tracking error signal for following up information track of the optical information recording medium is detected from at least two laser beams of the three laser beams reflected at the optical information recording medium, comprising: a plurality of objective lenses having the most suitable optical characteristics corresponding to different kinds of optical information recording media; and means for selecting one of the plurality of objective lenses in accordance with a kind of an optical information recording medium subject to recording or regenerating; wherein the dividing element inclines the laser beam by a predetermine angle so that pitch of information track of the optical information recording medium and a spot interval of the three condensed light spots formed by the selected objective lens are in proportion to each other.

According to the optical information recording/ regenerating device of the fifty-ninth aspect of the present invention, the laser beam from the light source can be applied effectively to the optical information recording medium. Furthermore, as the intervals between the condensed light spots of the three beams emitted from each objective lens satisfy the most suitable conditions for the track pitch of the applied optical information recording medium, the reliability of track flow-up is improved.

Preferably, according to a sixtieth aspect of the present invention, the plurality of objective lenses individually have different focal lengths.

According to the optical information recording/ regenerating device of the sixtieth aspect of the present invention, as the focal lengths of the plurality of objective lenses are not equal, the intervals between the condensed light spots of the three beams emitted from each objective lens satisfy the most suitable conditions for each track pitch of optical information recording media with different track pitches, and the reliability of the track flow-up is improved.

Preferably, according to a sixty-first aspect of the present invention, the plurality of objective lenses individually have different working distances.

According to the optical information recording/ regenerating device of the sixty-first aspect of the present invention, it has the effect of enabling recording or regenerating with different kinds of optical information recording media with different substrate thicknesses.

Preferably, according to a sixty-second aspect of the present invention, the pitch of information track of the optical information recording medium and a focal length of the selected objective lens are in proportion to each other.

According to the optical information recording/ regenerating device of the sixty-second aspect of the present invention, the relation of focal lengths of a plurality of objective lenses is almost proportional to the track pitches of applied optical information recording media, so that the intervals between the condensed light spots of the three beams emitted from each objective lens become suitable conditions for the track pitch of the applied optical information recording medium, producing the effect of improving the reliability of track flow-up.

Preferably, according to a sixty-third aspect of the present invention, the optical information recording/regenerating device further comprises a plurality of aperture diameter limiting means for limiting aperture diameters of lenses in correspondence with the plurality of objective lenses, at least one of the plurality of aperture diameter limiting means being provided separately from the one of the plurality of objective lenses.

According to the optical information recording/ regenerating device of the sixty-third aspect of the present invention, as the means for limiting the aperture diameter of the objective lens is provided, it has the effect that the objective lens can have a predetermine numerical aperture.

Preferably, according to a sixty-fourth aspect of the present invention, the optical information recording/ regenerating device further comprises a plurality of aperture diameter limiting means for limiting aperture diameters of lenses in correspondence with the plurality of objective lenses, at least one of the plurality of aperture diameter limiting means being provided integrally with the plurality of objective lenses.

According to the optical information recording/ regenerating device of the sixty-fourth aspect of the present invention, as the objective lens provided with the means for limiting the aperture is used, it has the effect of providing a low-priced objective lens.

Preferably, according to a sixty-fifth aspect of the present invention, in the plurality of objective lenses, an objective lens with a relatively short focal length has a larger numerical aperture than that of an objective lens with a relatively long focal length.

According to the optical information recording/ regenerating device of the sixty-fifth aspect of the present invention, since an objective lens having a shorter focal length has a larger numerical aperture, a spot diameter dependent on the numerical aperture is obtained and recording or regenerating is well performed.

Preferably, according to a sixty-sixth aspect of the present invention, the dividing element is common to the plurality of objective lenses.

According to the optical information recording/ regenerating device of the sixty-sixth aspect of the present invention, since a single laser beam dividing element is used, it has the effect that the laser beam emitted from the light source is divided in a predetermine direction.

Preferably, according to a sixty-seventh aspect of the present invention, an optical system for detecting the tracking error signal is common to the plurality of objective lenses.

According to the optical information recording/ regenerating device of the sixty-seventh aspect of the present invention, as the tracking error signal is detected by a common optical system independently of the objective lenses, it has the effect that the optical system is simplified and can be made at a low price.

It is an object of the present invention to obtain an objective lens driving device and an optical information recording/regenerating device in which a plurality of objective lenses can be selectively disposed in a single beam to be applicable to optical information recording media with different substrate thicknesses and recording densities, with a simple structure and a small number of parts, and of low price and small size.

It is another object of the present invention to obtain an optical information recording/regenerating device having a plurality of objective lenses which can effectively apply a laser beam from a light source onto an optical information recording medium.

It is still another object of the present invention to obtain an optical information recording/regenerating device which can apply the most suitable amount of laser beam to an optical information recording medium.

It is still another object of the present invention to obtain an optical information recording/regenerating device which is capable of stable regeneration on the basis of signal detected from a reflected light from various kinds of optical information recording media.

These and other objects, features, aspects and advantages of the present invention will become more apparent from the following detailed description of the present invention when taken in conjunction with the accompanying drawings.

BRIEF DESCRIPTION OF THE DRAWINGS

FIG. 59 is a plan view and a circuit connection diagram of an optical system showing an optical information recording/regenerating device in a twenty-eighth preferred embodiment of the present invention.

DESCRIPTION OF THE PREFERRED EMBODIMENTS

1. First Preferred Embodiment

<1-1. Device Structure>

Figure 1:
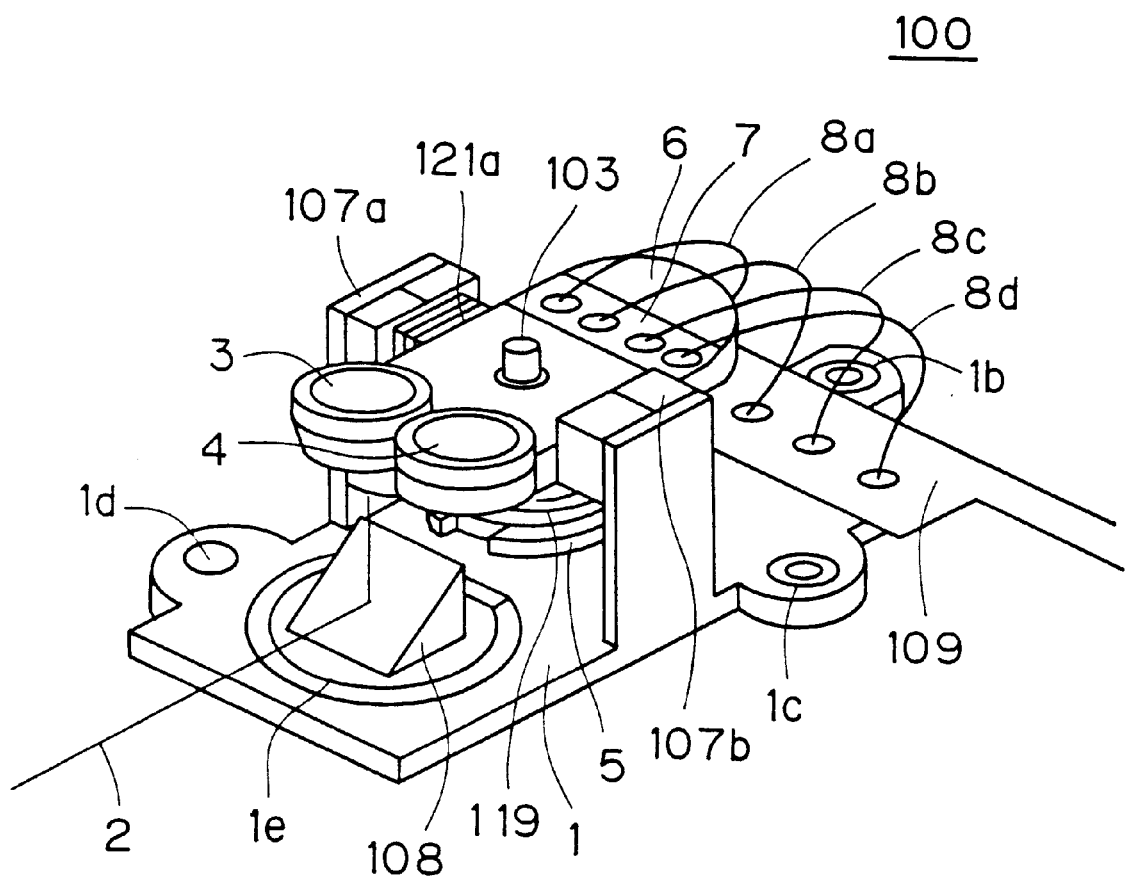
FIG. 1 is a perspective view showing an objective lens driving device in a first preferred embodiment of the present invention.
Figure 2:
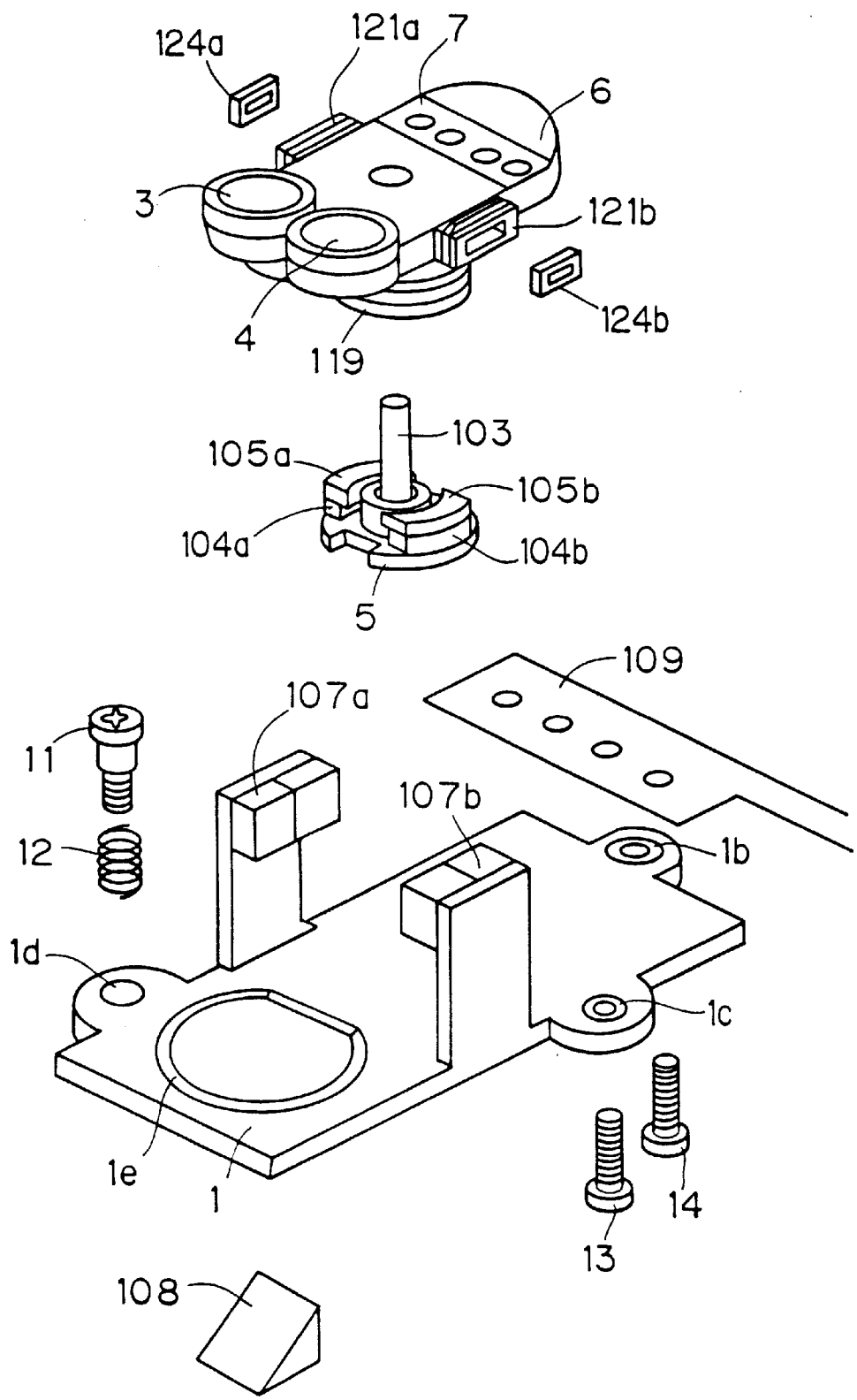
FIG. 2 is an exploded perspective view showing the objective lens driving device in the first preferred embodiment of the present invention.
Figure 3:
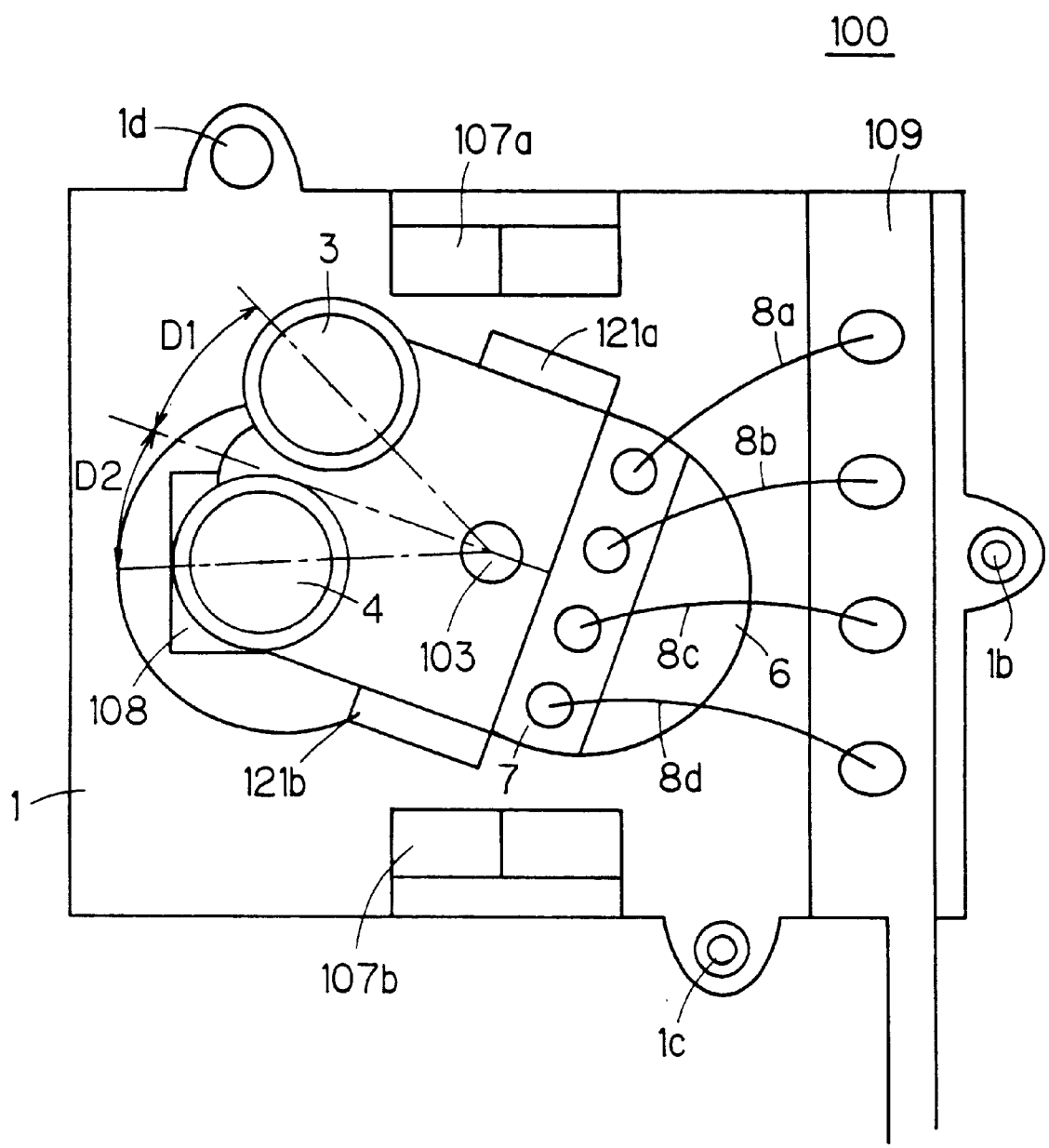
FIG. 3 is a plan view showing the objective lens driving device in the first preferred embodiment of the present invention.
Figure 4:
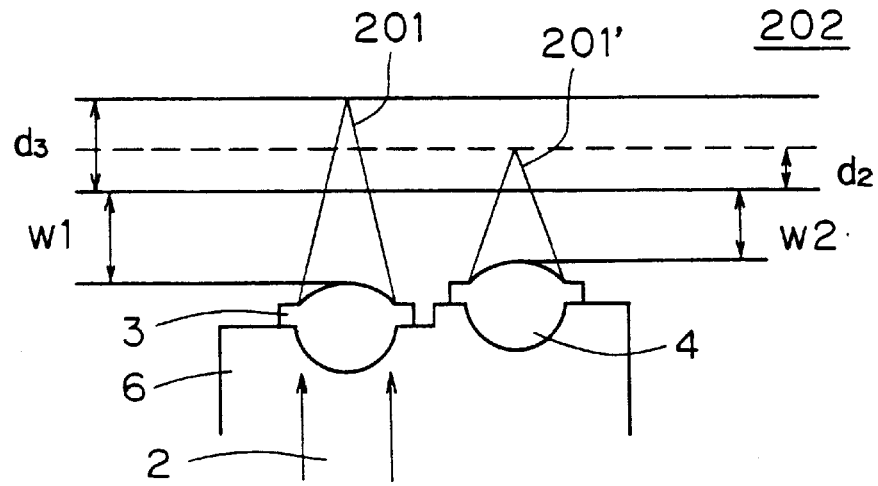
FIG. 4 is a diagram showing the positional relation among the objective lenses, the lens holder and the optical information recording medium in the objective lens driving device of the first preferred embodiment of the present invention.
Figure 5:
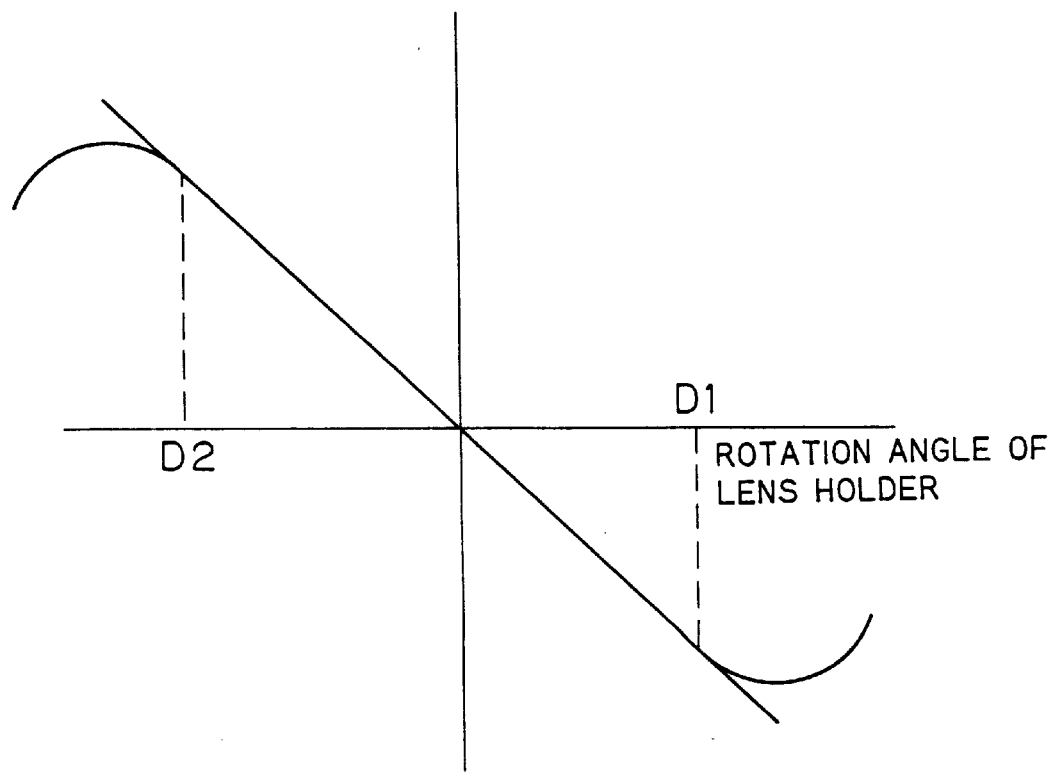
FIG. 5 is a diagram showing the relation between the rotation angle of the lens holder and the restoring force occurring in the tracking direction in the objective lens driving device of the first preferred embodiment of the present invention.

FIG. 1 is a perspective view showing an objective lens driving device 100 in a first preferred embodiment of the present invention, FIG. 2 is an exploded perspective view showing the objective lens driving device 100 in the first preferred embodiment of the present invention, and FIG. 3 is a plan view showing the objective lens driving device 100 in the first preferred embodiment of the present invention. FIG. 4 is a diagram showing the positional relation between the objective lenses, the lens holder and the optical information recording medium in the objective lens driving device 100 of the first preferred embodiment of the present invention. FIG. 5 is a diagram showing the relation between the rotation angle of the lens holder and the restoring force occurring in the tracking direction in the objective lens driving device 100 of the first preferred embodiment of the present invention. In the figures, the same reference characters are allotted to the same or corresponding portions as or to those in FIG. 67–FIG. 70.

In FIG. 1–FIG. 3, 1 denotes a fixing base formed of a magnetic material, which has screw portions 1b and 1c in the vicinity of the bottom on the rear and the side. It also has a projection and through hole 1d in the vicinity of the bottom on the side in the direction almost opposite to the sum of the vector directed from the supporting shaft 103 to 1b and the vector directed to 1c. Further, a spherical portion 1e having its center at the point on the optical axis is provided on the bottom of the fixing base 1. The reference character 2 denotes a light beam formed by the objective lens 3 or 4.

The reference character 5 is a supporting shaft holding base, which holds the lower end of the supporting shaft 103 coated with fluororesin with a small frictional coefficient. In FIG. 2, 104a and 104b are focusing magnets magnetized in the vertical direction, which are bonded and fixed to the supporting shaft holding base 5 with the focusing yokes 105a and 105b, and the supporting shaft holding base 5 is bonded and fixed to the fixing base 1.

The reference characters 107a and 107b are tracking magnets bipolar-magnetized in the right and left direction, which are fixed to the fixing base 1 by bonding. 108 is a sending up mirror for reflecting the light beam 2 coming from the front in the vertical upward direction. 109 is a relay substrate for drive current application, which is bonded and fixed to the fixing base 1.

The reference character 6 is a lens holder formed of a plastic material, or the like, with light weight and high stiffness, which holds the objective lenses 3 and 4 corresponding to a plurality of optical information recording media with different substrate thicknesses, recording densities, etc. at positions eccentrically displaced from the supporting shaft 103 by almost equal distances. The lens holder 6 is integrally provided with a bearing portion which has its axis almost parallel to the optical axes of the objective lenses 3 and 4. The objective lenses 3 and 4 and the lens holder 6 are constructed so that the center of gravity of the movable portion is on the axis line to keep the dynamic balance in the turning direction.

As shown in FIG. 4, the objective lenses 3 and 4 generally adapted for different substrate thicknesses or recording densities, etc. have different distances W1 and W2 from the lower surface of the medium (which are referred to as working distances) when positioned to form the light spot 201 or 201' upon the optical information recording medium. The lens holder 6 is constructed to have a difference in level between mounting surfaces for the respective objective lenses by the difference between W1 and W2. Thus, the operating positions in the up and down moving direction can be almost the same even if the medium is switched.

Lenses with different focal lengths may be used correspondingly to optical information recording media of different kinds without providing a step, but then specifically designed lenses will be required in this case.

The reference character 119 is a focusing coil fixed to the lens holder 6 coaxially to the bearing portion, which is disposed in a magnetic gap formed by the supporting shaft holding base 5 and the focusing yokes 105a and 105b. 7 is a movable relay substrate fixed to the lens holder 6, which connects between the tracking coils 121a and 121b bonded to both sides of the lens holder 6 and also serves as a relay substrate for supplying driving current to the focusing coil 119 and the tracking coils 121a and 121b through lead lines 8a–8d.

The reference characters 124a and 124b are magnetic pieces, which are bonded and fixed to the lens holder at positions facing the tracking magnets 107a and 107b.

The reference character 11 is a special screw which has a screw formed at its end and a cylindrical part larger in diameter than the screw part, 12 is a spring, and 13 and 14 are screws.

<1-2. Device Operation>

Next, the operation will be described. When an optical information recording medium is set in the optical information recording/regenerating device, it distinguishes differences of substrate thickness and recording density of the medium and selects an objective lens (the objective lens 4 in FIG. 3) according to the difference of thickness and recording density. For example, objective lenses adapted for substrate thicknesses 0.6 mm and 1.2 mm, or, objective lenses of numerical apertures 0.6 and 0.4 are provided, and one of which is selected. Here, if the selected objective lens exists in the light beam 2 focusing operation is continuously started. If the selected objective lens does not exist in the light beam 2, a desired current is applied to the tracking coils 121a and 121b to rotate the lens holder 6 around the supporting shaft 103 with an electromagnetic force obtained by the interaction with the magnetic field produced by the tracking magnets 107a and 107b to move the corresponding objective lens into the light beam 2. Subsequently, the focusing operation is started.

In order to correct a focusing error of the light spot 201 or 201', a desired current is applied to the focusing coil 119 to control the movable portion, and in turn, the objective lens 3 or 4 in the direction vertical to the optical information recording medium with the electromagnetic force obtained by the interaction with the magnetic field produced by the focusing magnets 104a and 104b to control in the focusing direction. In order to correct a tracking error of the light spot 201 or 201', a desired current is applied to the tracking, coils 121a and 121b to turn the movable portion around the supporting shaft 103 in the direction across the track of the optical information recording medium with the electromagnetic force obtained by the interaction with the magnetic field produced by the tracking magnets 107a and 107b to control the objective lens 3 or 4 in the tracking direction.

The magnetic pieces 124a and 124b are disposed at positions where the magnetic flux density is highest in the magnetic field produced by the tracking magnets 107a and 107b when the lens holder 6 is at the center position. The magnetic flux density changes as the lens holder 6 moves in either in the focusing direction or in the tracking direction, and then a restoring force is magnetically produced. With the rotation angles D1 and D2 shown in FIG. 3, the shapes of the magnetic pieces 124a and 124b are determined so that linear characteristic is obtained in the range of D1+D2+the moved angle for correction of the tracking error, as shown in FIG. 5. The moved angle for correction of the tracking error is about 10° in a general structure.

A rubber damper may be used as means for obtaining the restoring force, but using the magnetic pieces is preferable because the linear range in the tracking direction can be taken larger.

The fixing base 1 is pressed against a head base (not shown) by the special screw 11 and the spring 12 so as to be in contact with it in the spherical portion 1e on the lower surface. By adjusting the amount of tightening the screw 13 from the lower surface of the head base, the inclination of the optical axis of the fixing base 1, and in turn, of the objective lenses 3, 4 in the track direction of the optical information recording medium can be adjusted around the center of the spherical portion 1e, i.e., around the point on the optical axis. Similarly, by adjusting the amount of tightening the screw 14, the inclination of the optical axis of the fixing base 1, and in turn, of the objective lenses 3, 4 can be adjusted in the direction vertical to the track of the optical information recording medium.

Figure 68:
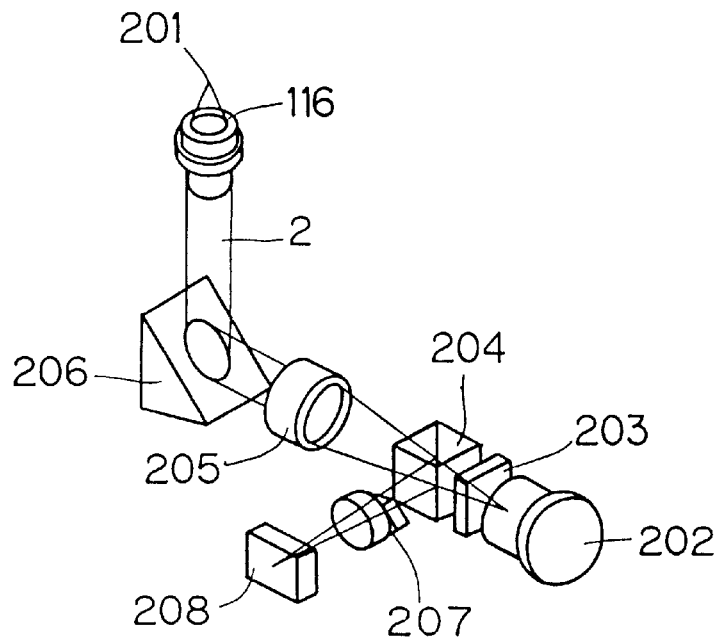
FIG. 68 is a perspective view showing the optical system in the conventional optical information recording/regenerating device.
Figure 69:
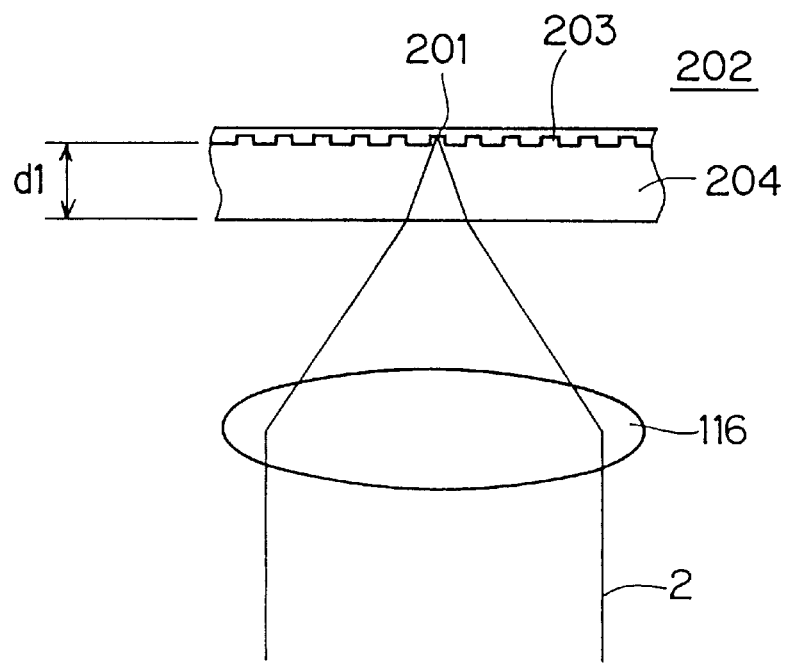
FIG. 69 is a diagram showing the relation between the objective lens and the optical information recording medium in the conventional optical information recording/regenerating device.
Figure 70:
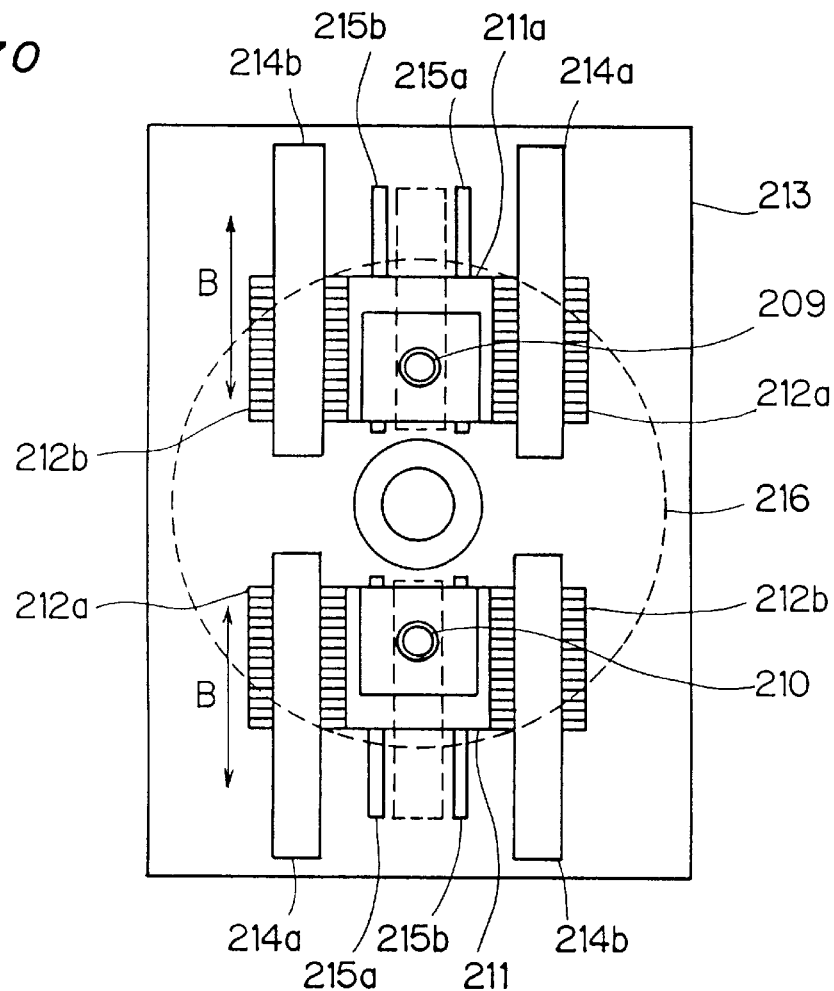
FIG. 70 is a plan view of an optical information recording/regenerating device having a conventional objective lens driving device.
Figure 71:
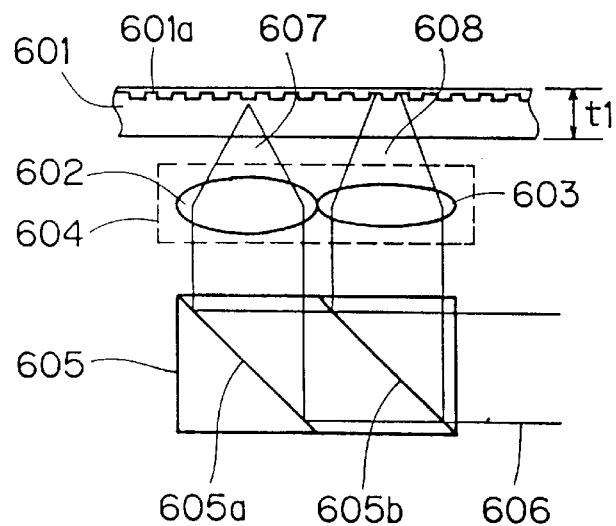
FIG. 71 is a side view of an optical system of a conventional optical information recording/regenerating device.
Figure 72A:
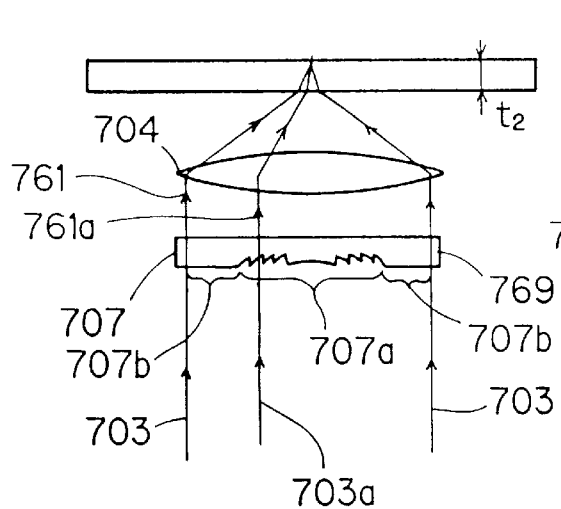
FIG. 72($a$) and FIG. 72($b$) are schematic sectional views of a compound objective lens provided in a conventional optical information recording/regenerating device.
Figure 72B:
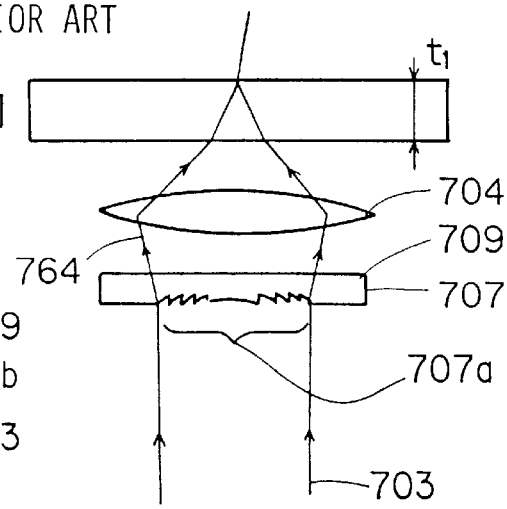
Figure 73:
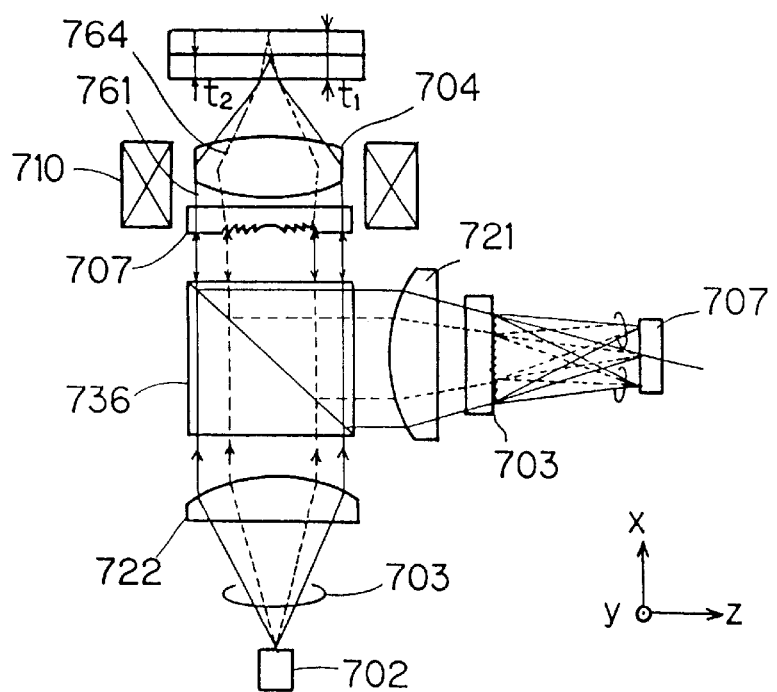
FIG. 73 is a schematic sectional view of the optical system of the conventional optical information recording/regenerating device.

Although not described in this description, an optical system the same as the optical system portion in the conventional example shown in FIG. 68 is used in this preferred embodiment.

2. Second Preferred Embodiment
<2-1. Device Structure>

Figure 6:
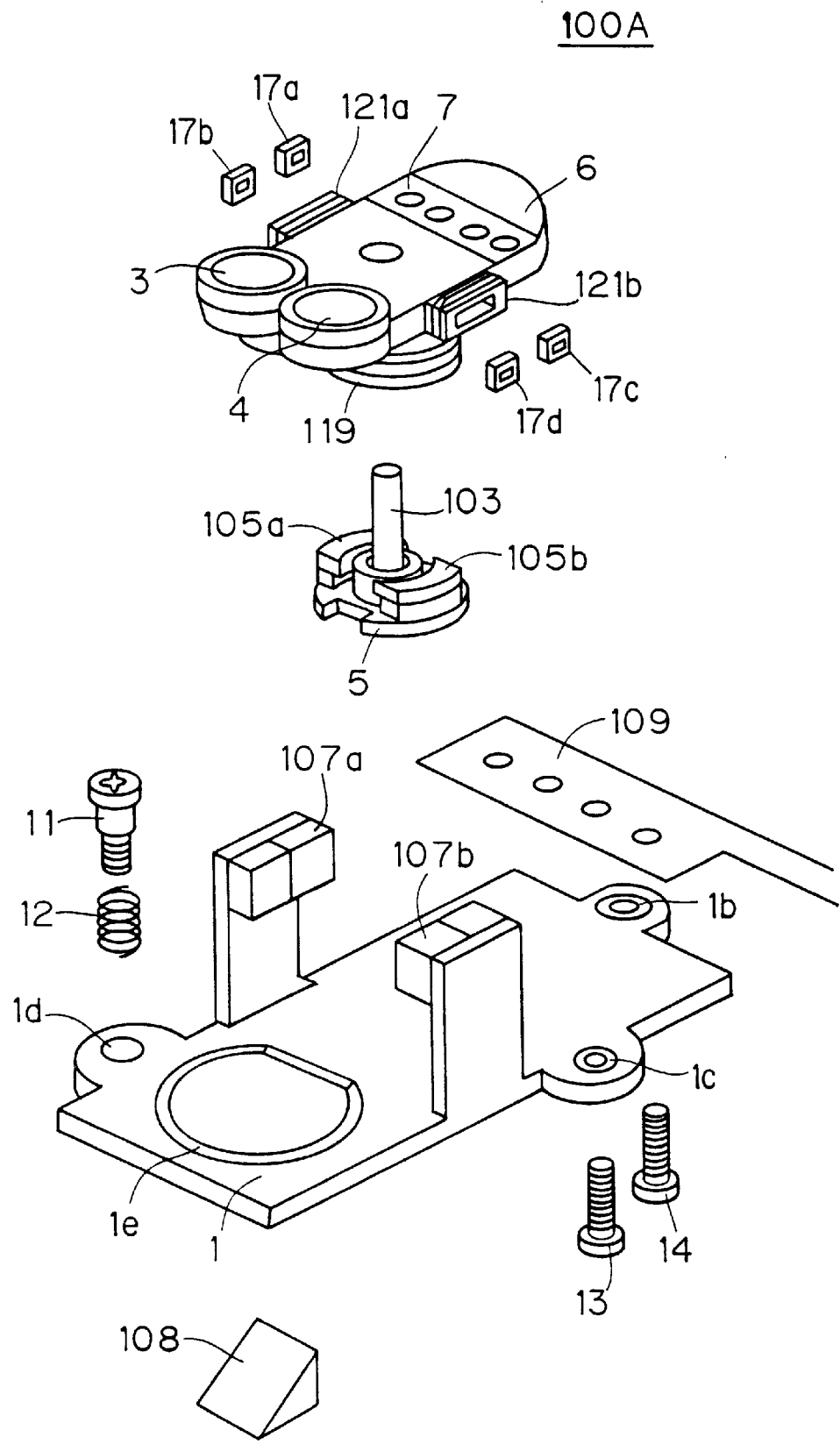
FIG. 6 is an exploded perspective view showing an objective lens driving device in a second preferred embodiment of the present invention.
Figure 7:
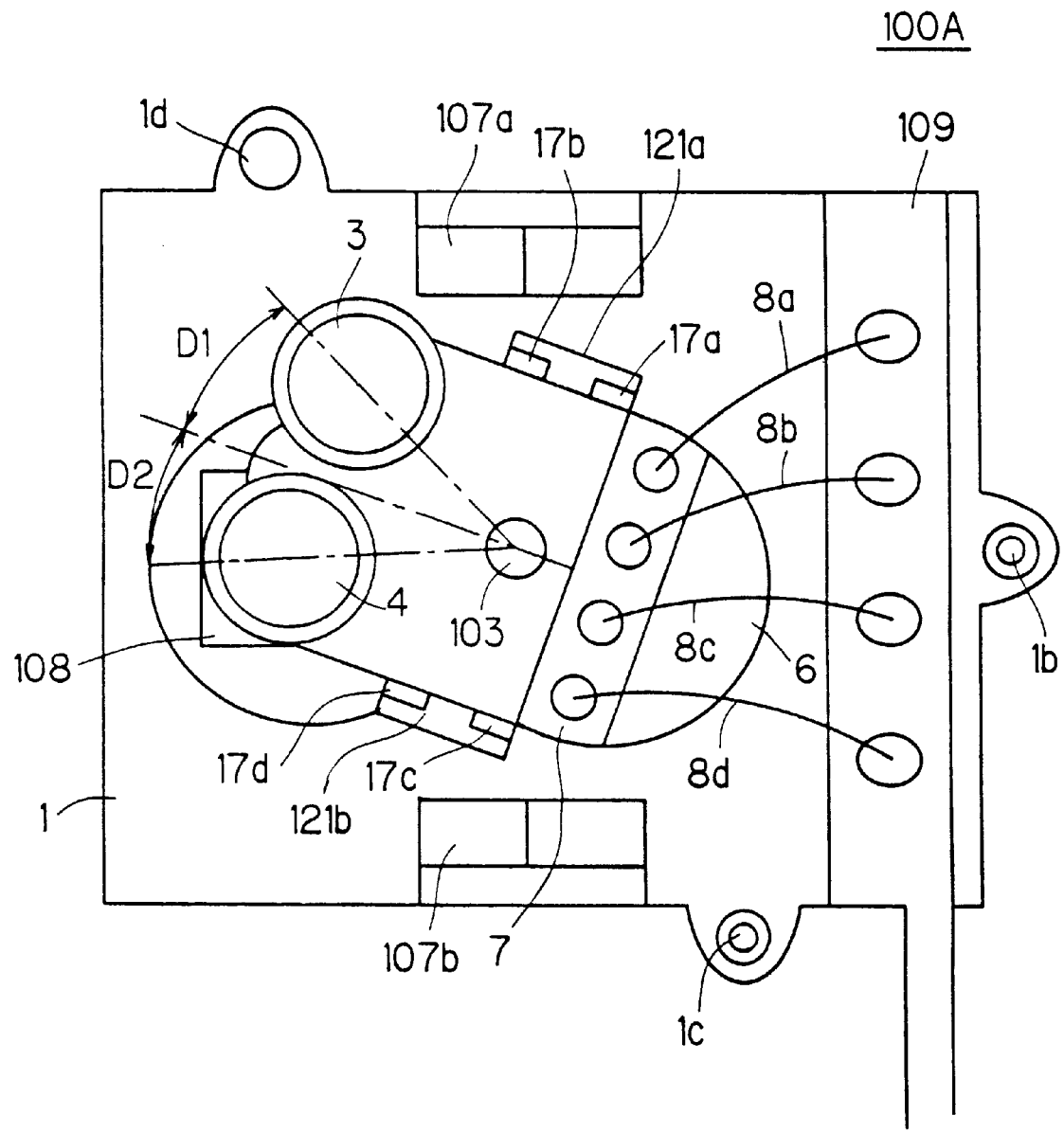
FIG. 7 is a plan view showing the objective lens driving device in the second preferred embodiment of the present invention.
Figure 8:
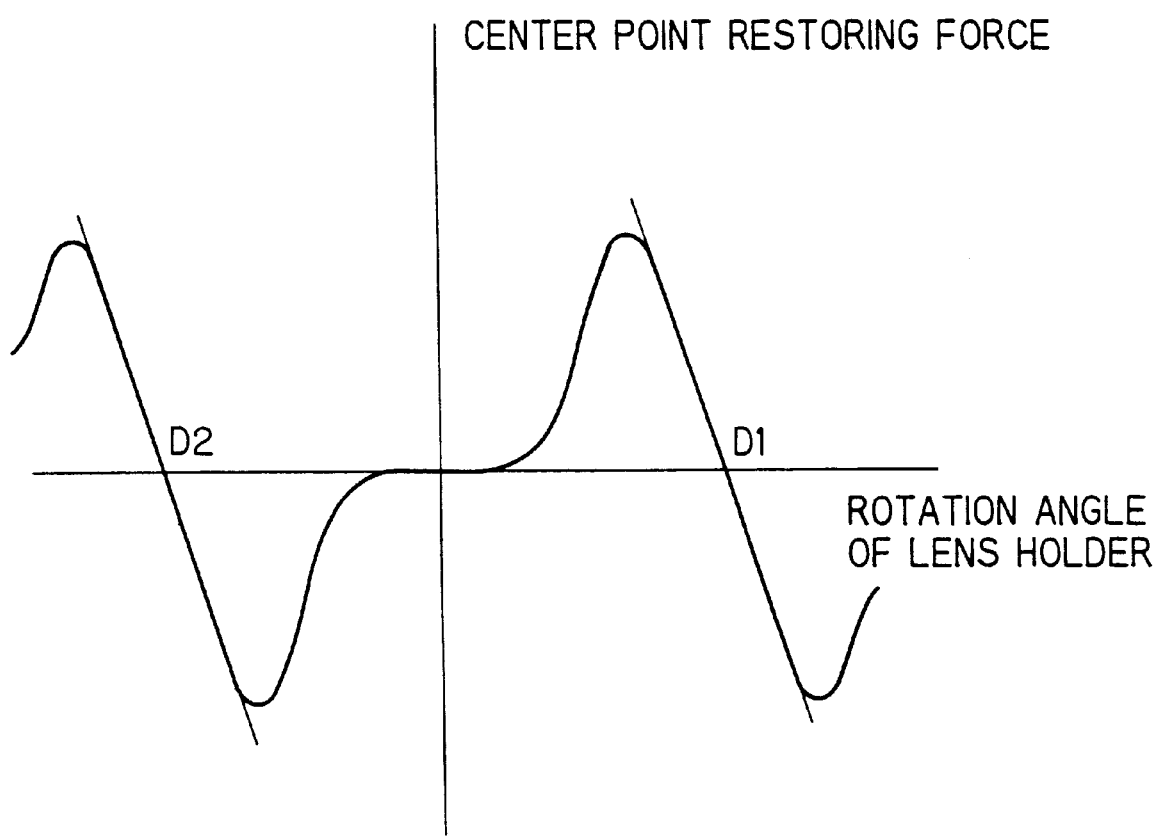
FIG. 8 is a diagram showing the relation between the rotation angle of the lens holder and the restoring force occurring in the tracking direction in the objective lens driving device of the second preferred embodiment of the present invention.

FIG. 6 is an exploded perspective view showing an objective lens driving device 100A in a second preferred embodiment of the present invention, FIG. 7 is a plan view showing the objective lens driving device 100A in the second preferred embodiment of the present invention, and FIG. 8 is a diagram showing the relation between the rotation angle of the lens holder and the restoring force occurring in the tracking direction in the objective lens driving device 100A in the second preferred embodiment of the present invention. In the figures, the same reference characters are allotted to the same or corresponding parts as or to those in FIG. 1–FIG. 5, FIG. 67–FIG. 70.

Here, 17a, 17b, 17c, 17d are magnetic pieces, which are fixed to the lens holder in the polarization direction of the tracking magnets.

<2-2. Device Operation>

Next, the operation will be described. Differences of optical information recording medium (not shown) are detected by means for detecting differences in thickness, recording density, etc. of the medium, and a corresponding objective lens is selected. (The objective lens 4 in FIG. 7) Then, the objective lens 4 is disposed in the light beam 2 by the means shown in the first preferred embodiment. When the objective lens 4 is located almost in the center of the light beam, the magnetic pieces 17b, 17c are located almost in the center of the tracking magnets 107a and 107b (at the point with the maximum magnetic flux density), and the magnetic pieces 17a and 17d are located where almost no magnetic field of the tracking magnets exists. When an optical information recording medium with different substrate thickness and recording density is set, the objective lens 3 is selected, and when the objective lens 3 is located almost in the center of the light beam 2, the magnetic pieces 17a and 17d are located almost in the center of the tracking magnets 107a and 107b, and the magnetic pieces 17b and 17c are located where almost no magnetic field of the tracking magnets exists.

When one of the objective lenses is selected, one set of the magnetic pieces is located to face the tracking magnets, so that a predetermine center point restoring force is generated. This is the same when the other objective lens is selected, but the center point restoring force is not generated during the operation of selecting an objective lens because any set of the magnetic pieces is not located between the tracking magnets.

Accordingly, if the axis of abscissas indicates the moved angel of the objective lens and the axis of ordinates indicates the center point restoring force, the rotation angle of the lens holder and the restoring force has a relation as shown in FIG. 8. Other operations are the same as those shown in the first preferred embodiment.

3. Third Preferred Embodiment
<3-1. Device Structure>

Figure 9:
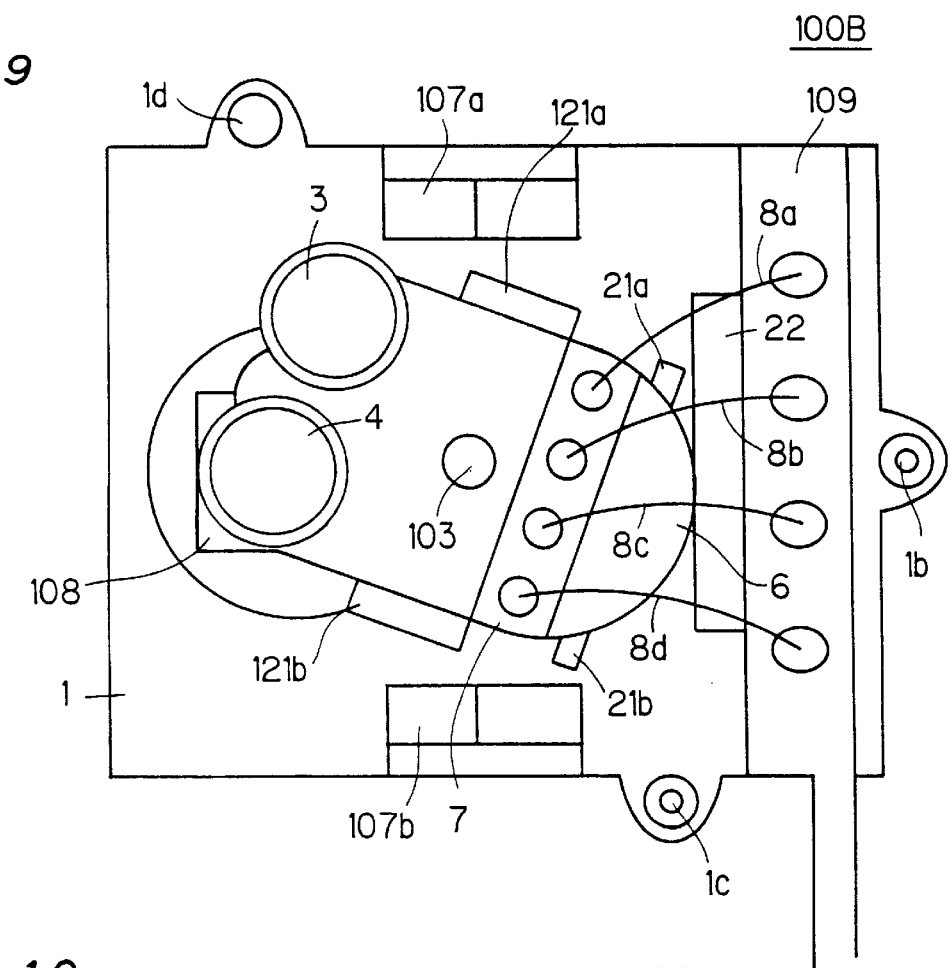
FIG. 9 is a plan view showing an objective lens driving device of a third preferred embodiment of the present invention.

FIG. 9 is a plan view showing an objective lens driving device 100B in a third preferred embodiment of the present invention. In the figure, the same reference characters are allotted to the same or corresponding parts in FIG. 1–FIG. 5, FIG. 67–FIG. 70.

The reference characters 21a and 21b are fins projecting from the lens holder 6, and 22 is a wall provided on the fixing base 1.

<3-2. Device Operation>

Next, the operation will be described. When an optical information recording medium is set in the optical information recording/regenerating device, means not shown distinguishes difference in substrate thickness and recording density of the medium and an objective lens corresponding to that kind of medium is selected. When the selected objective lens does not exist in the light beam 2, the lens holder 6 is rotated around the supporting shaft 103 with an electromagnetic force to move the corresponding objective lens into the light beam 2. At this time, if the objective lens is turning more than needed, the fin 21a (or the fin 21b when it turns in the opposite direction) provided on the lens holder 6 comes in contact with the wall 22 to limit further turn. Other operations are the same as those described in the first or second preferred embodiment of the present invention.

4. Fourth Preferred Embodiment
<4-1. Device Structure>

Figure 10:
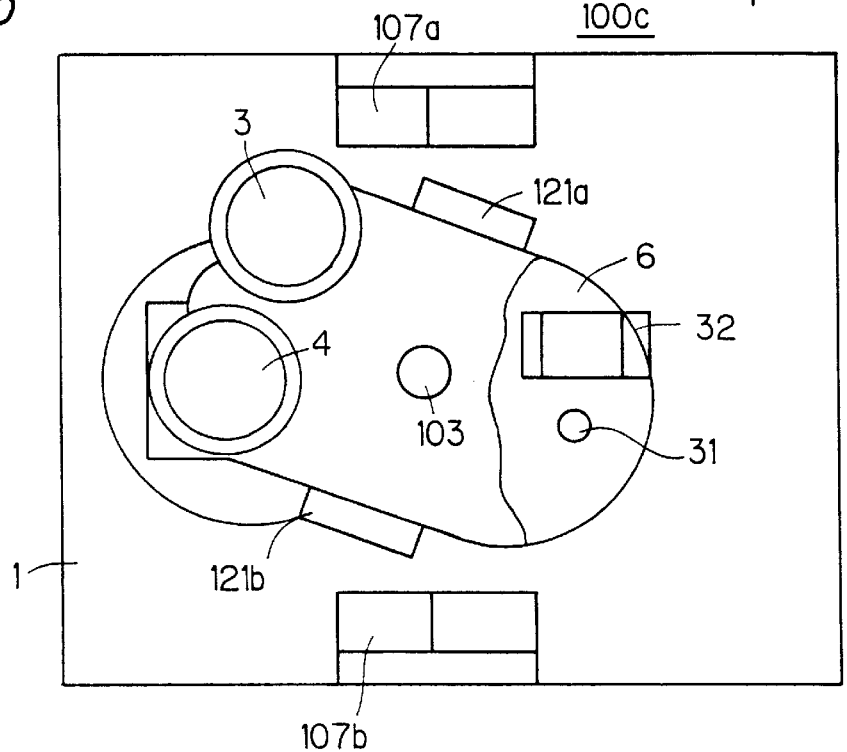
FIG. 10 is a plan view showing an objective lens driving device of a fourth preferred embodiment of the present invention.
Figure 11:
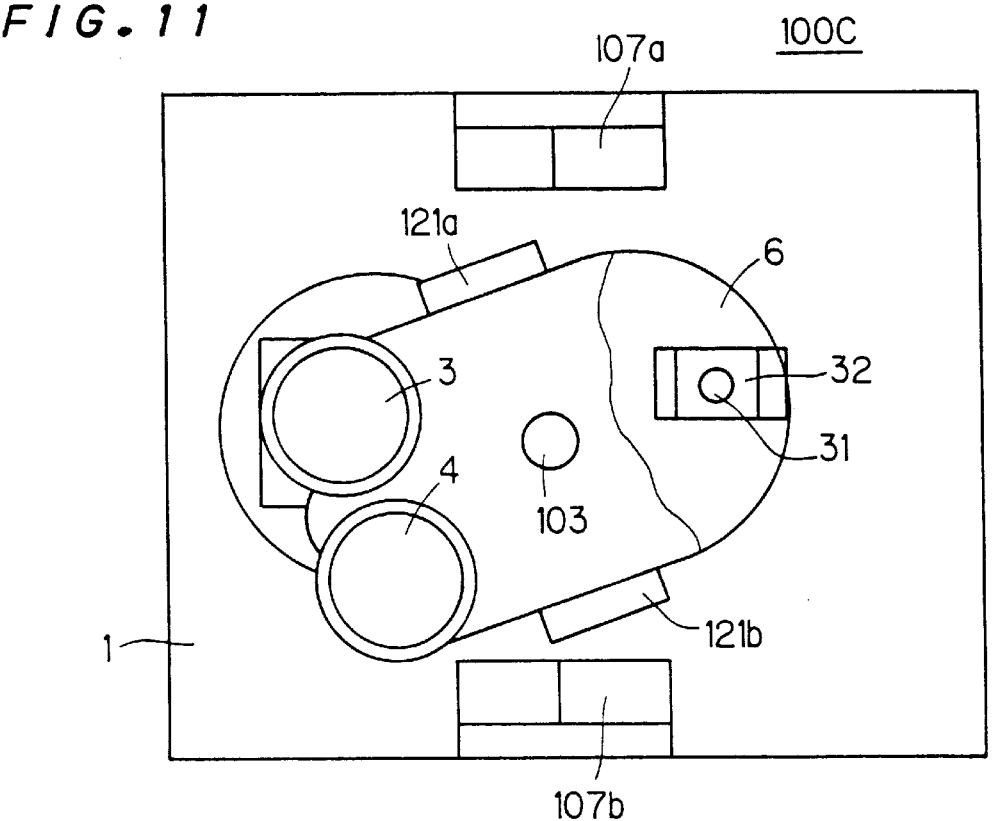
FIG. 11 is a plan view showing the objective lens driving device in the fourth preferred embodiment of the present invention.

FIG. 10 and FIG. 11 are plan views showing an objective lens driving device 100C in a fourth preferred embodiment of the present invention. In the figures, the same reference characters are allotted to the same or corresponding parts in FIG. 1–FIG. 9, FIG. 67–FIG. 70.

The reference character 31 is a fin projecting from the bottom of the lens holder 6, and 32 is a position detecting sensor provided on the fixing base 1 to be located under the lens holder 6.

<4-2. Device Operation>

Next, the operation will be described. When an optical information recording medium is set in the optical information recording/regenerating device, means not shown distinguishes differences in substrate thickness and recording density of the medium and an objective lens corresponding to that kind of medium is selected. When the selected objective lens does not exist in the light beam 2, the lens holder 6 is rotated around the supporting shaft 103 with an electromagnetic force to move the corresponding objective lens into the light beam 2. When the objective lens 3 is selected, the fin 31 is located inside the position detecting sensor 32. On the other hand, when the objective lens 4 is selected, the fin 31 is located out of the position detecting sensor 32. Accordingly, it can be detected from output of the position detecting sensor 32 which of the objective lenses is currently selected. Other operations are the same as those in the first preferred embodiment, the second preferred embodiment, or the third preferred embodiment of the present invention.

5. Fifth Preferred Embodiment
<5-1. Device Structure>

Figure 12:
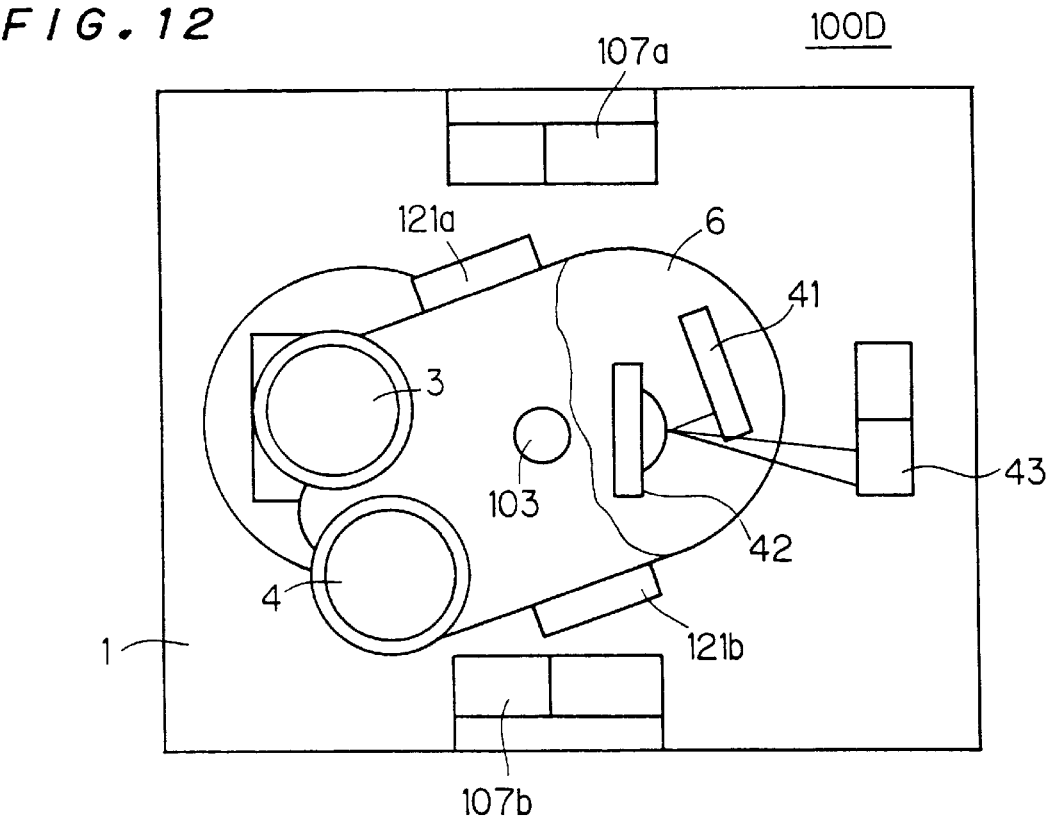
FIG. 12 is a plan view showing an objective lens driving device in a fifth preferred embodiment of the present invention.

FIG. 12 is plan view showing an objective lens driving device 100D in a fifth preferred embodiment of the present invention. In the figure, the same reference characters are allotted to the same or corresponding parts in FIG. 1–FIG. 11, FIG. 67–FIG. 70.

The reference character 41 is a fin projecting from the bottom of the lens holder 6, and 42, 43 are a light source and 2-segment photodetector located under the lens holder 6 and provided on the fixing base 1 with the fin 41 interposed therebetween.

<5-2. Device Operation>

Next, the operation will be described. When the lens holder 6 turns around the supporting shaft 103, the fin portion 41 of the lens holder 6 moves and then the amount of light incident upon respective parts of the photodetector 43 divided in the direction vertical to the track of the optical information recording medium varies according to the moved amount. The turning position of the lens holder 6 can be obtained on the basis of signal output of the 2-segment photodetector 43. On the basis of the information, it can be detected which objective lens is currently selected. Other operations are the same as those in the first preferred embodiment or the second preferred embodiment, the third preferred embodiment of the present invention.

Furthermore, it is also possible to electrically provide a restoring force to the objective lenses on the basis of the signal output of the 2-segment photodetector 43.

6. Sixth Preferred Embodiment

<6-1. Device Structure>

Figure 13:
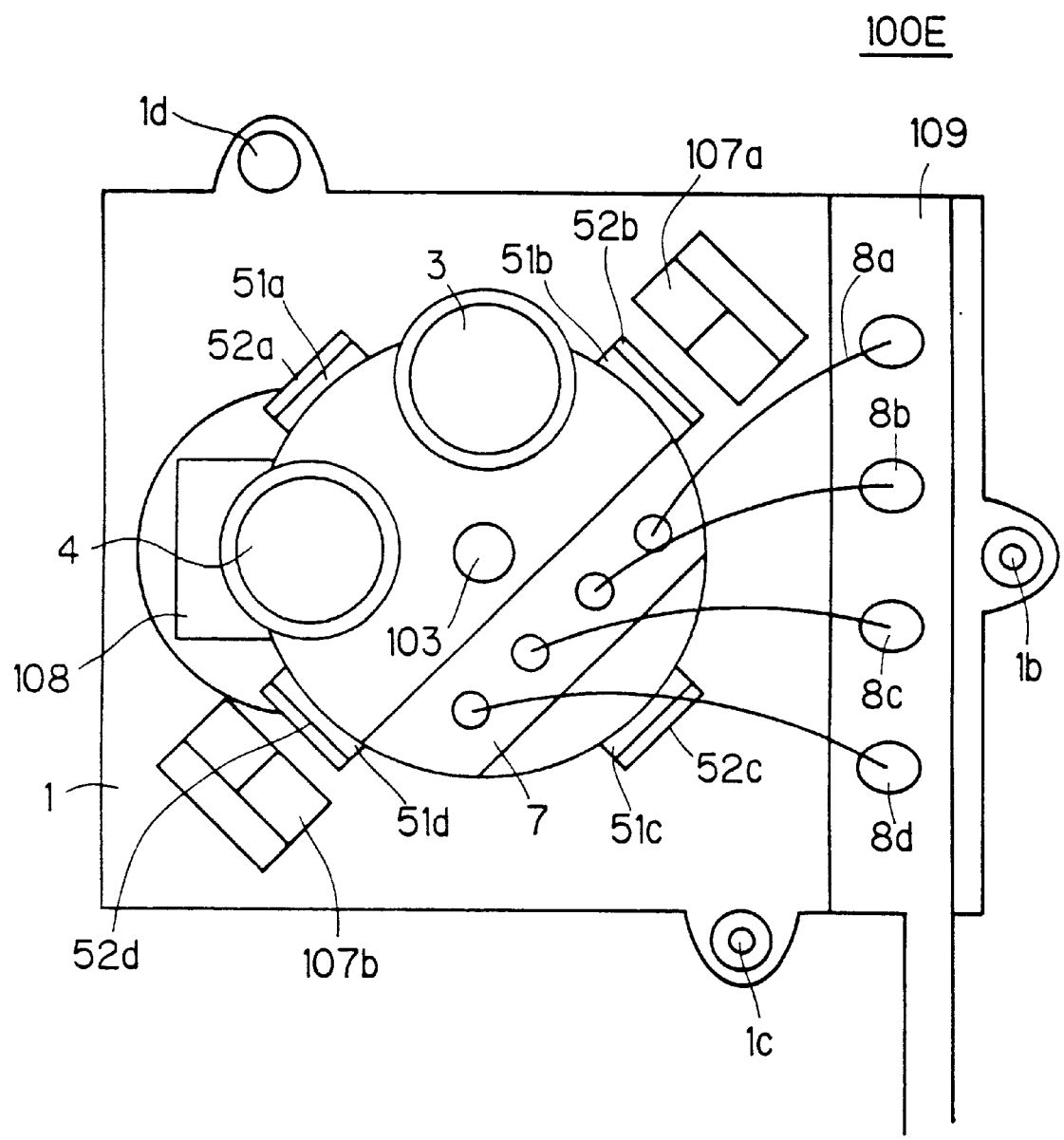
FIG. 13 is a plan view showing an objective lens driving device in a sixth preferred embodiment of the present invention.

FIG. 13 is a plan view showing an objective lens driving device 100E in a sixth preferred embodiment of the present invention. In the figure, the same reference characters are allotted to the same or corresponding parts in FIG. 1–FIG. 12, FIG. 67–FIG. 70.

The reference characters 51a, 51b, 51c and 51d are tracking coils fixed to the lens holder 6 and 52a, 52b, 52c and 52d are magnetic pieces fixed to the lens holder 6, placed on the tracking coils.

<6-2. Device Operation>

Next, the operation will be described. When an optical information recording medium is set in the optical information recording/regenerating device, means not shown distinguishes differences in substrate thickness and recording density of the medium and an objective lens corresponding to each kind of medium is selected. The tracking coils 51a and 51c are disposed to face the tracking magnets 107a and 107b when the objective lens 3 is selected. Accordingly, at that time, the lens holder is turned by the electromagnetic interaction of the tracking coils 51a, 51c and the tracking magnets 107a, 107b. When the objective lens 4 is selected, the tracking coils 51b, 51d are disposed to face the tracking magnets 107a, 107b, and the lens holder is turned by the electromagnetic interaction of the tracking coils 51b, 51d and the tracking magnets 107a, 107b.

A restoring force is provided to the lens holder by the magnetic pieces 52a and 52c when the objective lens 3 is selected, and by the magnetic pieces 52b and 52d when the objective lens 4 is selected. Other operations are the same as those in the first preferred embodiment or in the second preferred embodiment of the present invention.

In the controlling operation, current may be applied to all of the tracking coils 51a, 51b, 51c and 51d, or coils to be supplied with current may be selectively switched.

7. Seventh Preferred Embodiment

<7-1. Device Structure>

Figure 14:
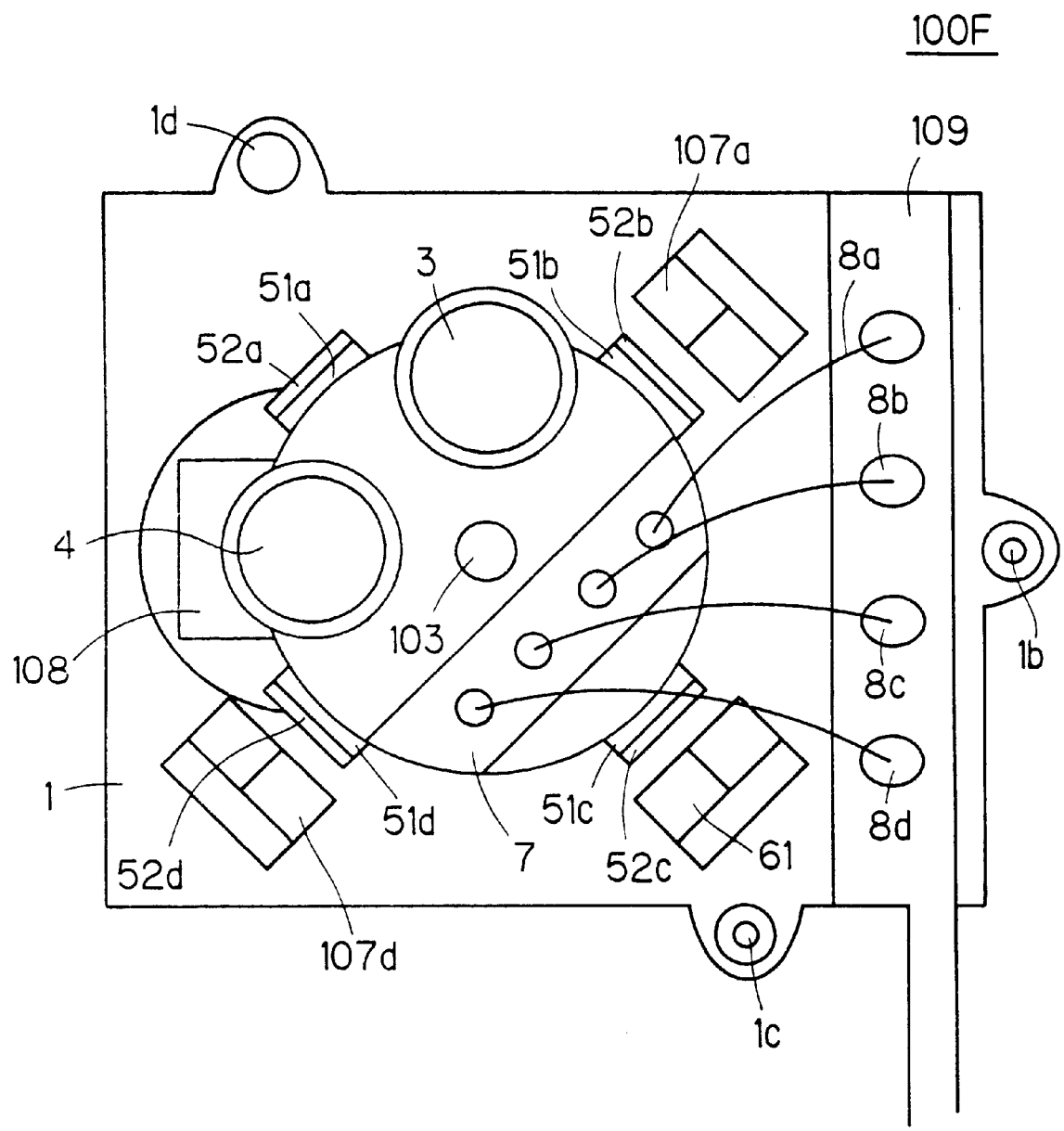
FIG. 14 is a plan view showing an objective lens driving device in a seventh preferred embodiment of the present invention.

FIG. 14 is a plan view showing an objective lens driving device 100F in a seventh preferred embodiment of the present invention. In the figure, the same reference characters are allotted to the same or corresponding parts in FIG. 1–FIG. 13, FIG. 67–FIG. 70.

The reference character 61 denotes a magnet provided on the fixing base 1 and bipolar-magnetized in the width direction.

<7-2. Device Operation>

Next, the operation will be described. When an optical information recording medium is set in the optical information recording/regenerating device, means not shown distinguishes differences in substrate thickness and recording density of the medium and an objective lens corresponding to that kind of medium is selected. When the selected objective lens does not exist in the light beam 2, the lens holder 6 is rotated around the supporting shaft 103 with an electromagnetic force to move the corresponding objective lens into the light beam 2. At that time, current is also passed to the tracking coil facing the magnet 61 in addition to the tracking coil facing the tracking magnets 107a, 107b to produce a driving force. Other operations are the same as those in the sixth preferred embodiment of the present invention.

8. Eighth Preferred Embodiment

<8-1. Device Structure>

Figure 15:
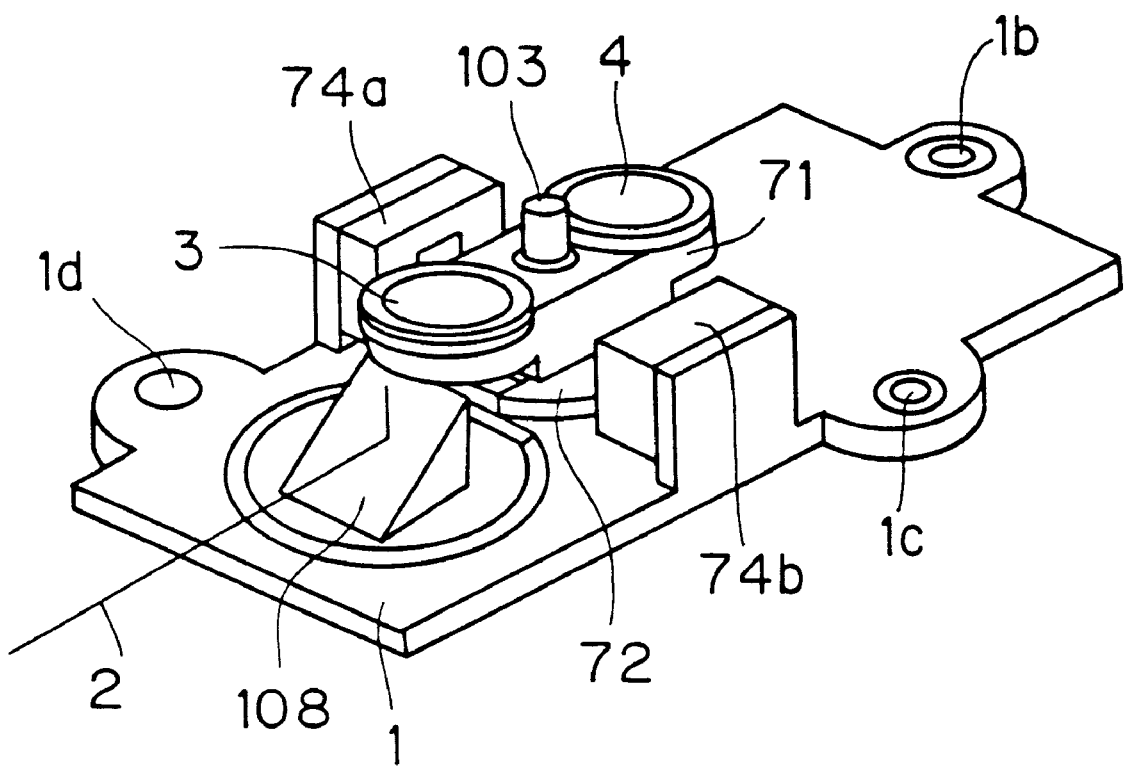
FIG. 15 is a perspective view showing an objective lens driving device in an eighth preferred embodiment of the present invention.
Figure 16:
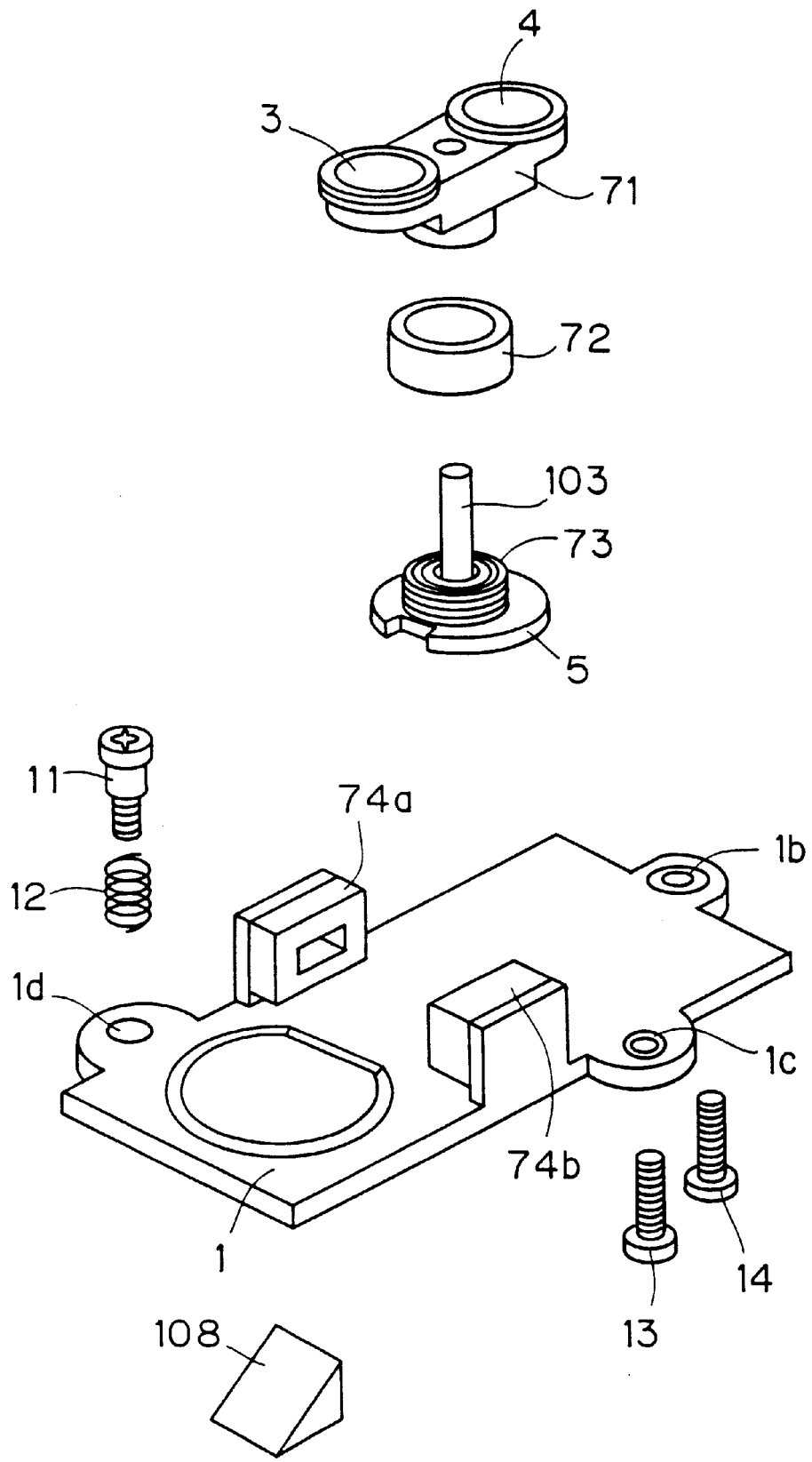
FIG. 16 is an exploded perspective view showing the objective lens driving device in the eighth preferred embodiment of the present invention.

FIG. 15 is a perspective view showing an objective lens driving device 100G in an eighth preferred embodiment of the present invention and FIG. 16 is an exploded perspective view of the objective lens driving device 100G in the eighth preferred embodiment of the present invention. In the figures, the same reference characters are allotted to the same or corresponding portions in FIG. 1–FIG. 14, FIG. 67–FIG. 70.

The reference character 71 denotes a lens holder formed of a plastic material, or the like, with light weight and high toughness, which holds a plurality of objective lenses in positions almost symmetrical about the supporting shaft 103. The lens holder 71 is provided with a bearing portion having its axis almost parallel to the optical axes of the objective lenses 3 and 4.

The reference character 72 denotes a ring-like magnet fixed to the lens holder 71 coaxially with the bearing portion, which is, for example, a magnet multipolar-magnetized in the diameter direction like a motor.

The reference character 73 is a focusing coil fixed to the supporting shaft holding base 5, which is disposed in a magnetic circuit formed of the magnet 72 and the supporting shaft holding base 5. 74a and 74b denote tracking coils fixed on the fixing base 1, which are disposed in a magnetic circuit formed of the magnet 72 and the fixing base 1.

<8-2. Device Operation>

Next, the operation will be described. While the magnet is provided on the fixed side and the coil on the movable side is supplied with current to achieve movement of an objective lens corresponding to each medium, focusing control, and tracking control in the first preferred embodiment of the present invention, the coil is provided on the fixed side and the magnet is provided on the movable side in the eighth preferred embodiment of the present invention, where the lens holder 71 is rotated by 180° to switch the objective lenses 3 and 4 to adapt to different optical information recording media. Other operations are the same.

9. Ninth Preferred Embodiment

<9-1. Device Structure>

Figure 17:
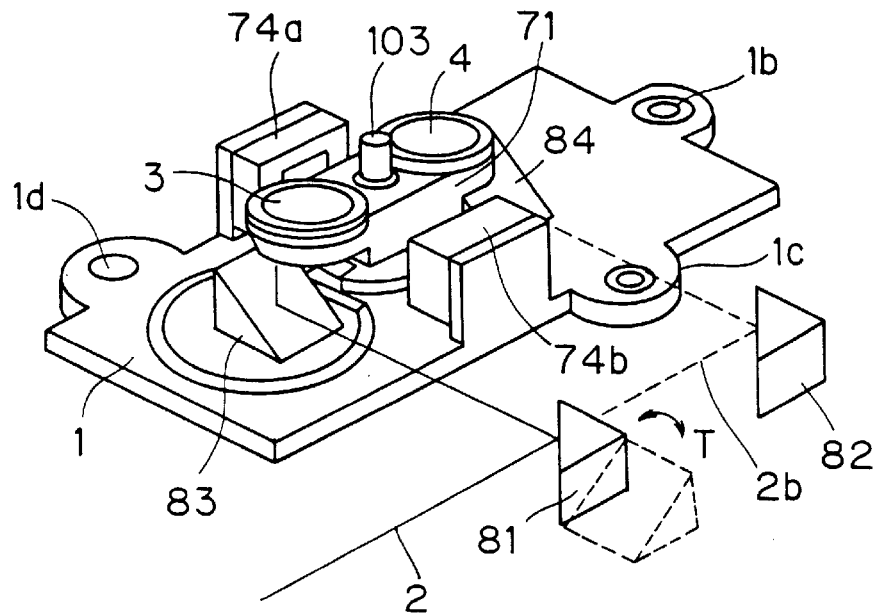
FIG. 17 is a perspective view showing an objective lens driving device in a ninth preferred embodiment of the present invention.

FIG. 17 is a perspective view showing an objective lens driving device 100H in a ninth preferred embodiment of the present invention. In the figure, the same reference characters are allotted to the same or corresponding parts in FIG. 1–FIG. 16. FIG. 67–FIG. 70.

The reference character 81 denotes a sending up mirror which reflects the light beam 2 in a direction almost parallel to the optical information recording medium surface, which is disposed to be turnable in the direction of the arrow T by driving means not shown. The reference character 82 is also a sending up mirror which reflects the light beam 2 in the direction almost parallel to the optical information recording medium surface, and 83 and 84 are sending up mirrors which direct the light beam 2 in the vertical direction.

<9-2. Device Operation>

Next, the operation will be described. When an optical information recording medium is set in the optical information recording/regenerating device, means not shown distinguishes the differences in substrate thickness and recording density of the medium and an objective lens corresponding to each kind of medium is selected. When the objective lens 3 is selected, the light beam 2 is reflected at the mirror 81 and is further reflected in the vertical upward direction at the mirror 83 to enter the objective lens 3, and then it forms a light spot on the optical information recording medium. Operations after that are the same as those in the eighth preferred embodiment.

When the objective lens 4 is selected, the mirror 81 is turned in the direction of the arrow T by driving means not shown to withdraw from in the light beam, so that the light beam 2 goes straight forward. Then, the light beam 2 is reflected at the mirror 82, and further led up by the mirror 84 in the vertical upward direction to enter the objective lens 4, thus forming a light spot on the optical information recording medium. As it has movable mirrors 81 and 82 and also has the mirrors 83 and 84 in correspondence to the objective lenses 3 and 4, it is not necessary to turn the lens holder 71.

10. Tenth Preferred Embodiment

<10-1. Device Structure>

Figure 18:
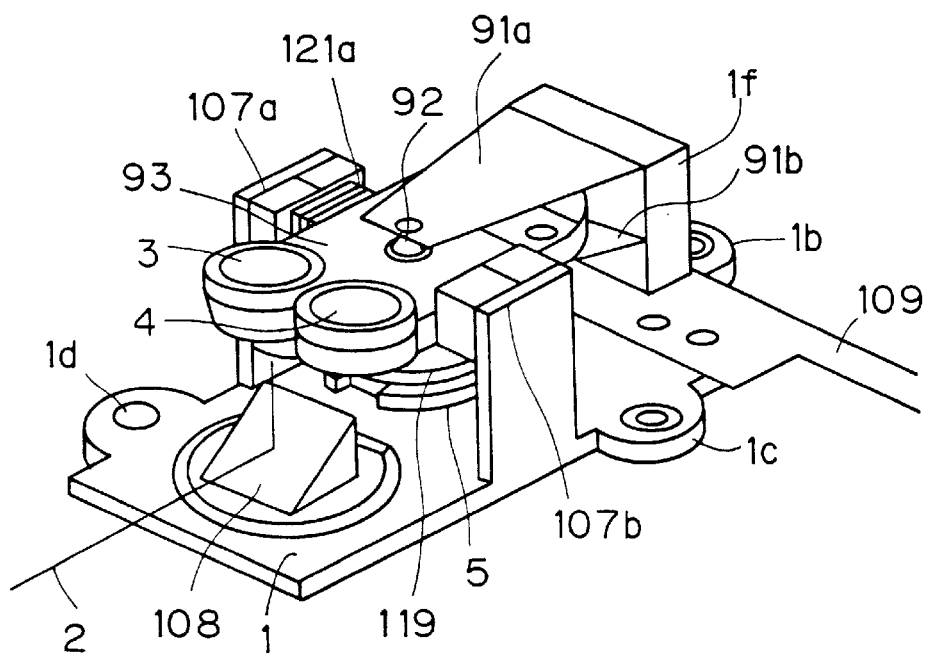
FIG. 18 is a perspective view showing an objective lens driving, device in a tenth preferred embodiment of the present invention.

FIG. 18 is a perspective view showing an objective lens driving device 100I in a tenth preferred embodiment of the present invention. In the figure, the same reference characters are allotted to the same or corresponding parts in FIG. 1–FIG. 17, FIG. 67–FIG. 70.

The reference character if denotes a spring supporting stand provided on the fixing base 1. The reference characters 91a and 91b denote plate springs each having one end fixed to the spring supporting stand 1f, extending almost parallel to the optical information recording medium surface, and disposed so that the lens holder 93 is vertically interposed therebetween. 92 denotes a pivot bearing provided on the plate springs 91a and 91b for supporting the lens holder 93 turnable.

<10-2. Device Operation>

Next, the operation will be described. As the plate springs 91a and 91b is structured as described above, lens holder 93 is moved in the vertical direction almost parallel to the optical axis of the objective lens by the electromagnetic force when desired current is applied to the focusing coil 119 to perform focusing control.

When a desired current is applied to the tracking coils 121a and 121b, lens holder 93 turns around the pivot bearing with the electromagnetic force to perform tracking control and to move the corresponding objective lens into the light beam. Other operations are the same as those in the first preferred embodiment.

Although the above-described preferred embodiment has shown the structure in which the lens holder is interposed between the plate springs through the pivot bearing, it is needless to say that the same effects are obtained with a structure in which the spring supporting stand itself is pinched by the fixing base through a pivot bearing with the plate springs fixed to the lens holder, the spring supporting stand itself being rotatable around the pivot bearing, with a plurality of objective lenses provided at almost equal distances from the pivot bearing.

11. Eleventh Preferred Embodiment

<11-1. Device Structure>

Figure 19:
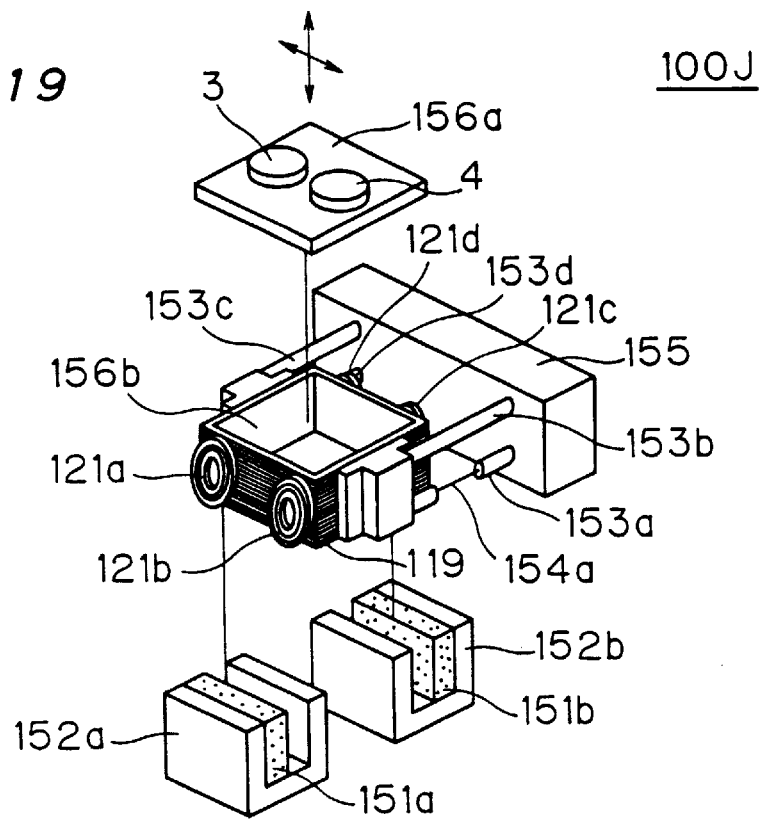
FIG. 19 is an exploded perspective view showing an objective lens driving device in an eleventh preferred embodiment of the present invention.

FIG. 19 is an exploded perspective view showing an objective lens driving device 100J in an eleventh preferred embodiment of the present invention. In the figure, the same reference characters are allotted to the same or corresponding parts in FIG. 1–FIG. 17, FIG. 67–FIG. 70.

The reference characters 151a and 151b denote magnets, 152a and 152b denote yokes, 153a, 153b, 153c and 153d denote hollow and cylindrical rubber dampers, and 154a denotes a wire provided in the rubber damper 153a. In FIG. 19, to clearly show the wire 154a, the rubber damper 153a is partially removed. Similarly, wires 154b–154d are provided in the rubber dampers 153b–153d, but which are not shown. 155 is a supporting plate and 156a and 156b are objective lens holders. 119 is a focusing coil wound around the outer wall surface of the box-like objective lens holder 156b, and 121a–121d are tracking coils disposed upon the focusing coil 119.

<11-2. Device Operation>

Next, the operation will be described. When predetermine current is passed through the tracking coils 121a–121d and the focusing coil 119, the holders 156a, 156b are moved up and down and right and left with the interaction of the magnets 151a, 151b and the yokes 152a, 152b, and the tracking error and the focusing error of the objective lenses 3 and 4 provided on the objective lens holder 156a can be corrected. When the objective lenses 3 and 4 are selected according to kinds of the optical information recording media as in other preferred embodiments, the same effects are obtained.

12. Twelfth Preferred Embodiment

<12-1. Device Structure>

Figure 20:
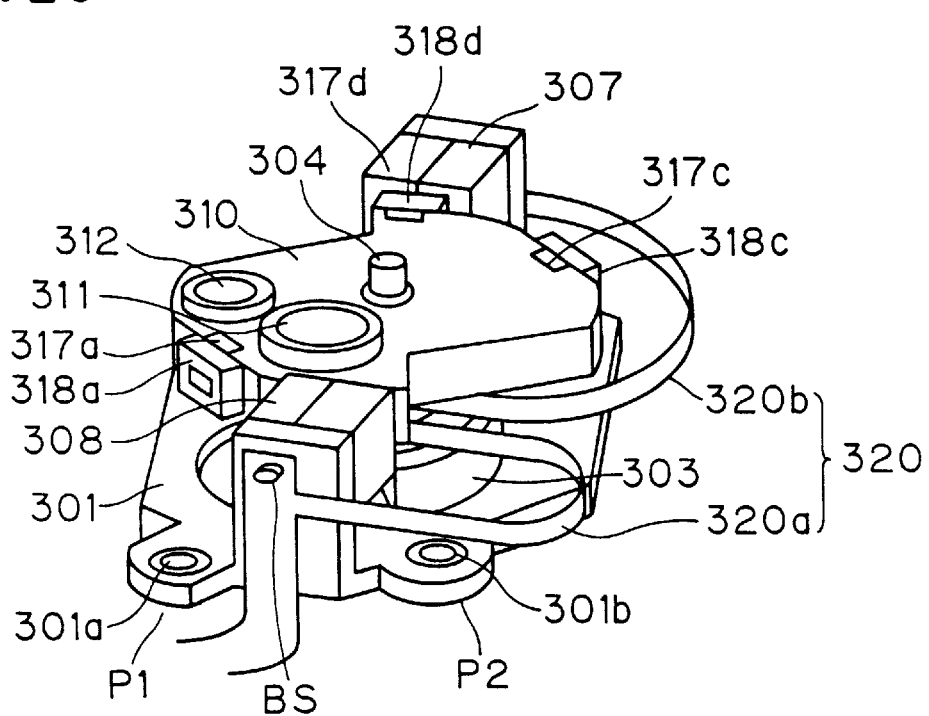
FIG. 20 is a perspective view showing an objective lens driving device in a twelfth preferred embodiment of the present invention.
Figure 21:
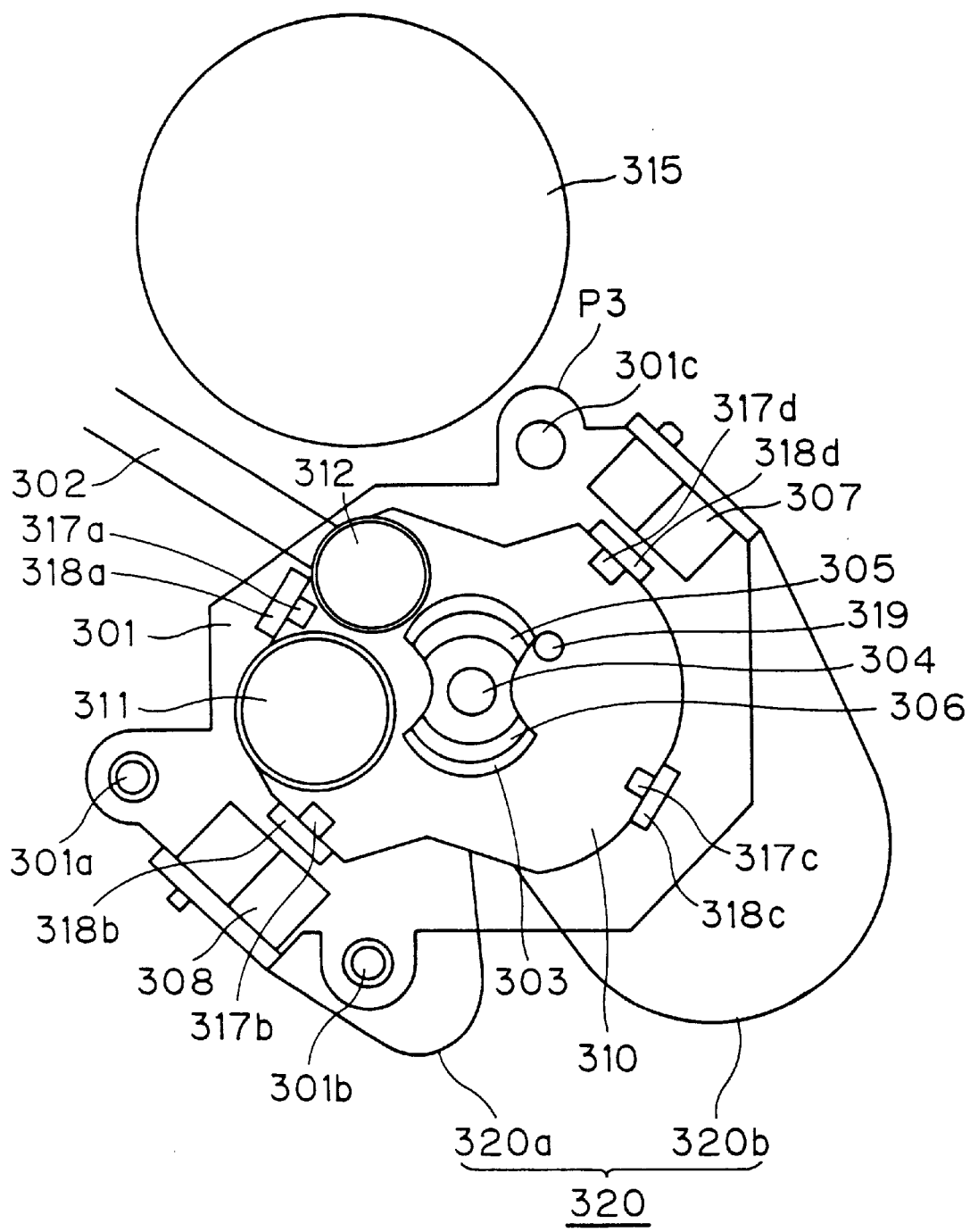
FIG. 21 is a plan view showing the objective lens driving device in the twelfth preferred embodiment of the present invention.
Figure 22:
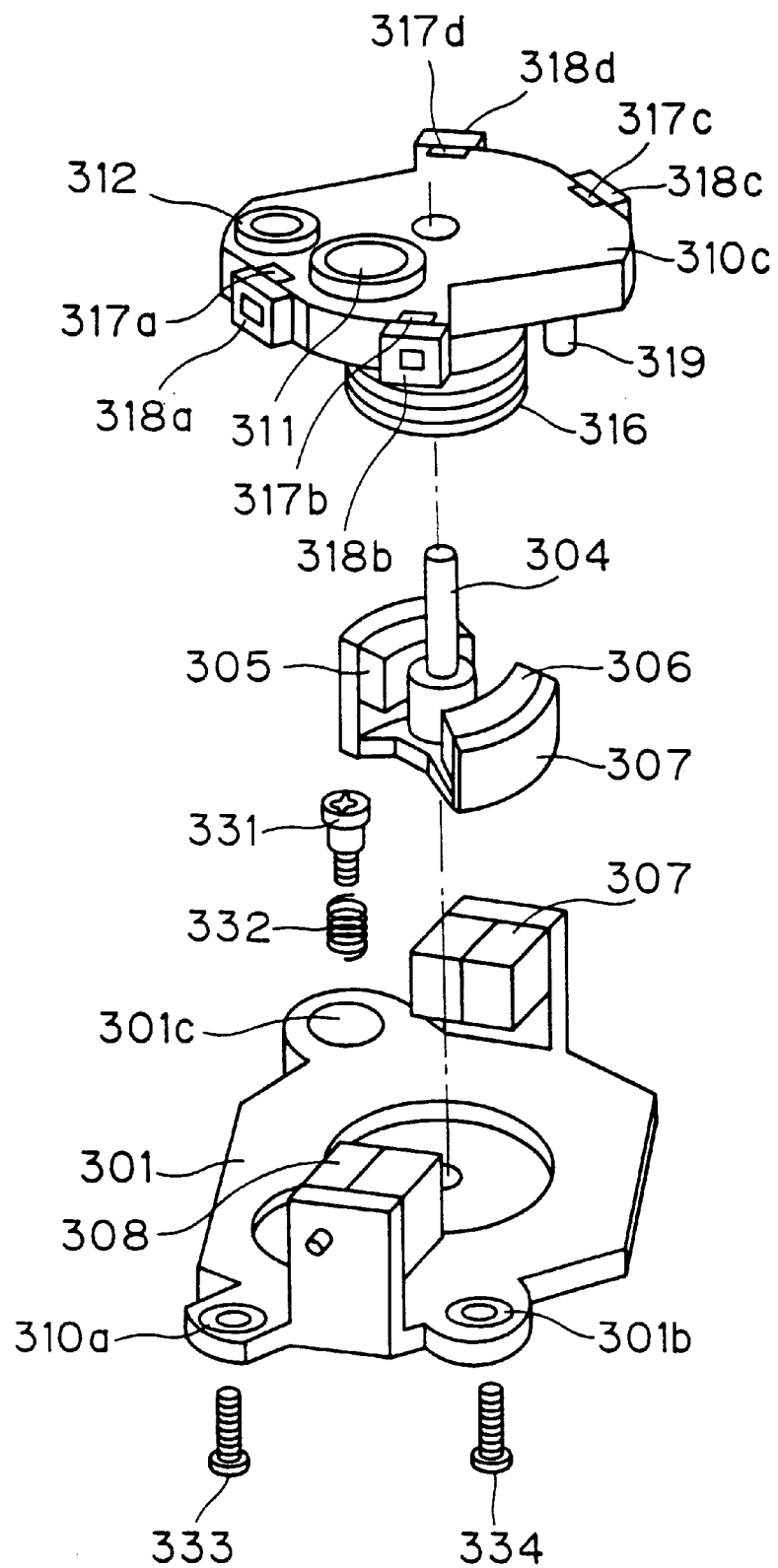
FIG. 22 is an exploded perspective view showing the objective lens driving device in the twelfth preferred embodiment of the present invention.
Figure 23:
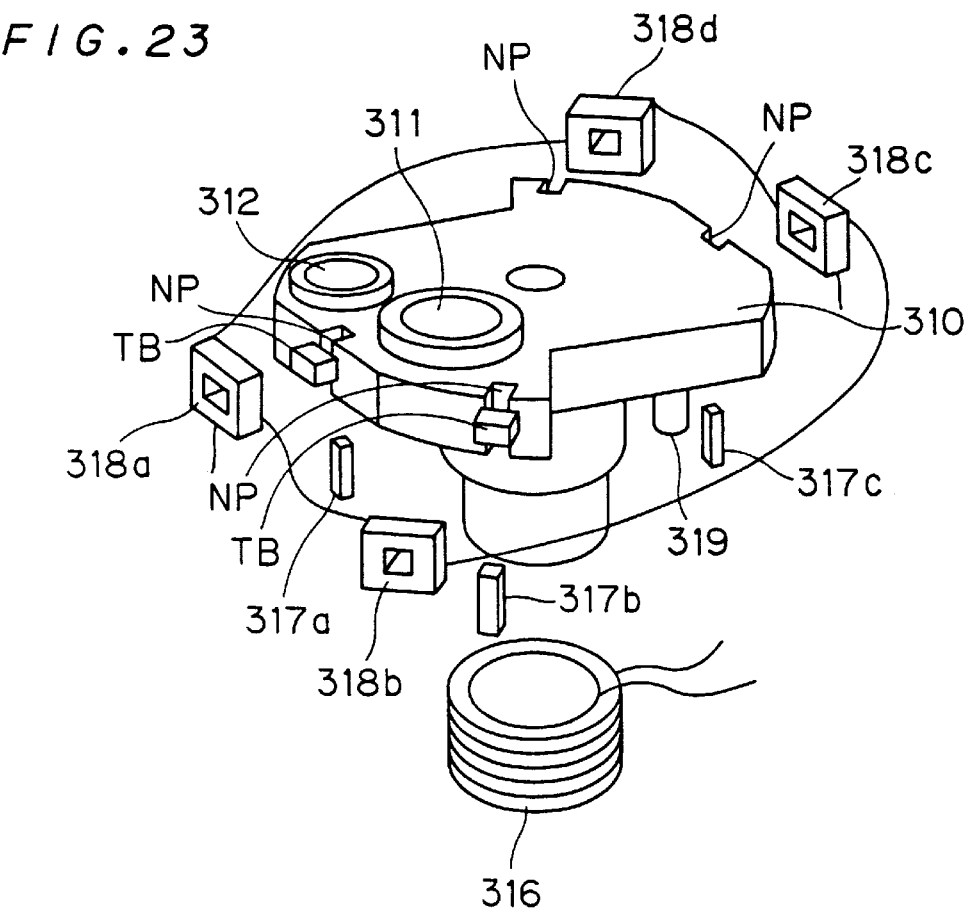
FIG. 23 is an exploded perspective view of the movable portion of the objective lens driving device in the twelfth preferred embodiment of the present invention.
Figure 24:
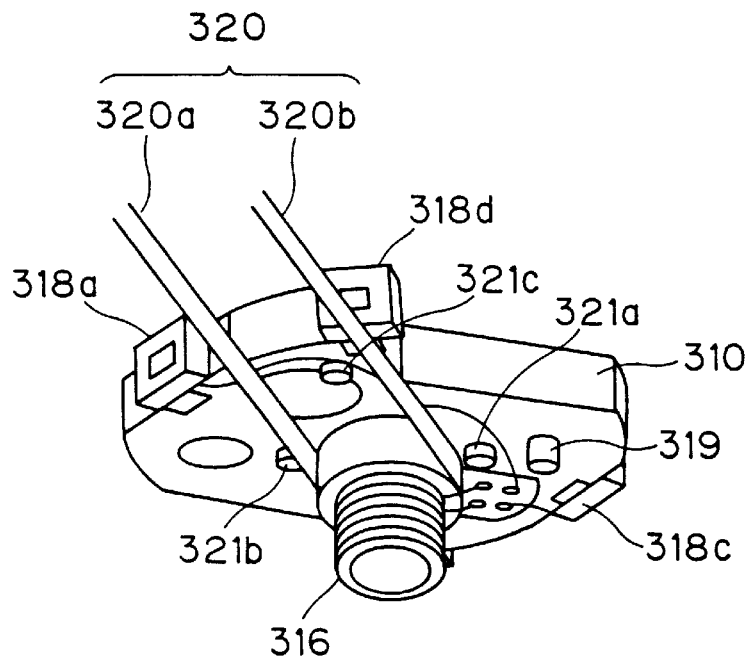
FIG. 24 is a perspective view showing the movable portion of the objective lens driving device seen from the back in the twelfth preferred embodiment of the present invention.
Figure 25:
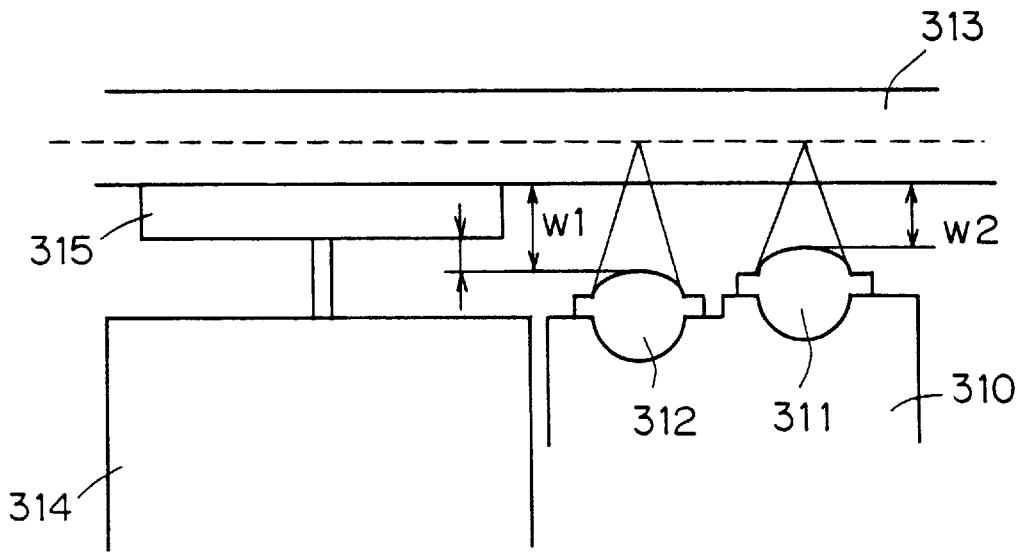
FIG. 25 is a diagram showing the relation between the objective lenses and the disk motor and the turntable holding the optical information recording medium of the objective lens driving device in the twelfth preferred embodiment of the present invention.
Figure 26:
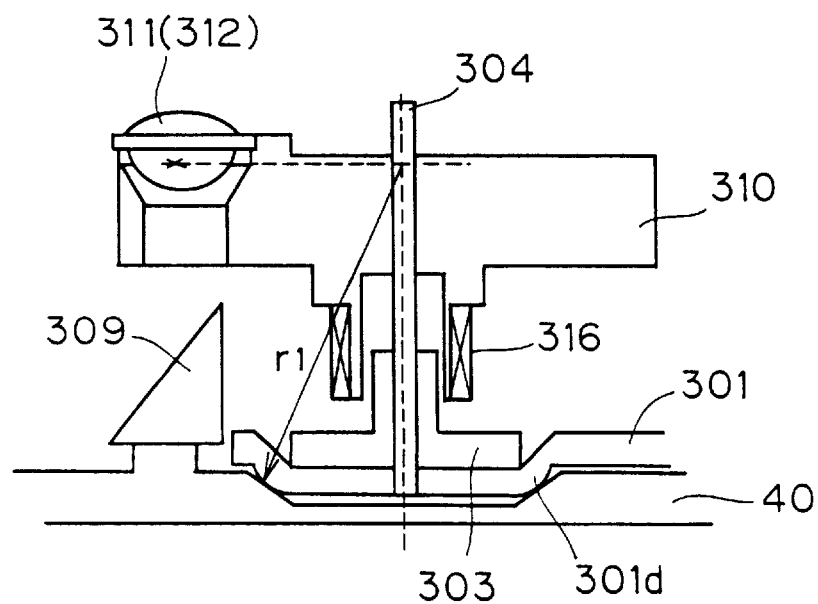
FIG. 26 is a sectional view of the important part of the objective lens driving device in the twelfth preferred embodiment of the present invention.
Figure 27:
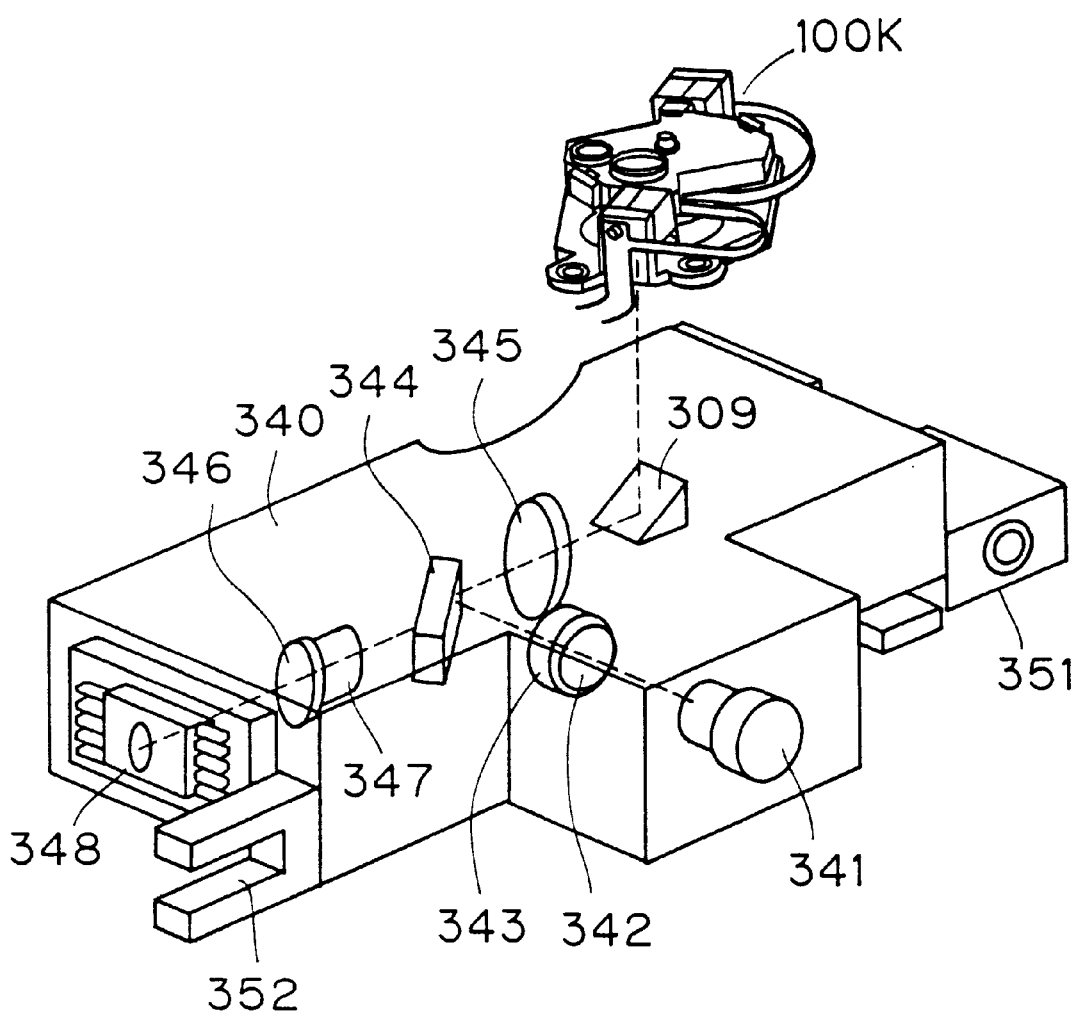
FIG. 27 is a perspective view of an important part of an optical information recording/regenerating device having the objective lens driving device in the twelfth preferred embodiment of the present invention.
Figure 28:
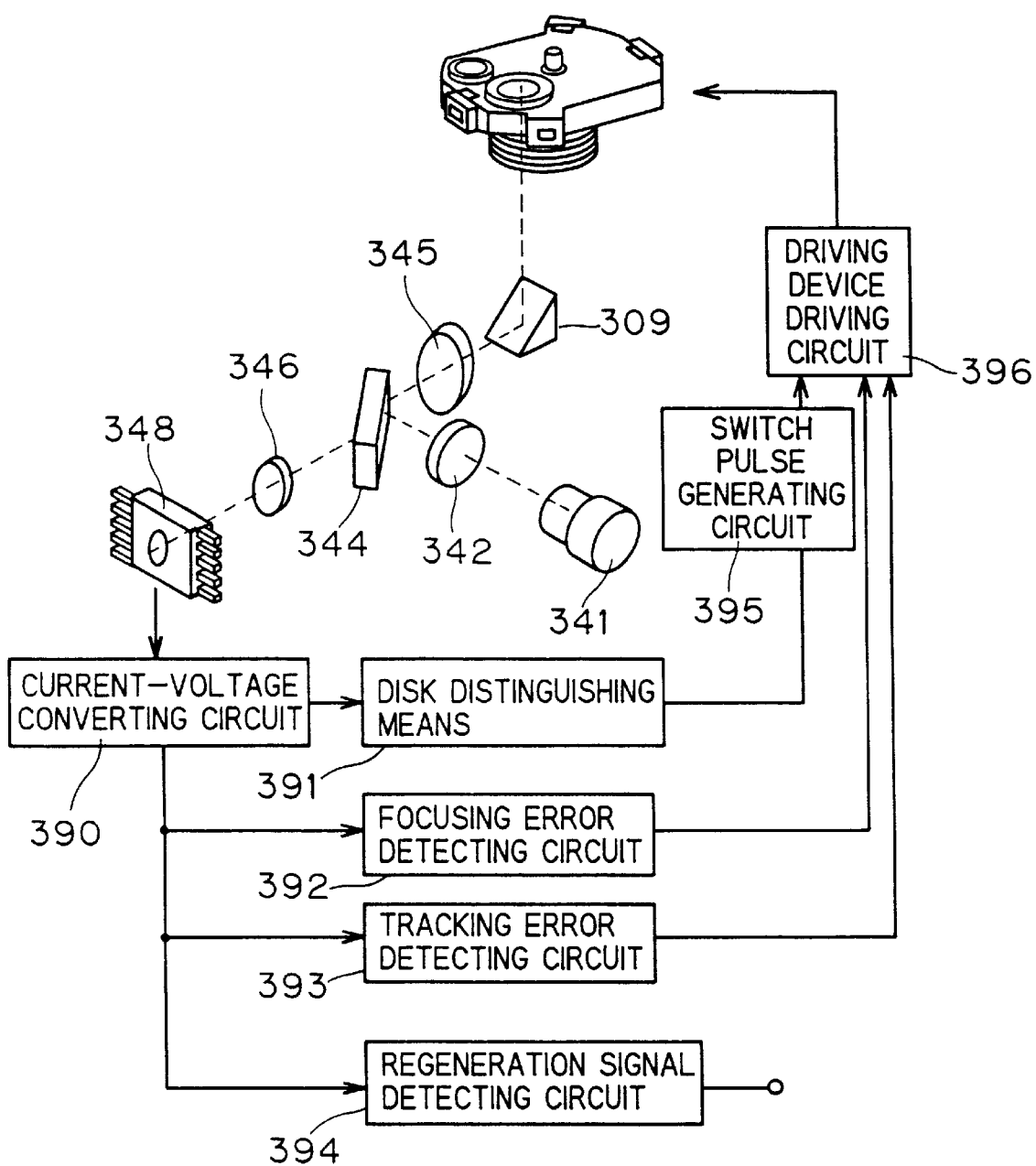
FIG. 28 is a diagram showing the structure of the optical information recording/regenerating device.
Figure 29A:
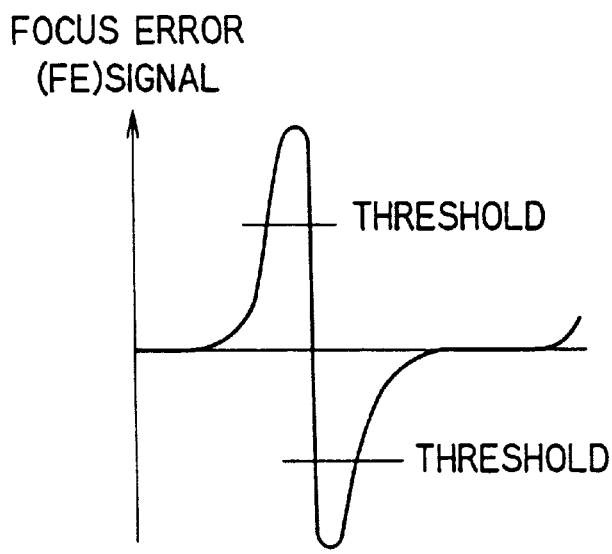
FIG. 29(a) and FIG. 29(b) are diagrams for illustrating an example of means for determining a kind of the optical information recording medium.
Figure 29B:
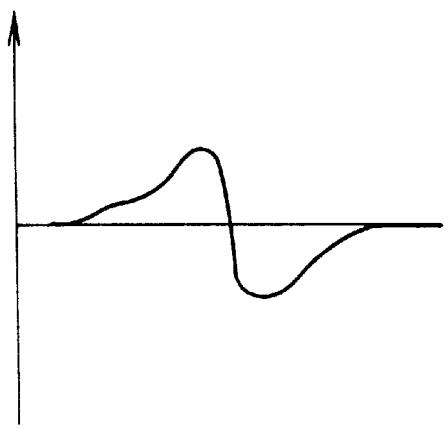

FIG. 20 is a perspective view showing an objective lens driving device 100K in a twelfth preferred embodiment of the present invention, and FIG. 21 is a plan view showing the objective lens driving device 100K in the twelfth preferred embodiment of the present invention, which shows a lens holder described later partially in a perspective view. FIG. 22 is an exploded perspective view showing the objective lens driving device 100K in the twelfth preferred embodiment of the present invention, FIG. 23 is an exploded perspective view of the movable portion of the objective lens driving device 100K in the twelfth preferred embodiment of the present invention, and FIG. 24 is a perspective view seen from the back of the movable portion of the objective lens driving device 100K in the twelfth preferred embodiment of the present invention. FIG. 25 is a diagram showing the relation between the objective lenses and the disk motor and the turntable holding the optical information recording medium of the objective lens driving device 100K in the twelfth preferred embodiment of the present invention. FIG. 26 is a sectional view showing an important part of the objective lens driving device 100K in the twelfth preferred embodiment of the present invention. FIG. 27 is a perspective view of an important part of an optical information recording/regenerating device having the objective lens driving device 100K of the twelfth preferred embodiment of the present invention, and FIG. 28 is a diagram showing the structure of the optical information recording /regenerating device in the twelfth preferred embodiment of the present invention. FIG. 29 is a diagram illustrating a method of distinguishing kinds of the optical information recording media.

In FIG. 20 to FIG. 26, 301 is a first fixing base formed of a magnetic material, which has projections P1 and P2 having screw portions 301a and 301b. It also has a projection P3 and a through hole 301c in the vicinity of the bottom in the direction almost opposite to the sum of the vector directed from the supporting shaft 304 to 301a and the vector directed to 301b. Also, a spherical portion 301d is provided as shown in FIG. 26 in the bottom of the first fixing base 301. As shown in FIG. 26, the center of the spherical portion 301d is provided in the vicinity of the intersection of a plane parallel to the optical information recording medium including the principal point of the objective lens and the axis line. 302 is a light beam.

The reference character 303 denotes a second fixing base, which holds the lower end of the supporting shaft 304 coated with fluororesin with a small frictional coefficient. 305 and 306 are focusing magnets magnetized in the direction parallel to the optical information recording medium, which are bonded and fixed to the second fixing base 303. As shown in FIG. 26, the portion where the spherical portion 301*d* is formed in the first fixing base 301 forms a step sinking from the portion around it, and the second fixing base 303 is bonded and fixed utilizing this step. The height of this step is equal to or larger than the thickness of the bottom of the second fixing base 303.

The reference characters 307 and 308 are tracking magnets bipolar-magnetized in the right and left direction, which are bonded and fixed to the first fixing base 301. 309 is a sending up mirror which reflects in the vertical direction the light beam 302 incident from the front.

The reference character 310 is a lens holder formed of a plastic material with light weight and high stiffness, for example, which holds the objective lenses 311 and 312 corresponding to a plurality of optical information recording media with different substrate thicknesses in positions eccentrically displaced from the supporting shaft 304 by almost equal distances so that the two are positioned as close as possible. The lens holder 310 is provided with a bearing portion having its center axis almost parallel to the optical axes of the objective lenses 311 and 312.

As shown in FIG. 25, when the objective lenses 311 and 312 corresponding to generally different kinds of optical information recording media are provided in positions where they condense the light beam 2 onto the optical information recording media, the distances from the lower surface of the media (called working distances) W1 and W2 differ. 313 is a disk-like optical information recording medium, 314 is a disk motor which rotates the optical information recording medium, and 315 is a turntable which holds the optical information recording media rotatable. The objective lenses 311 and 312 are bonded and fixed to the lens holder 310 so that one having a larger working distance is positioned closer to the turntable 315, i.e., positioned in the inner side of the optical information recording medium.

The objective lenses 311 and 312 corresponding to generally different kinds of optical information recording media have different outside diameters. The objective lenses 311 and 312 are bonded and fixed to the lens holder 310 so that one having a smaller outside diameter is positioned closer to the turntable 315, i.e., in the inner side of the optical information recording medium.

The reference numeral 316 is a focusing coil which is bonded and fixed to the lens holder 310 coaxially with the bearing portion, which is disposed in the magnetic gap formed by the second fixing base 303 and the focusing magnets 305 and 306.

The lens holder 310 has four notch portions NP, into which magnetic pieces 317*a*, 317*b*, 317*c* and 317*d* are inserted and bonded to be fixed. The positions where the magnetic pieces 317*a* and 317*b*, and 317*c* and 317*d* are fixed are disposed at the almost same angle as the angle between the objective lenses 311 and 312 about the supporting shaft 304, respectively. The positions where the magnetic pieces 317*a* and 317*c*, and 317*b* and 317*d* are fixed are disposed at the almost same angle as the angle between the tracking magnets 307 and 308 about the supporting shaft 304, respectively.

Furthermore, tracking coil fixing bosses TB are formed in the lens holder 310 across the notches. The tracking coils 318*a*, 318*b*, 318*c*, and 318*d* are positioned to the tracking coil fixing bosses TB, and bonded and fixed. The positions where the tracking coils 318*a* and 318*b*, and 318*c* and 318*d* are fixed are disposed at the almost same angle as the angle between the objective lenses 311 and 312 about the supporting shaft 304. The positions where the tracking coils 318*a* and 318*c*, and 318*b* and 318*d* are fixed are disposed at the almost same angle as the angle between the tracking magnets 307 and 308 about the supporting shaft 304, respectively. The tracking coils 318*a*–318*d* are formed by continuous winding, which are connected in series. The line length between each tracking coil is set longer than the distance between the tracking coil fixing bosses TB.

A projection 319 is provided on the back of the lens holder 310. The projection 319 is disposed at a position so that it gets in contact with the second fixing base 303 when the lens holder 310 turns.

The reference character 320 denotes power supplying means for supplying driving current to the focusing coil and the tracking coil provided on the lens holder 310, which is formed of a flexible printed wiring board using a flexible insulating board. The power supplying means 320 is divided into the power supplying means 320*a* and 320*b*, whose ends are positioned and fixed in the vicinity of the center of gravity of the movable portion in the vicinity of the upper end of the cylindrical portion holding the focusing coil provided on the back of the lens holder 310 and electrically connected to end lines of the focusing coil and the tracking coil by soldering, or the like. The lens holder 310 has a projection 321*c*, which is for drawing the end line so that it will not intercept the hole for passage of the light beam.

Bosses 321*a* and 321*b* integrally formed with the lens holder are provided in the periphery of the portion where the power supplying means 320 is fixed. The other end of each power supplying means 320*a*, 320*b* is positioned and fixed at the boss BS provided on the side wall of the first fixing base 301. Furthermore the power supplying means 320*a* and 320*b* are formed almost symmetrical with respect to the line connecting the supporting shaft 304 and the center between the objective lenses 311 and 312. The power supplying means 320 is formed to have a plane in the direction vertical to the optical information recording medium.

The reference character 331 is a special screw having a screw at its end and a cylindrical portion with a diameter larger than that of the screw portion, 332 is a spring, and 333 and 334 are screws.

<12-2. Device Operation>

Next, the operation will be described. When an optical information recording medium is set in the optical information recording/regenerating device, distinguishing means not shown distinguishes the kind of the optical information recording medium and an objective lens corresponding to that kind is selected (the objective lens 312 in FIG. 21).

Here, an example of distinguishing the optical information recording medium will be described using FIG. 29. FIG. 29 shows a method in which a kind of an optical information recording medium is distinguished by determining if a corresponding objective lens is selected or not when the optical information recording medium is set.

As shown in FIG. 29(*a*), when an objective lens corresponding to the set optical information recording medium is selected, the focusing error signal has an amplitude not less than a predetermine threshold, but if an objective lens not corresponding to the set optical information recording medium is selected, an amplitude just not more than the threshold is obtained as shown in FIG. 29(*b*). Accordingly, by comparing the amplitude of the focusing error signal with a set threshold, it can be determined whether a correct objective lens is selected or not. This method is disclosed in detail in Japanese Patent Laying-Open No. 7-98431, so further explanation is not made herein.

Although the method of automatically distinguishing an optical information recording medium with distinguishing means was shown in the description above, it is not restricted to the automatic distinguishment as long as the distinguished result is provided as electric signal. That is to say, an operator of the optical information recording/regenerating device may set the kind of an optical information recording medium with a switch, button or the like and the electric signal may be provided to the objective lens driving device. Then, an objective lens is selected according to the optical information recording medium of the kind set by the operator.

When the objective lens corresponding to the optical information recording medium exists in the light beam 302, focusing adjusting operation is continuously started. When the corresponding objective lens does not exist in the light beam 302, predetermined current is applied to the tracking coils 318a–318d to turn the lens holder 310 around the supporting shaft 304 with the electromagnetic force obtained by the interaction with the magnetic field produced by the tracking magnets 307 and 308 to move the corresponding objective lens into the light beam 302. At this time, the selected objective lens diaphragms turning in the vicinity of the center of the light beam because of the magnetic force produced by magnetic pieces described later and that position is held. Then, focusing adjusting operation is started.

When a focusing error of a light spot (not shown) is corrected, desired current is applied to the focusing coil 316 to drive the lens holder 310, in turn the objective lens 311 or 312 in the direction vertical to the optical information recording medium with the electromagnetic force obtained by the interaction with the magnetic field produced by the focusing magnets 305 and 306 to achieve control in the focusing direction. When a tracking error of the light spot (not shown) is corrected, predetermine current is applied to the tracking coils 318a–318d to turn the lens holder 310 around the supporting shaft 304 in the direction across the track of the optical information recording medium with the electromagnetic force obtained by the interaction with the magnetic field produced by the tracking magnets 307 and 308 to control the objective lens 311 or 312 in the tracking direction.

The magnetic pieces 317a–317d are disposed in positions where the magnetic flux density is highest in the magnetic field produced by the tracking magnets 307 and 308 when the plurality of objective lenses provided on the lens holder 310 are respectively in the center position of the light beam 302. The magnetic flux density applied to the magnetic material varies as the lens holder 310 moves either in the focusing direction and the tracking direction, and a restoring force is magnetically caused according to the moved amount. Shapes of the magnetic pieces 317a–317d are determined so that linear characteristics are obtained in the range in which track correction of the objective lenses is made (generally about ±0.5 mm).

As the power supplying means 320 is fixed in the vicinity of the center of gravity of the movable portion including the lens holder 310, the repulsion force produced by the power supplying means 320 does not affect the driving of the lens holder even if the lens holder moves. Furthermore, the power supplying means 320 provides damping effect of the movable portion. The bosses 321a and 321b integrally formed with the lens holder 310 restrict the moved amount of the power supplying means 320 and prevent it from pealing off the fixed portion.

The first fixing base 301 is pressed by the special screw 331 and the spring 332 so that the spherical portion 301d and a conical surface of a head base 40 described later are in contact. By adjusting the amount of tightening the screw 334 inserted from the head base 40 side, the inclination of the optical axis of the first fixing base 301, and in turn, of the objective lenses 311 and 312 in the track direction of the optical information recording medium can be adjusted around the center point of the spherical portion 301d. Similarly, by adjusting the amount of tightening the screw 333, the inclination of the optical axis of the first fixing base 301, and in turn, of the objective lenses 311 and 312 in the direction vertical to the track of the optical information recording medium can be adjusted.

In FIG. 27 and FIG. 28, 340 denotes an optical head base, 341 is a semiconductor laser as a light source, which is positioned and fixed to the optical head base 340. 342 is a diffraction grating for splitting the light beam, which is bonded and fixed to a diffraction grating holder 343, and the diffraction grating holder 343 is positioned and fixed rotation-adjustably to the optical head base 340. 344 is a half mirror having a property of reflecting part of incident light beam and transmitting part of it, which is positioned and fixed to the optical head base 340. 345 is a collimator lens having a property of converting divergent light into almost parallel light beam, which is also positioned and fixed to the optical head base 340. 346 is a convergent lens which condenses the light beam and produces astigmatism to generate the focusing error signal. The convergent lens 346 is bonded and fixed to a convergent lens holder 347, and the convergent lens holder 347 is positioned and fixed to the optical head base 340 to be adjustable in the light beam direction. 348 is a photodetector, which has a function of converting the incident light into current according to the light amount. The optical head base 340 has a bearing 351 and a U-shaped portion 352, which is supported by a shaft not shown, and is driven in the direction of the radius of the optical information recording medium by driving means not shown.

The light beam emitted from the semiconductor laser 341 is divided into three beams at the diffraction grating 342, and then reflected by the half mirror 344. The light beam is then converted into parallel light by the collimator lens 345, reflected by the mirror 309 to be incident upon the objective lens provided in the objective lens driving device, and is condensed upon the optical information recording medium. The light beam reflected at the optical information recording medium is transmitted through the half mirror 344 and passed through the convergent lens 346, and then impinges upon the photodetector 348. The current outputted from the photodetector 348 is converted into a voltage at the current-voltage converting circuit 390 and then a regeneration signal is detected by a regeneration signal detecting circuit 394, and the focusing error signal and the tracking error signal are produced by a focusing error detecting circuit 392 and a tracking error detecting circuit 393, on the basis of which the driving device driving circuit 396 is provided with necessary information to drive the objective lens driving device. Furthermore, on the basis of the signal obtained from the photodetector 348, disk distinguishing means 391 distinguishes the optical information recording medium, and predetermine current (voltage) is generated by a switch pulse generating circuit 395 if needed and is inputted to the driving device driving circuit 396, and then the lens holder 310 is turned to select the objective lens.

The magnetic materials 317a–317d are fixed to the lens holder 310 in the above-described twelfth preferred embodiment, but they may be insert-molded into one with the lens holder 310.

13. Thirteenth Preferred Embodiment

Figure 30:
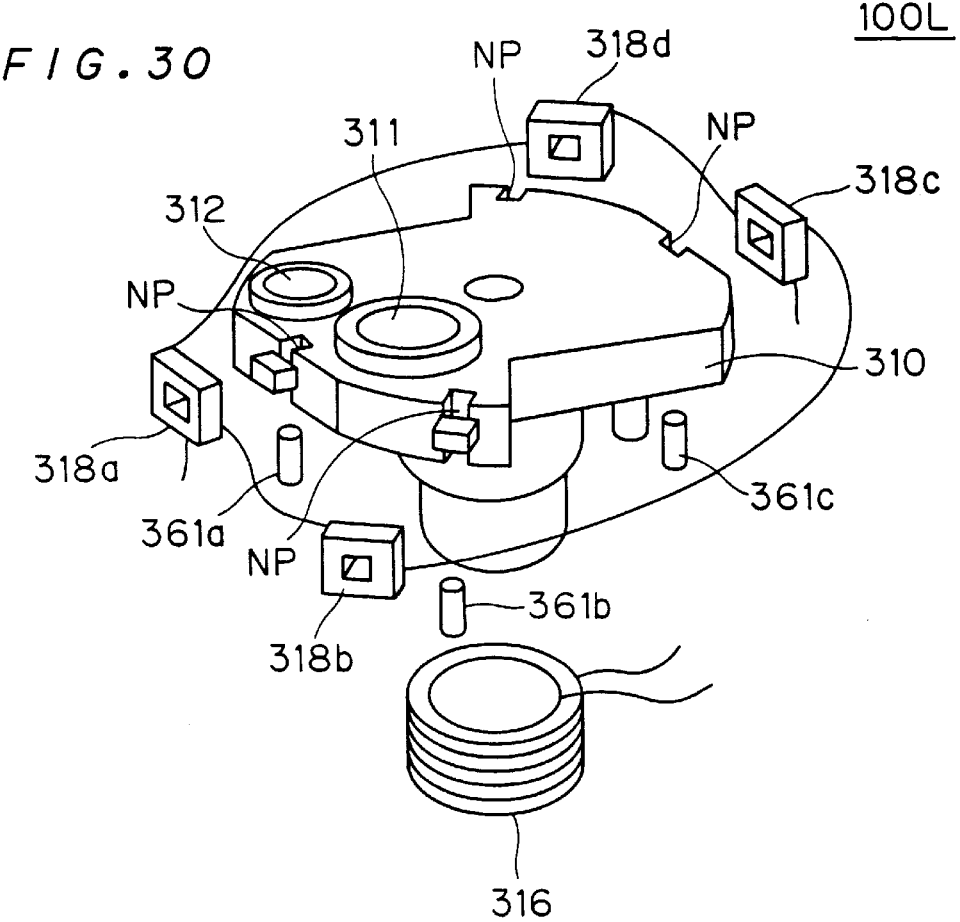
FIG. 30 is a perspective view showing a movable portion of an objective lens driving device in a thirteenth preferred embodiment of the present invention.

FIG. 30 is a perspective view showing a movable portion of an objective lens driving device 100L in a thirteenth preferred embodiment of the present invention. In the figure, the same characters are allotted to the same structures in FIGS. 20–26 and overlapping description is not repeated here.

In FIG. 30, 361*a*, 361*b*, 361*c* and 361*d* are cylindrical magnetic pieces, which are manufactured by cutting an existing pin material, for example. The magnetic materials 361*a*–361*d* are positioned and fixed to the notch portions NP of the lens holder 310. Other structures, operations and effects are completely the same as those of the objective lens driving device 100K

14. Fourteenth Preferred Embodiment

Figure 31:
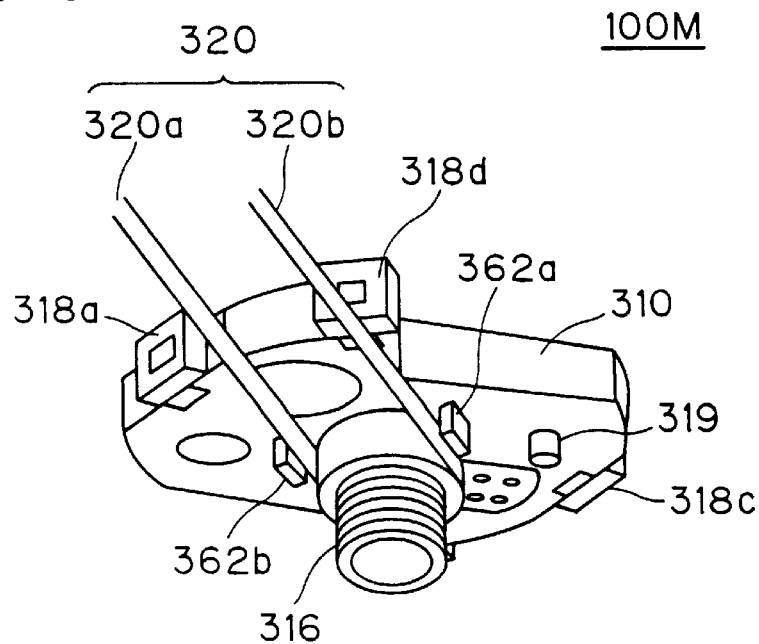
FIG. 31 is a perspective view of the movable portion of an objective lens driving device seen from the back in a fourteenth preferred embodiment of the present invention.

FIG. 31 is a perspective view of a movable portion of an objective lens driving device 100M seen from the back in a fourteenth preferred embodiment of the present invention. In FIG. 31, the same characters are allotted to the same structures in FIG. 20–FIG. 26, and overlapping description is not repeated here.

In FIG. 31, 362*a*, 362*b* are walls projecting around the focusing coil holding portion of the lens holder 310. The power supplying means 320*a* and 320*b* are positioned and fixed in the gaps between the focusing coil holding portion and 362*a*, 362*b*. Other structures, operations and effects are completely the same as those of the objective lens driving device 100K.

15. Fifteenth Preferred Embodiment

Figure 32:
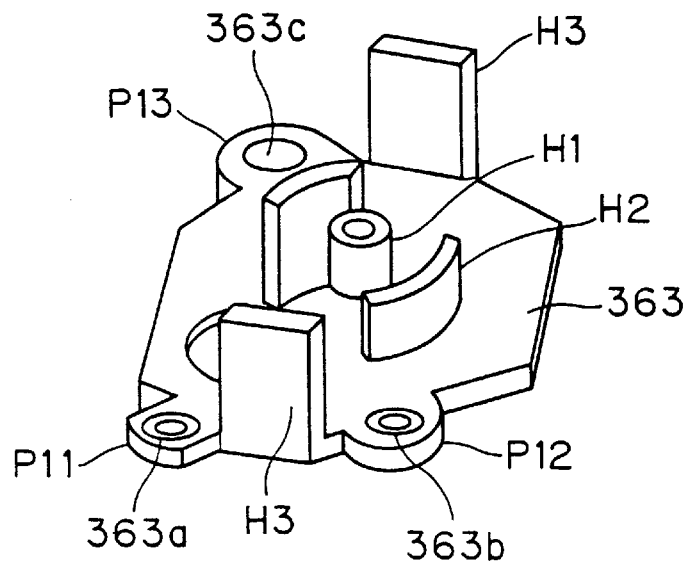
FIG. 32 is a perspective view showing a fixing base of an objective lens driving device in a fifteenth preferred embodiment of the present invention.

FIG. 32 is a perspective view of a fixing base of an objective lens driving device 100N in a fifteenth preferred embodiment of the present invention.

In FIG. 32, 363 denotes a fixing base formed of a magnetic material, which has screw portions 363*a*, 363*b* respectively in projections P11 and P12. It also has a through hole 363*c* formed in a projection P13 in the vicinity of the bottom in the direction almost opposite to the sum of the vector directed from the supporting shaft 304 to the screw portion 363*a* and the vector to the screw portion 363*b*. A spherical portion 363*d* (not shown) is provided on the bottom of the fixing base 363. The center of the spherical portion 363*d* is provided in the vicinity of the intersection of a plane parallel to the optical information recording medium including the principal point of the objective lens and the axis line. A holding portion H1 for the supporting shaft, a holding portion H2 for the focusing magnet, and a holding portion H3 for the tracking magnet are integrally formed to the fixing base 363. The fixing base 363 is formed of a sintered material containing iron. Other structures, operations, and effects are all the same as those of the objective lens driving device 100K.

16. Sixteenth Preferred Embodiment

Figure 33:
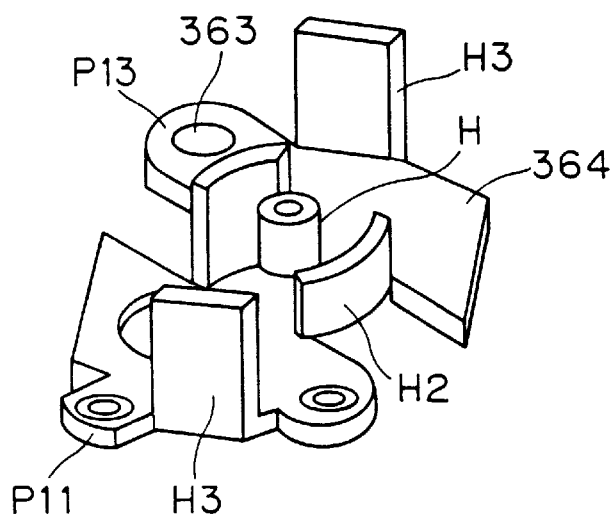
FIG. 33 is a perspective view of a fixing base of an objective lens driving device in a sixteenth preferred embodiment of the present invention.

FIG. 33 is a perspective view of a fixing base of an objective lens driving device 100O in a sixteenth preferred embodiment of the present invention. In FIG. 33, the same characters are allotted to the same structures as those in FIG. 32, and overlapping description is not repeated here.

The reference character 364 denotes a fixing base. While the fifteenth preferred embodiment of the present invention has shown the structure in which the fixing base 363 is formed of a sintered material containing iron, a structure in which it is formed of a sheet metal containing iron is shown in this preferred embodiment.

As it is formed with a sheet metal, the holding portion H2 for the focusing magnet is formed by bending, and the bent portion of the holding portion H2 for the focusing magnet is a notch portion. Other structures, operations and effects are completely the same as those of the objective lens driving device 100K.

17. Seventeenth Preferred Embodiment

Figure 34:
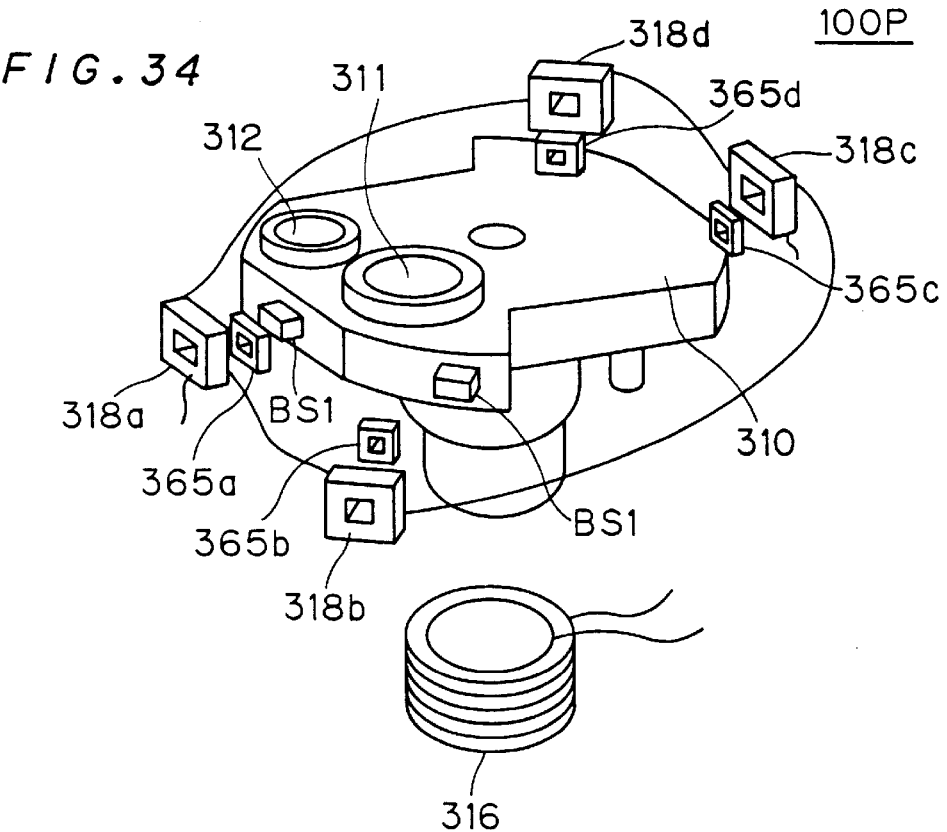
FIG. 34 is a perspective view showing a movable portion of an objective lens driving device in a seventeenth preferred embodiment of the present invention.

FIG. 34 is a perspective view showing a movable portion of an objective lens driving device 100P in a seventeenth preferred embodiment of the present invention. In the figure, the same characters are allotted to the same structures as those in FIG. 20 to FIG. 26 and overlapping description is not repeated here.

In FIG. 34, the lens holder 310 has bosses BS1 formed at a plurality of positions. 365*a*, 365*b*, 365*c* and 365*d* are magnetic pieces having rectangular holes in center portions, which are positioned and fixed to the bosses BS1 of the lens holder. Furthermore, the tracking coils 318*a*–318*d* are positioned and fixed on them with the same bosses. Other structures, operations and effects are completely the same as those of the objective lens driving device 100K

18. Eighteenth Preferred Embodiment

Figure 35:
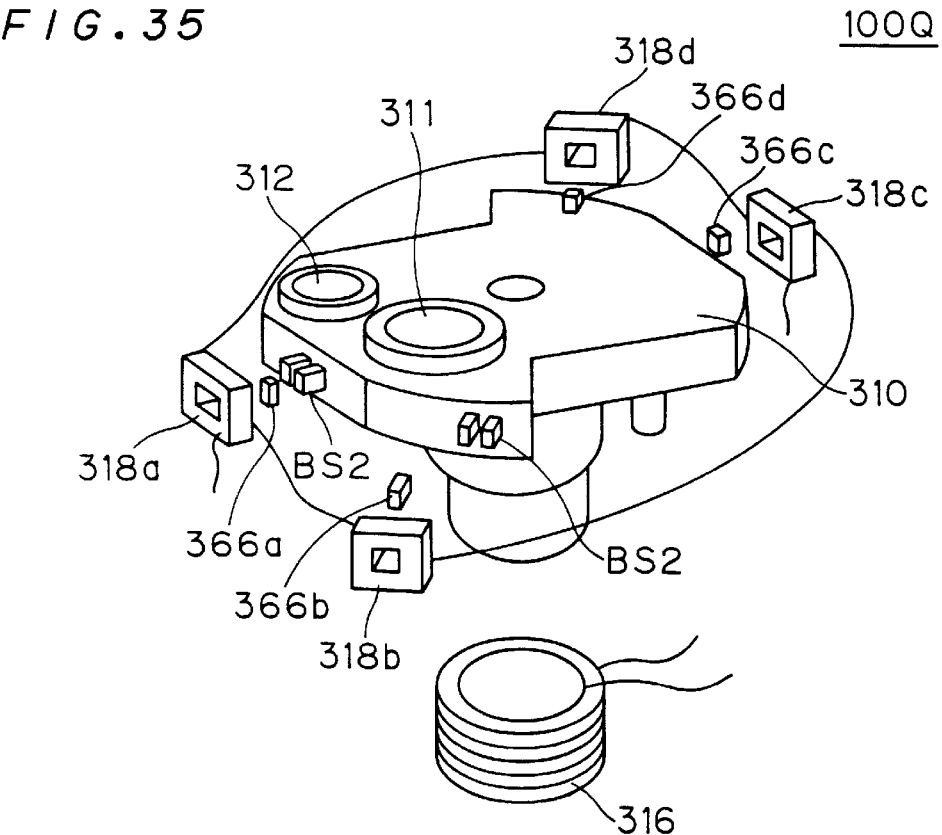
FIG. 35 is a perspective view showing a movable portion of an objective lens driving device in an eighteenth preferred embodiment of the present invention.

FIG. 35 is a perspective view showing a movable portion of an objective lens driving device 100Q in an eighteenth preferred embodiment of the present invention. In the figure, the same characters are allotted to the same structures as those in FIG. 20 to FIG. 26 and overlapping description is not repeated here.

In FIG. 35, the lens holder 310 has a plurality of bosses BS2 having slits in the center. 366*a*, 366*b*, 366*c* and 366*d* are magnetic pieces, which are positioned and fixed to the slits of the bosses BS2 of the lens holder. Furthermore, tracking coils 318*a*–318*d* are positioned and fixed upon them to the bosses BS2. Other structures, operations and effects are completely the same as those of the objective lens driving device 100K.

19. Nineteenth Preferred Embodiment

Figure 36:
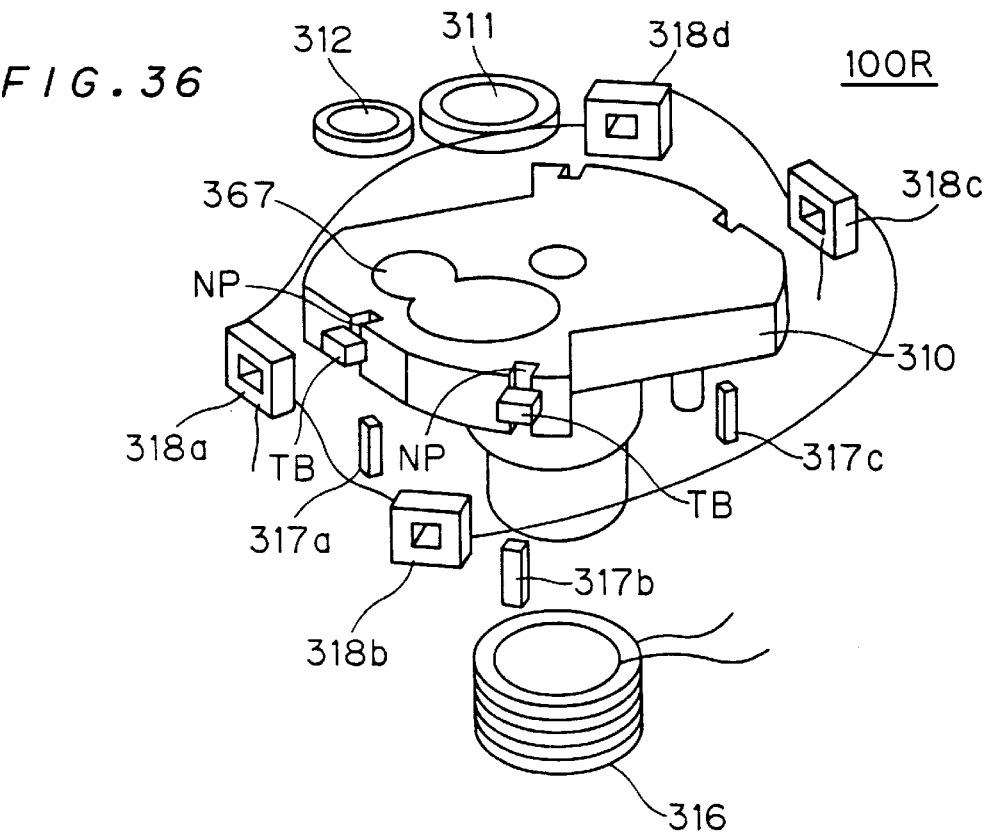
FIG. 36 is a perspective view showing a movable portion of an objective lens driving device in a nineteenth preferred embodiment of the present invention.

FIG. 36 is a perspective view showing a movable portion of an objective lens driving device 10OR in a nineteenth preferred embodiment of the present invention. In the figure, the same characters are allotted to the same structures as those in FIG. 20 to FIG. 26 and overlapping description is not repeated here.

In FIG. 36, an engage portion 367 including continuously formed two through holes of circular shape in a plan and of different diameters is provided in the upper surface of the lens holder 310. The objective lenses 11 and 12 are positioned and fixed in this engage portion 367. Other structures, operations and effects are completely the same as those of the objective lens driving device 100K.

20. Twentieth Preferred Embodiment

<20-1. Device Structure>

Figure 37:
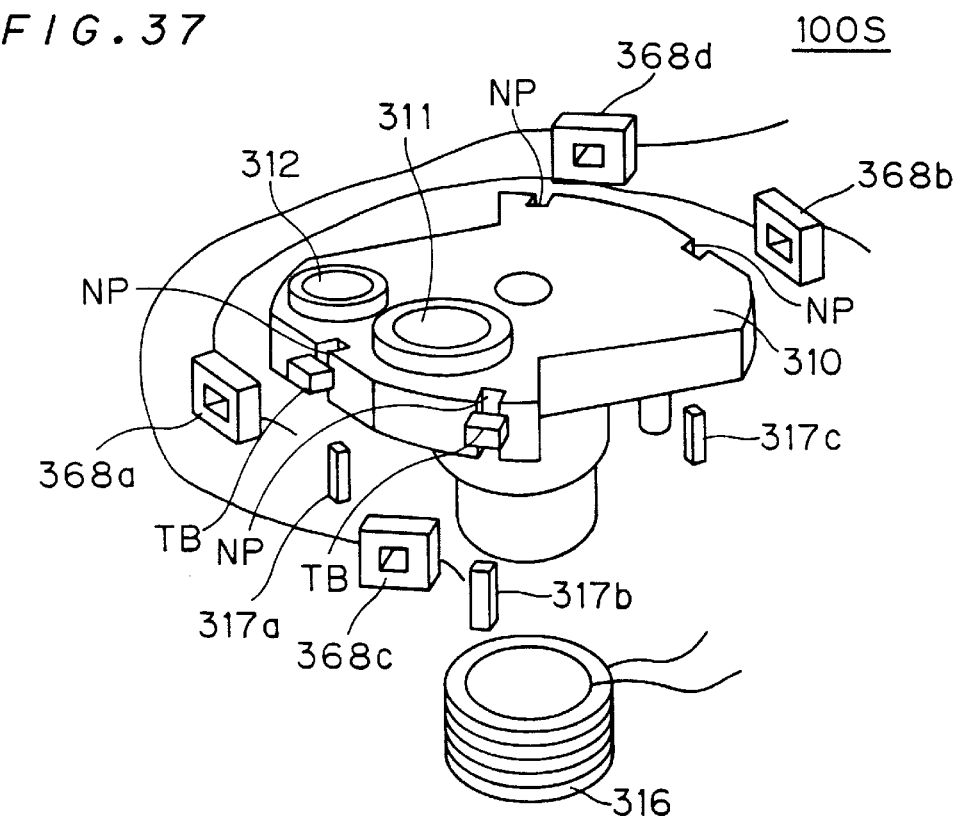
FIG. 37 is a perspective view showing a movable portion of an objective lens driving device in a twentieth preferred embodiment of the present invention.

FIG. 37 is a perspective view showing a movable portion of an objective lens driving device 100S in a twentieth preferred embodiment of the present invention. In the figure, the same structures as those in FIG. 20 to FIG. 26 are designated by the same reference characters and overlapping description will not repeated here.

In FIG. 37, tracking coils 368*a*, 368*b*, 368*c* and 368*d* are positioned and bonded to be fixed to tracking coil fixing bosses TB formed across notches NP of the lens holder 310. The tracking coils 368*a* and 368*c*, and 368*b* and 368*d* are fixed in positions at an angle almost the same as the angle formed by the objective lenses 311 and 312 about the supporting shaft 304, respectively. The tracking coils 368*a* and 368*b*, and 368*c* and 368*d* are fixed in positions at an angle almost the same as the angle between the tracking magnets 307 and 308 about the supporting shaft 304, respectively. The tracking coils 368*a* and 368*b*, and 368*c* and 368*d* are formed by continuous winding, respectively, which are connected in series. The line length between the respective tracking coils is set somewhat longer than the distance between the bosses. The set of the tracking coils 368*a* and 368*b*, the set of the tracking coils 368*c* and 368*d* are connected to the driving device driving circuit (not shown) in parallel, respectively.

<20-2. Device Operation>

Figure 38:
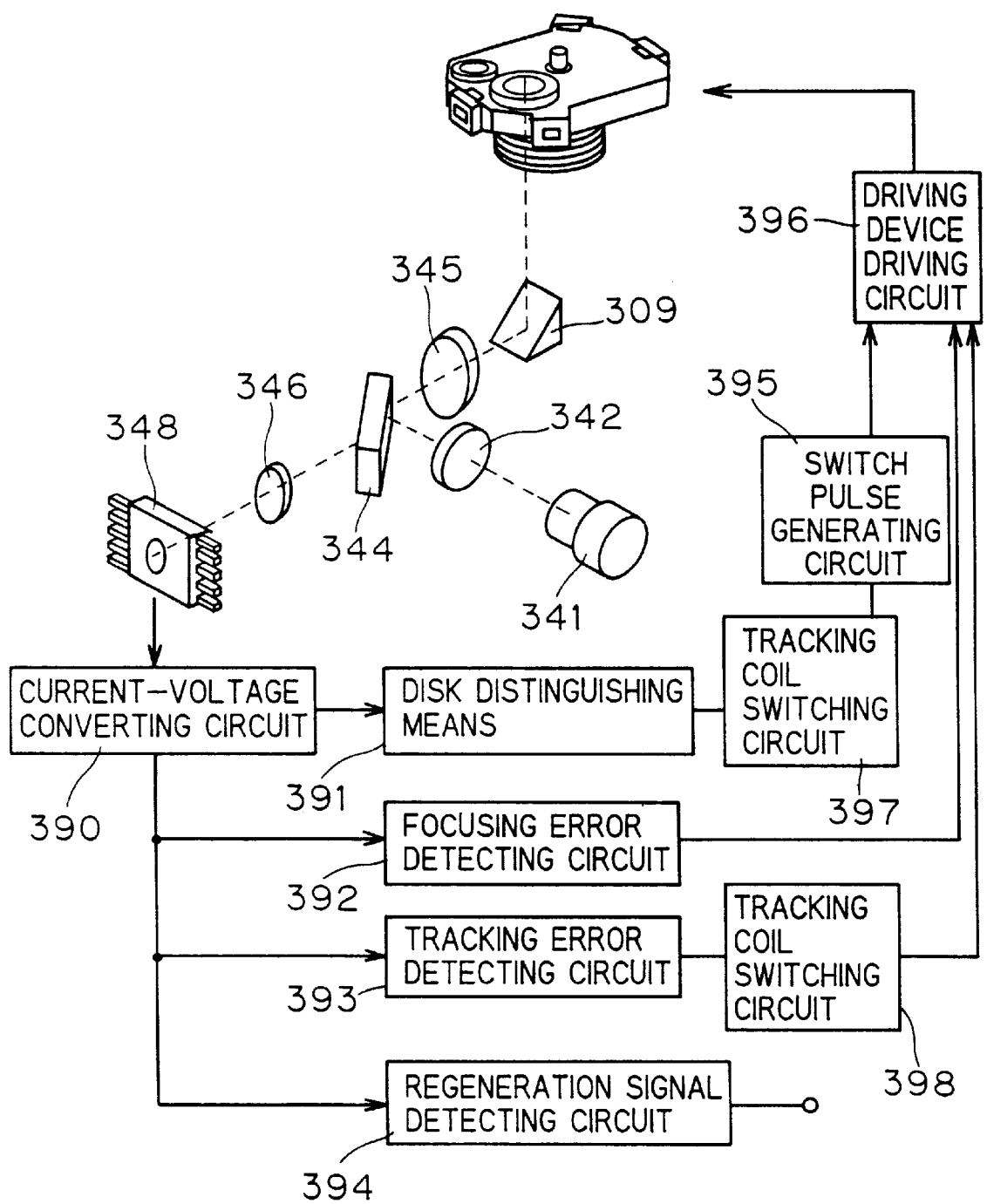
FIG. 38 shows an optical information recording/regenerating device having the objective lens driving device in the twentieth preferred embodiment of the present invention.

Next, the operation will be described referring to FIG. 38 which shows the structure of an optical information recording/regenerating device in the twentieth preferred embodiment of the present invention. When an objective lens corresponding to an optical information recording medium is selected, a set of the tracking coils positioned to face the tracking magnet is selected using a tracking coil switching circuit 397. A predetermine voltage (current) is applied to the selected set of tracking coils from the driving device driving circuit 396 to drive the objective lens driving, device in the tracking direction. Similarly, on the basis of signal obtained from a photodetector, the optical information recording medium is distinguished by disk distinguishing means 391, and a set of tracking coils is selected by the tracking coil switching circuit 397 if needed, and then predetermine current (voltage) is generated by the switching pulse generating circuit 395 and inputted to the driving device driving circuit 396 to rotate the lens holder to select the objective lens. Other structures, operations, and effects are completely the same as those in the twelfth preferred embodiment.

21. Twenty-first Preferred Embodiment
<21-1. Device Structure>

Figure 39:
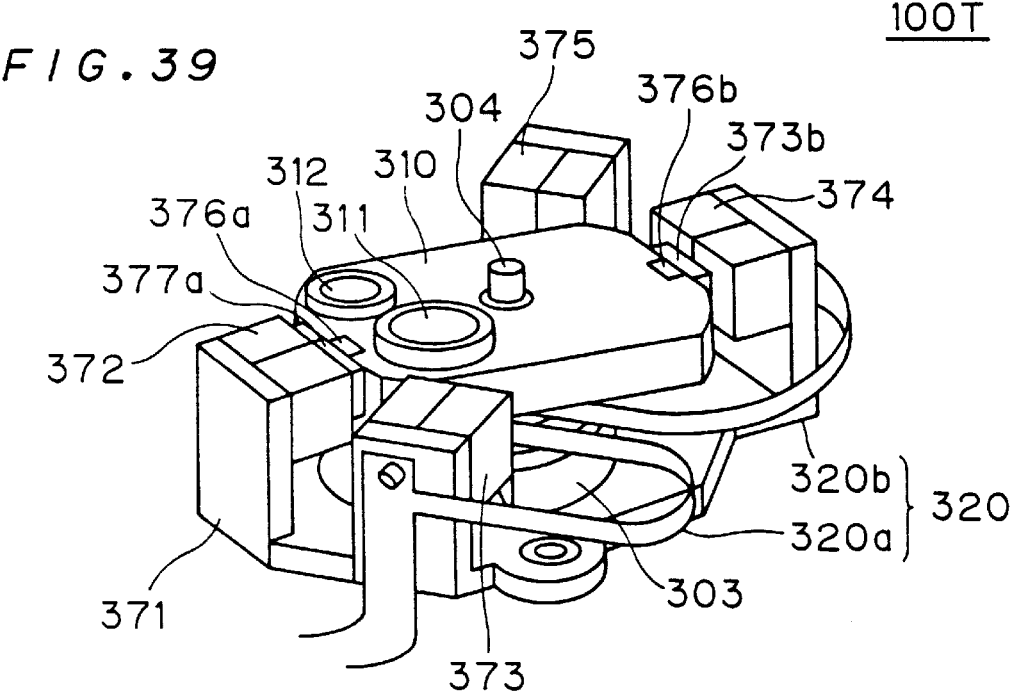
FIG. 39 is a perspective view of an objective lens driving device in a twentyfirst preferred embodiment of the present invention.
Figure 40:
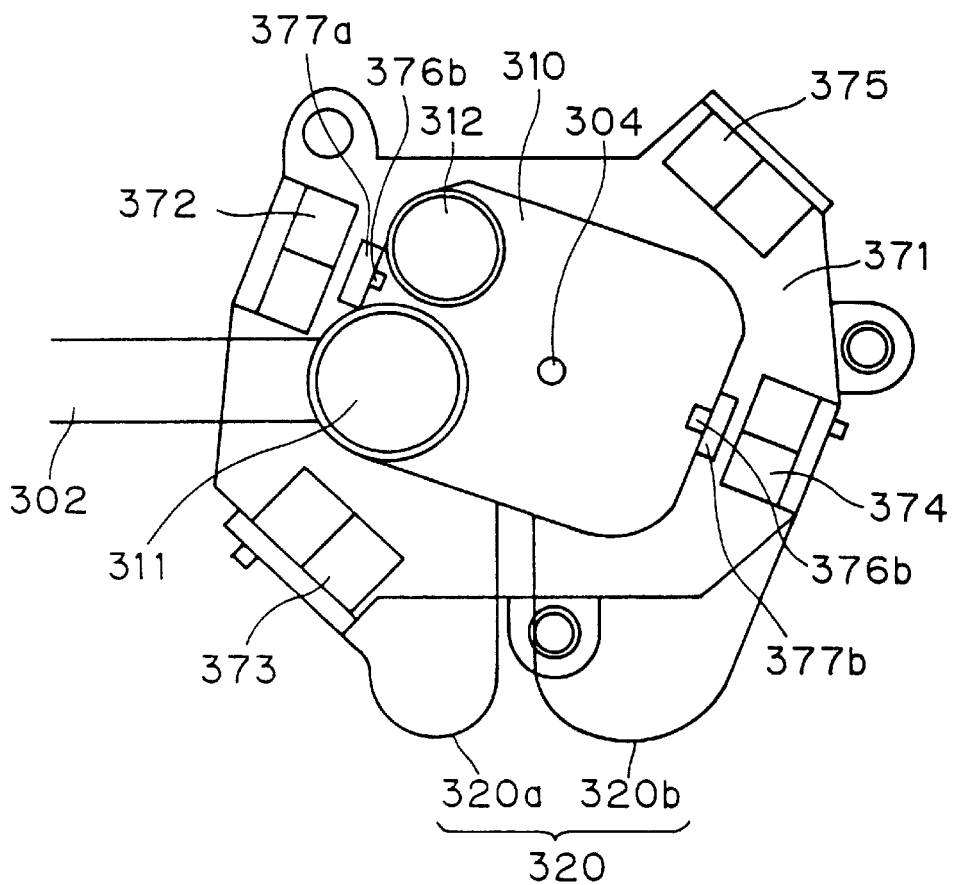
FIG. 40 is a plan view of the objective lens driving device in the twenty-first preferred embodiment of the present invention.
Figure 41:
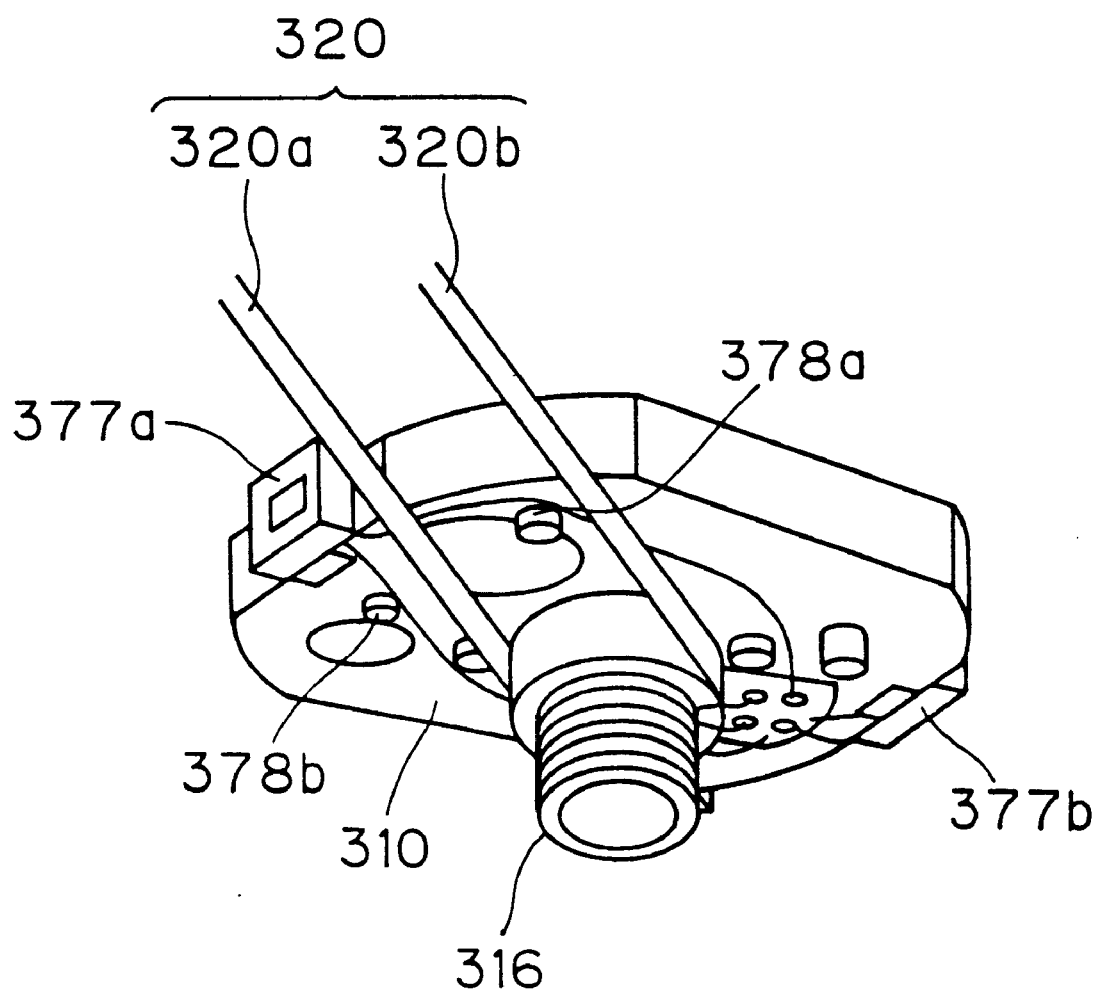
FIG. 41 is a perspective view of the movable portion of the objective lens driving device seen from the back in the twenty-first preferred embodiment of the present invention.
Figure 42:
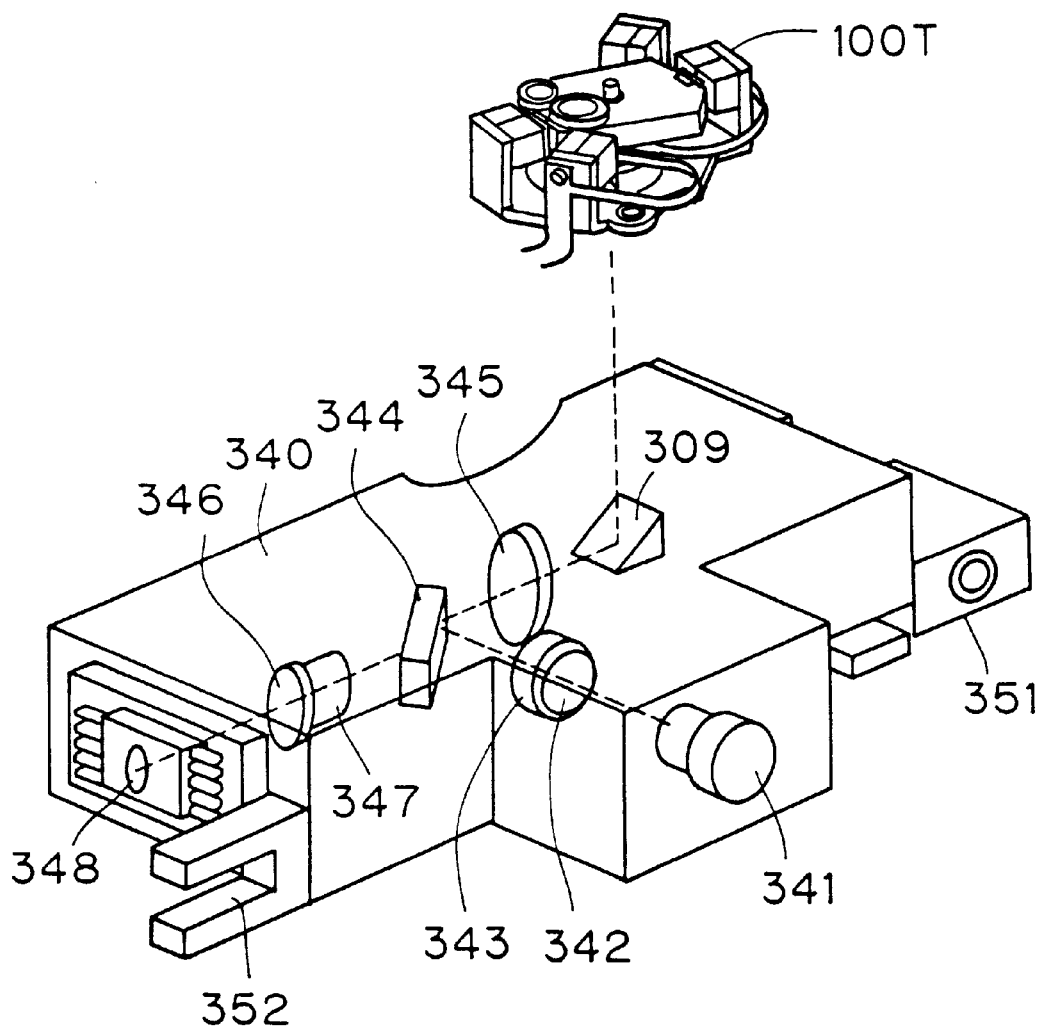
FIG. 42 is a perspective view of an important part of an optical information recording/regenerating device having the objective lens driving device in the twenty-first preferred embodiment of the present invention.
Figure 43:
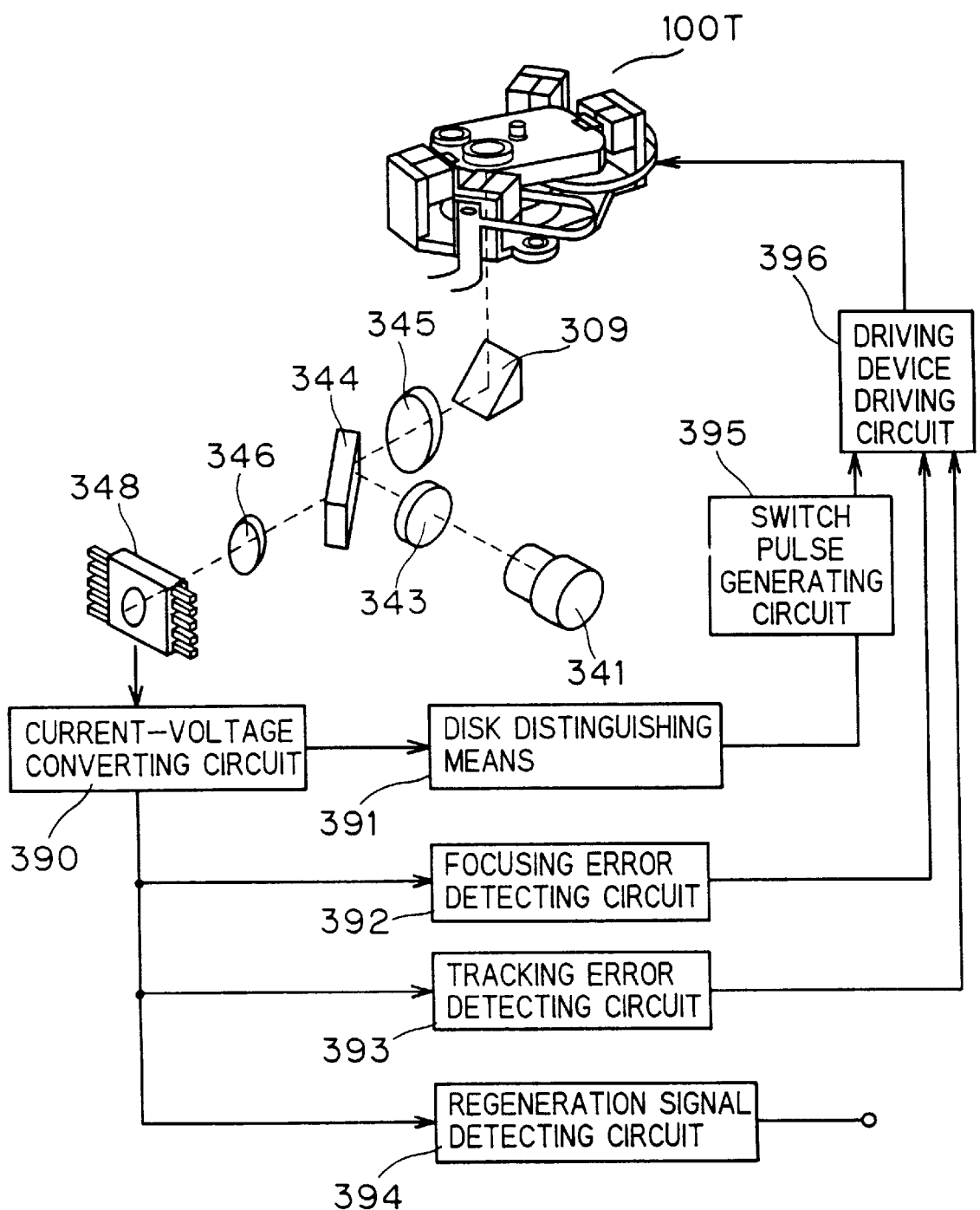
FIG. 43 is a diagram illustrating the operation of the optical information recording/regenerating device in the twenty-first preferred embodiment of the present invention.
Figure 44:
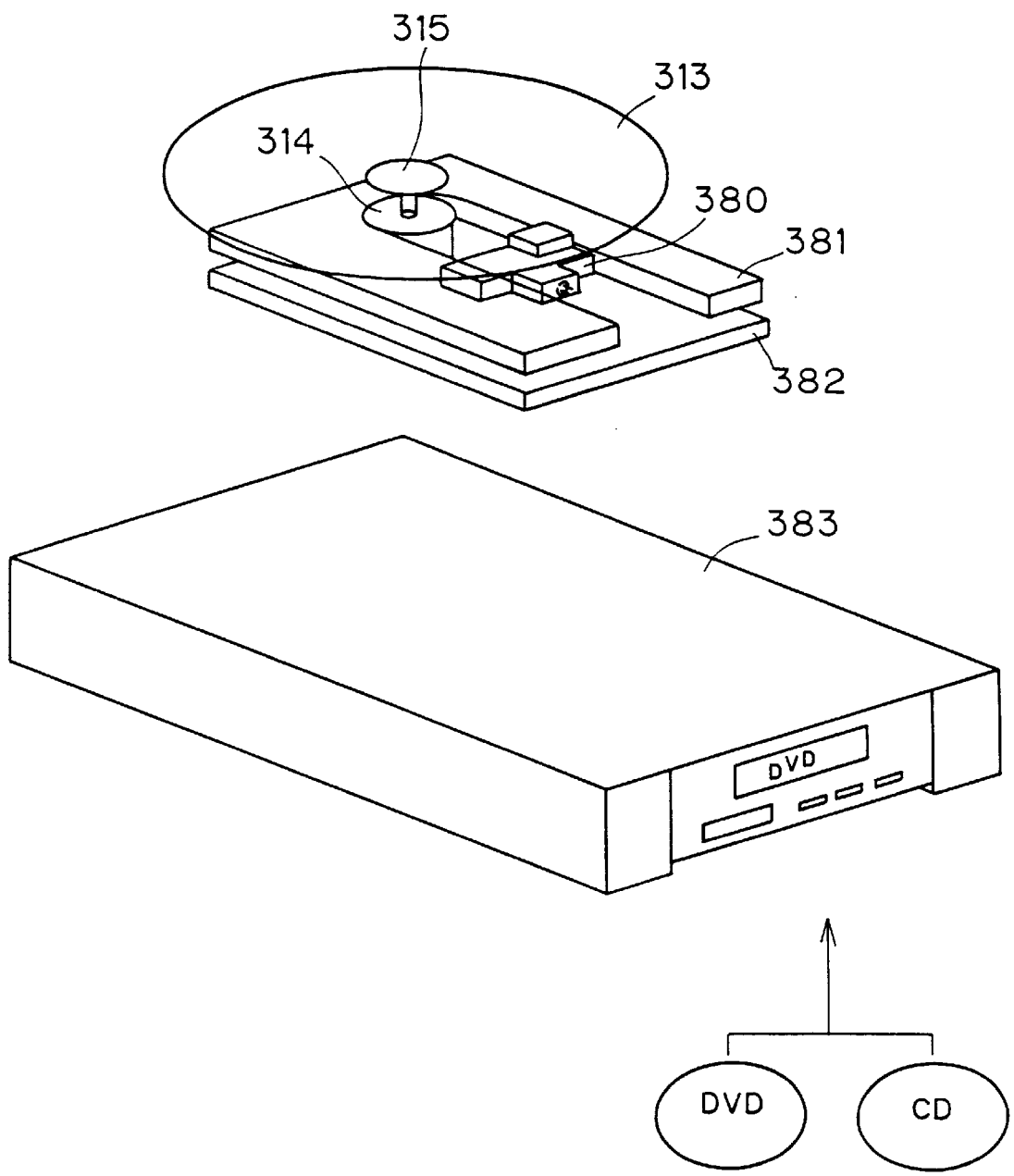
FIG. 44 is a diagram showing the optical information recording/regenerating device in the twenty-first preferred embodiment of the present invention.

FIG. 39 is a perspective view of an objective lens driving device 100T in a twenty-first preferred embodiment of the present invention, FIG. 40 is a plan view of the objective lens driving device 100T in the twenty-first preferred embodiment of the present invention, and FIG. 41 is a perspective view of the movable portion of the objective lens driving device seen from the back in the twenty-first preferred embodiment of the present invention. FIG. 42 is a perspective view of the important portion of an optical information recordinglregenerating device having the objective lens driving device 100T in the twenty-first preferred embodiment of the present invention, and FIG. 43 is a diagram showing the structure of the optical information recording/regenerating device in the twenty-first preferred embodiment of the present invention. FIG. 44 is an external perspective view of the optical information recording/ regenerating device in the twenty-first preferred embodiment of the present invention. In the figures, the same reference characters are allotted to the same structures as those in FIG. 20 to FIG. 26, and overlapping description is not repeated here.

In FIG. 39 to FIG. 44, 371 is a first fixing base formed of a magnetic material. 372, 373, 374 and 375 are tracking magnets bipolar-magnetized in the right and left direction, which are bonded and fixed to the first fixing base 371. The magnets 372 and 373, and 374 and 375 are fixed at positions at an angle almost the same as the angle formed by the objective lenses 311 and 312 about the supporting shaft 304, respectively. The tracking magnets 372 and 374, and 373 and 375 are fixed at positions at an angle almost the same as the angle between tracking coils 377*a* and 377*b* described later about the supporting shaft 304. The end of the power supplying means 320 is fixed on the back of the lens holder 310, which is electrically connected to end lines of the focusing coil and the tracking coils 377*a* and 377*b* by soldering, or the like.

The lens holder 310 has notches, into which the magnetic pieces 376*a* and 376*b* are inserted and bonded to be fixed. Tracking coil fixing bosses are formed across the notches in the lens holder 310. The tracking coils 377*a* and 377*b* are positioned to the tracking coil fixing bosses and fixed by bonding. The tracking coils 377*a* and 377*b* are formed by continuous winding, which are connected in series. The connecting line between the two tracking coils is drawn onto the back of the lens holder 310, which is fixed being covered when the power supplying means 320 is fixed to the lens holder. The lens holder 310 has projections 378*a* and 378*b*, where the end lines and connecting line are drawn not to intercept the hole for transmission of the light beam.

In FIG. 44, 380 is an optical head device which is an important part of an optical information recording/ regenerating device having the objective lens driving device 100T. 381 is a mechanical deck, and 382 is a circuit board, in which various circuits as shown in FIG. 43 are packaged. The reference numeral 383 shows an appearance of the optical information recording/regenerating device, which includes the optical head device 380, the mechanical deck 381 and the circuit board 382 therein.

<21-2. Device Operation>

Next, the operation will be described. Predetermine current is applied to the tracking coils 377*a* and 377*b* to rotatively control the lens holder 310. While the twelfth preferred embodiment of the invention uses four tracking coils and magnetic materials and two tracking magnets, this preferred embodiment uses two tracking coils and magnetic materials and four tracking magnets. Other structures, operations and effects are completely the same as those in the twelfth preferred embodiment.

As shown in FIG. 44, the optical information recording/ regenerating device 383 has a change-over switch corresponding to optical information recording media, for example, CD and DVD (Digital Video Disk) so that an operator can manually determine the optical information recording medium species.

22. Twenty-second Preferred Embodiment
<22-1. Device Structure>

Figure 45:
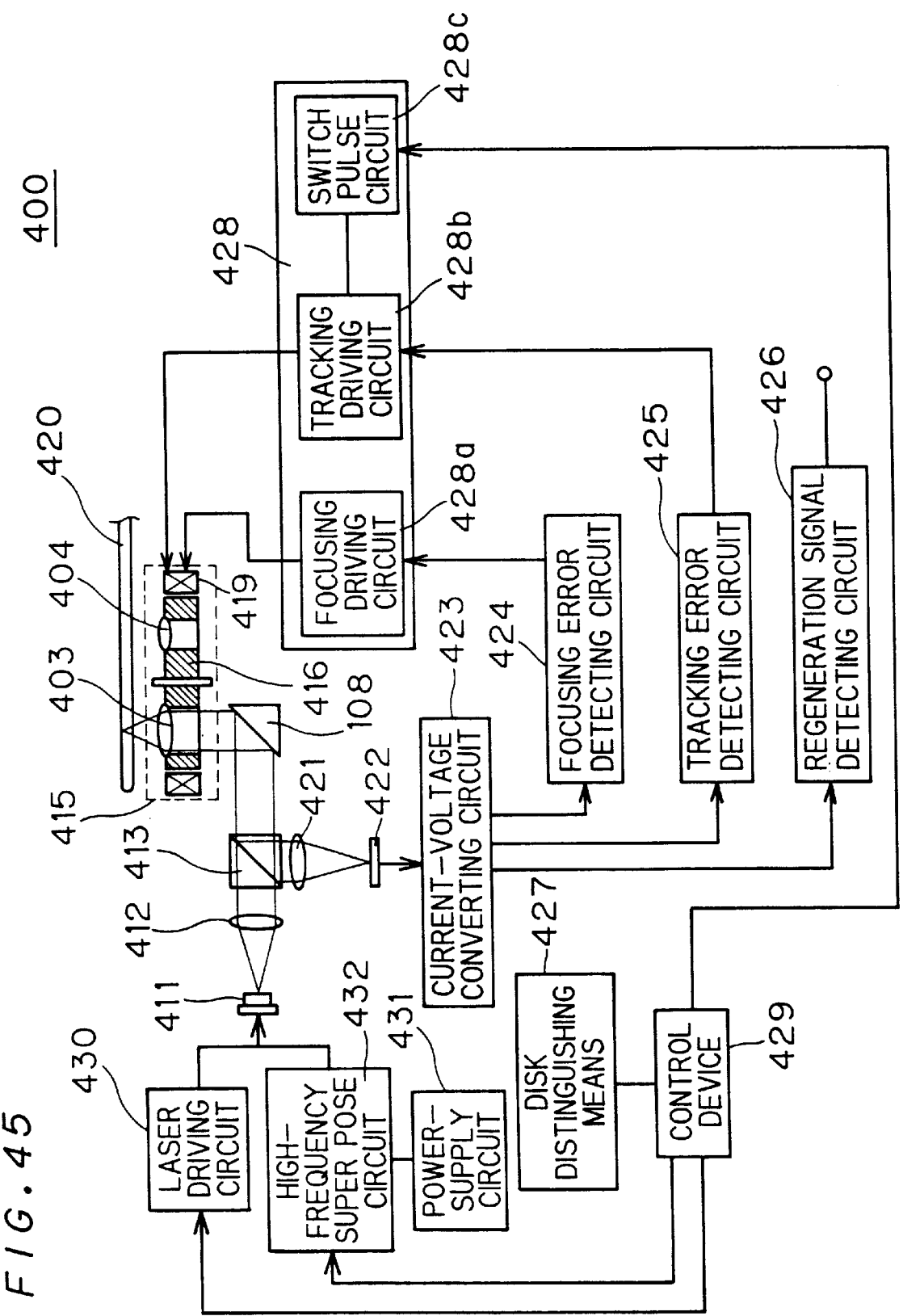
FIG. 45 is a diagram showing an optical system and a block circuit of an optical information recording/regenerating device in a twenty-second preferred embodiment of the present invention.

FIG. 45 is a diagram showing the structure of an optical system and an electric system of an optical information recording/regenerating device 400 in a twenty-second preferred embodiment of the present invention. In the figure, 411 is a semiconductor laser as a light source, and a collimator lens 412, a beam splitter 413 and a mirror 108 are arranged in order in the direction of emission of the semiconductor laser 411. An objective lens driving device 415 is disposed in the direction of reflection of the mirror 108. In the objective lens driving device 415, a lens holder 416 is provided with two objective lenses, an objective lens 403 and an objective lens 404. The reference character 419 is a driving mechanism for the objective lens driving device 415 and 420 is an optical information recording medium. FIG. 45 shows the laser beam from the semiconductor laser 411 being radiated to the optical information recording medium 420 through the objective lens 403 selected in the reflection direction of the mirror 108.

Seen from the optical information recording medium 420, a lens 421 and a photodetector 422 are arranged in order in the direction of reflection of the beam splitter 413. Output signal of the photodetector 422 is connected to a current-voltage converting circuit 423. Output signal of the current-voltage converting circuit 423 is connected to a focusing error detecting circuit 424, a tracking error detecting circuit 425 and a regeneration signal detecting circuit 426, respectively.

The reference character 428 denotes a driving device driving circuit, which has a focusing driving circuit 428a, a tracking driving circuit 428b and a switching pulse circuit 428c. Output of the focusing error detecting circuit 424 is connected to the focusing driving circuit 428a, and output of the tacking error detecting circuit 425 is connected to the tracking driving circuit 428b, respectively. Output of the control deice 429 is connected to the switching pulse circuit 428c, and output of the switching pulse circuit 428c is connected to the tracking driving circuit 428b. Output signals of the focusing driving circuit 428a and the tracking driving circuit 428b are connected to the driving mechanism 419.

The reference character 427 denotes disk distinguishing means for distinguishing kinds of optical information recording media, or optical disks, which outputs distinguishing signal indicating to which of the objective lenses 403 and 404 the used optical disk correspond.

Output signal of the disk distinguishing means 427 is connected to the control device 429. The control signal outputted from the control device 429 is connected to the switching pulse circuit 428c, the laser driving circuit 430 and the power supply circuit 31, respectively. Output current from the laser driving circuit 430 is injected into the semiconductor laser 411. The output voltage of the power supply circuit 431 is applied to a high frequency superpose circuit 432 and the output current from the high frequency superpose circuit 432 is injected into the semiconductor laser 411.

Here, the objective lens driving device 100 shown in FIG. 1 is used as the objective lens driving device 415, for example. Accordingly, though overlapping description is not repeated here, the objective lenses 3 and 4 in FIG. 1 work as the objective lenses 403 and 404, the lens holder 6 works as the lens holder 416, and the tracking magnets 107a and 107b and the tracking coils 121a and 121b are generically referred to as the driving mechanism 419.

<22-2. Device Operation>

Next, the operation will be described. The laser beam emitted from the semiconductor laser 411 is led to the objective lens driving device 415 by the optical system. Here, it is first assumed that the objective lens 403 is being selected. When an optical information recording medium 420 adapted for the objective lens 403 is set in the optical information recording/regenerating device, information is recorded or regenerated with the objective lens 403. It is the same as the conventional device that the reflected light of the optical information recording medium 420 is detected at the photodetector 422, its output current is converted into a voltage by the current-voltage converting circuit 423, which is inputted to the regeneration signal detecting circuit to extract signal components, and further, it is also the same as the operation in the conventional device that the focusing error and tracking error signal components are generated from the reflected light of the optical information recording medium 420 as well as the regeneration signal, which are inputted to the driving device driving circuit 428 to cause the objective lens to always follow the optical information recording medium 420.

Next, if an optical information recording medium which is adapted for the objective lens 404 is set with the objective lens 403 being selected, a signal indicating that the optical information recording medium is adapted for the objective lens 404 is transferred from the disk distinguishing means 427 to the control device 429. The control device 429 transfers a control signal for switching from the objective lens 403 to the objective lens 404 to the switching pulse circuit 428c of the driving device driving circuit 428.

The switching pulse circuit 428c outputs a switching pulse signal for the objective lens to the tracking driving circuit 428b. The current outputted from the tracking driving circuit 428b is applied to the coil of the driving mechanism 419, and then the lens holder 416 turns to move the objective lens 404 onto the optical axis, which completes switch of lens.

When an optical information recording medium 420 adapted for the objective lens 403 is set with the objective lens 404 being selected, the same operation achieves switch to the objective lens 403.

Figure 46:
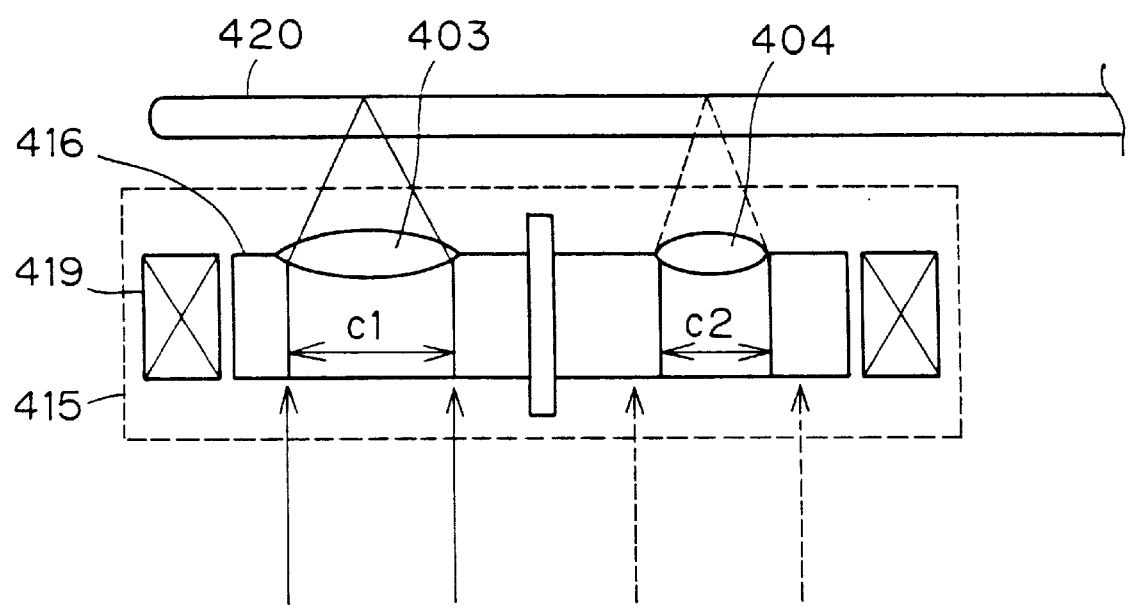
FIG. 46 is a sectional view showing the important part of the objective lens driving device in the twenty-second preferred embodiment of the present invention.

FIG. 46 is a sectional view showing an important part of the objective lens driving device 415. The two objective lenses 403 and 404 have different optical characteristics so that they can adapt to different kinds of optical information recording media 420. For example, the objective lens 403 has its aperture diameter c1 and the objective lens 404 has its aperture diameter c2. Now, if the objective lenses 403 and 404 have equal focal length, then the difference in aperture diameter (effective incident diameter of the lens) corresponds to the difference in numerical aperture (a value defied by the ratio of the aperture radius and the focal length of the lens) of the lens.

By the way, it is known that the size of a condensed light spot formed by an objective lens is in proportion to the wavelength of the light source used, and is in inverse proportion to the numerical aperture of the lens. As the optical information recording/regenerating device shown in FIG. 45 uses a single light source, the wavelength is the same, so the size of the condensed light spot depends on the numerical aperture of the lens. That is to say, an objective lens with larger numerical aperture, in other words, with a larger aperture diameter can form a smaller condensed light spot. Accordingly, with the different aperture diameters of the two objective lenses as shown in FIG. 21, as the objective lens 403 can form a smaller condensed light spot than the objective lens 404, the objective lens 403 can be applied to an optical information recording medium with higher density and the objective lens 404 can be applied to an optical information recording medium with a conventional recording density.

Figure 47A:
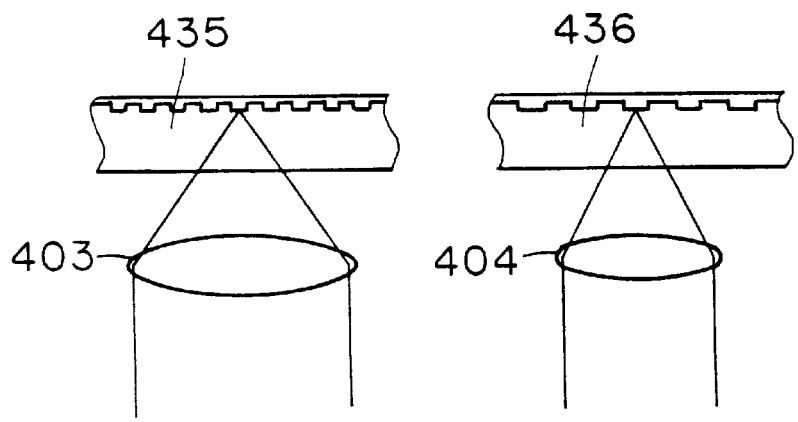
FIG. 47(A) and FIG. 47(B) are side views showing the relation between the optical information recording media and the objective lenses in the twenty-second preferred embodiment of the present invention.

FIG. 47 is a side view showing the relation between optical information recording media of different kinds and objective lenses and FIG. 7(A) shows the relation between optical information recording media with the same substrate thickness and different recording densities and objective lenses. The reference character 435 denotes an optical information recording medium with high density, to which the objective lens 403 with large aperture diameter is applied. The reference character 436 denotes a conventional optical information recording medium, to which the objective lens 404 with a smaller aperture diameter is applied. In the case of FIG. 47(A), both lenses are designed to have the smallest aberration for equal substrate thickness.

Figure 47B:
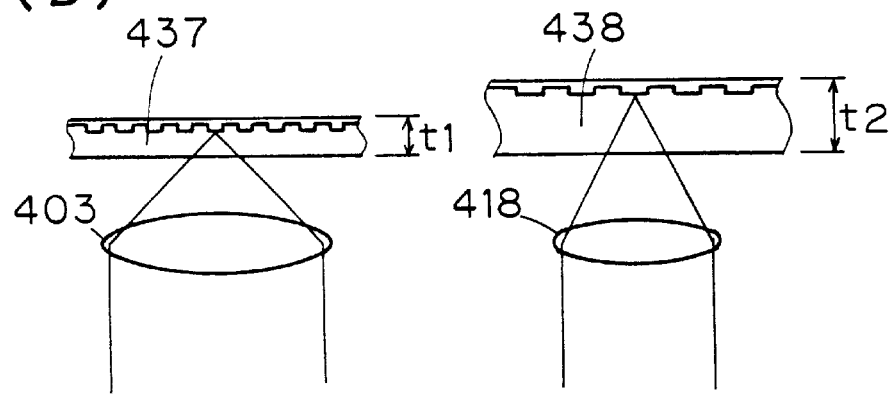

FIG. 47(B) shows the relation between optical information recording media with different substrate thicknesses and different recording densities and objective lenses. The reference character 437 denotes an optical information recording medium with a substrate thickness t1 and a high density. In this case, the objective lens 403 with a larger aperture diameter is applied, which is designed so that the aberration becomes the smallest for the substrate thickness t1. The reference character 438 denotes a conventional optical information recording medium with a substrate thickness t2. In this case, the objective lens 404 with a smaller aperture diameter is applied, and which is similarly designed so that the aberration becomes the smallest for the substrate thickness t2. As described above, providing objective lenses which satisfy optical characteristics required for applied optical information recording media and switching the lenses enable recording and regeneration to/from different kinds of optical information recording media. Although the focal lengths of the two objective lenses 403 and 404 are assumed to be equal in the description above, it is needless to say that the focal lengths can differ.

Figure 48A:
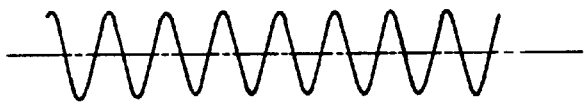
FIG. 48(A) and FIG. 48(B) are regeneration signal diagrams obtained when information is regenerated with different optical information recording media with switched objective lenses in the twenty-second preferred embodiment of the present invention.
Figure 48B:
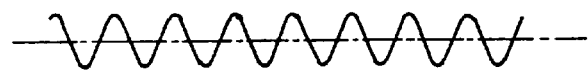

FIG. 48 is a diagram showing a regeneration signal obtained when different optical information recording media are regenerated with objective lenses switched, and FIG. 48(A) shows regeneration with the objective lens 403 and FIG. 48(B) shows regeneration with the objective lens 404. Here, the light intensity of the laser beam emitted from the semiconductor laser is assumed to be constant. As has been described in FIG. 21, as the two objective lenses 403 and 404 have different aperture diameters, the light amount applied to the optical information recording medium is larger with the objective lens 403 with the larger aperture diameter and the applied light amount is smaller with the objective lens 404. Accordingly, it is a matter of course that the amplitude of the regenerated signal with the objective lens 403 is larger. In order to achieve stable recording and regenerating independently of differences of optical information recording media, the difference in applied amount of the laser beam caused by the difference of aperture diameter of objective lenses must be corrected.

Figure 49:
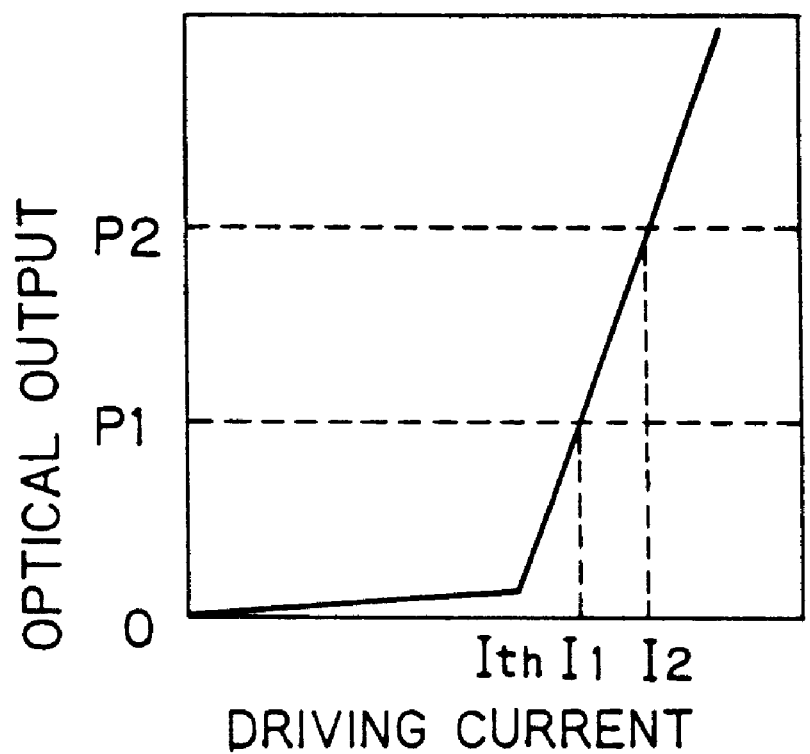
FIG. 49 is a current-optical output characteristic diagram of a semiconductor laser.

FIG. 49 is a current-optical output characteristic diagram of the semiconductor laser 411. Laser oscillation is performed at the threshold current I th or above, and the optical output can be increased by increasing the drive current. Hence, by switching the driving current of the semiconductor laser 411 at the same time as the objective lens is switched, the light amount applied onto the optical information recording medium 420 surface can be constant. Even if the objective lens 403 and the objective lens 404 have different aperture diameters, as the ratios of transmission through the respective lenses are previously known, the amount of switching the light amount can be set. For example, if the objective lens 403 requires the optical output of P1 and the optical output required for the objective lens 404 obtained from the transmittance ratio of the objective lens 403 and the objective lens 404 is P1, then the driving current of the semiconductor laser 411 is switched from I1 to I2.

The optical output of the semiconductor laser 411 may be changed so that the light amount applied to the optical information recording medium 420 is constant, or it may be controlled so that the regenerated signal amplitude is constant.

Figure 50:
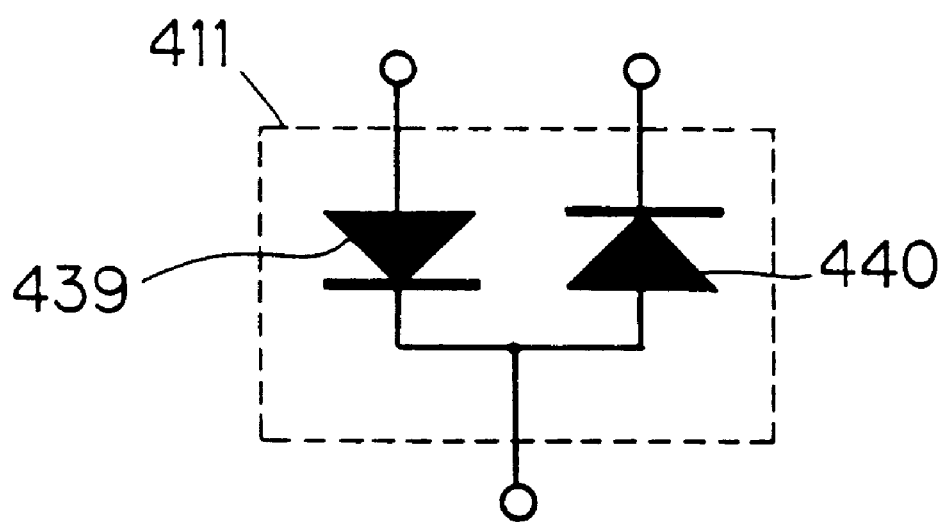
FIG. 50 is a circuit diagram showing the structure of the semiconductor laser.

FIG. 50 is circuit diagram showing the structure of the semiconductor laser 411. Generally, the package of the semiconductor laser 411 includes a laser chip 439 which makes laser oscillation and a photodetector 440. A part of the laser beam emitted from the laser chip 439 impinges upon the photodetector 440, which outputs signal in proportion to the optical output of the laser chip 439. Accordingly, the optical output of the laser chip 439 can be grasped with this output signal and optical output can be set accurately on the basis of this signal also at the time of switch of the optical output. The setting and switching of the optical output value of the semiconductor laser 411 described above are achieved by distinguishing the kind of the optical information recording medium with the disk distinguishing circuit 427 when the optical information recording medium 420 is set, transferring instructions of the most suitable driving conditions to the laser driving circuit 430 from the control device 429, and operating the laser driving circuit 430 on the basis of the instructions.

By the way, it is known that the semiconductor laser 411 has characteristic that the laser oscillation becomes unstable when the laser beam externally emitted by the semiconductor laser 411 comes back to itself. In an optical information recording/regenerating device, reflected light from the optical information recording medium 420 or reflected light from optical parts constituting the optical system make the laser oscillation unstable, which appears as noise in regenerated signal. The high frequency superpose method is known as a method for suppressing such noise. The reference character 432 denotes a high frequency superpose circuit for applying high frequency current to the semiconductor laser to suppress the noise, and 431 denotes a power supply circuit for driving the high frequency superpose circuit 432.

Figure 51:
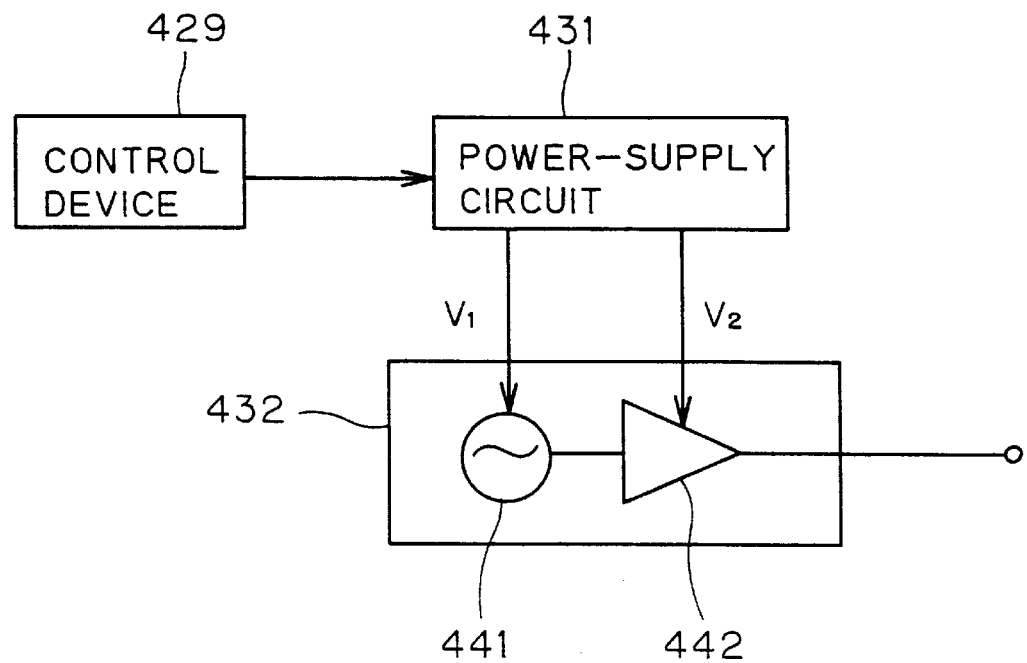
FIG. 51 is a block circuit diagram showing the structure of a high frequency superpose circuit of the twenty-second preferred embodiment.

FIG. 51 is a circuit diagram showing the structure of the high frequency superpose circuit 432. In the figure, 441 denotes an oscillating stage, and 442 denotes an amplifying stage for amplifying the high frequency signal oscillated at the oscillating stage 441. The oscillating stage 441 and the amplifying stage 442 can be independently supplied with power from the power supply circuit 431, for example. Here, the oscillating stage 441 is supplied with a fixed voltage V1 and the amplifying stage 442 is supplied with a variable voltage V2, where varying the voltage V2 changes the amplification degree so as to vary the magnitude of the high frequency current applied to the semiconductor laser 411.

Figure 52:
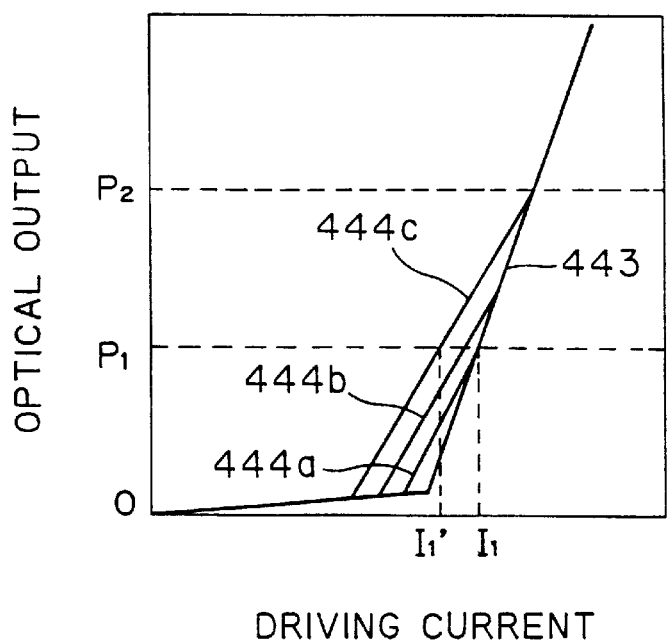
FIG. 52 is a current-optical output characteristic diagram of the semiconductor laser with presence/absence of high frequency superpose.

FIG. 52 is a current-optical output characteristic diagram of the semiconductor laser in accordance with absence/present of high frequency superpose. 443 denotes a characteristic line when high frequency superpose is not performed, which is the same as the characteristic shown in FIG. 49. 444 denotes characteristic lines when high frequency superpose is performed, where the characteristic line shifts to the left as 444a, 444b, 444c as the amount of applied high frequency current increases. Then, if the optical output is P1, then the shift amount of the characteristic line corresponds to the applied amount of the high frequency current. The applied amount of the high frequency current required to suppress noise, though which differs according to various conditions such as kind of the semiconductor laser, the magnitude of return light etc., is generally sufficient if the shift amount of the characteristic line with the optical output P1 is several mA. Accordingly, the high frequency current is to be applied with the voltage V2 of the amplifying stage 442 set so that the current value I1' when the high frequency superpose is performed is smaller by several mA than the current value I1 when high frequency superpose is not performed.

Next, when it is switched to the objective lens 404, the optical output of the semiconductor laser 411 is also switched from P1 to P2 at the same time. If the amount of applied high frequency current is unchanged, however, the characteristic line is not shifted at the optical output P2 as shown in FIG. 5, and then noise can not be suppressed sufficiently.

Figure 53:
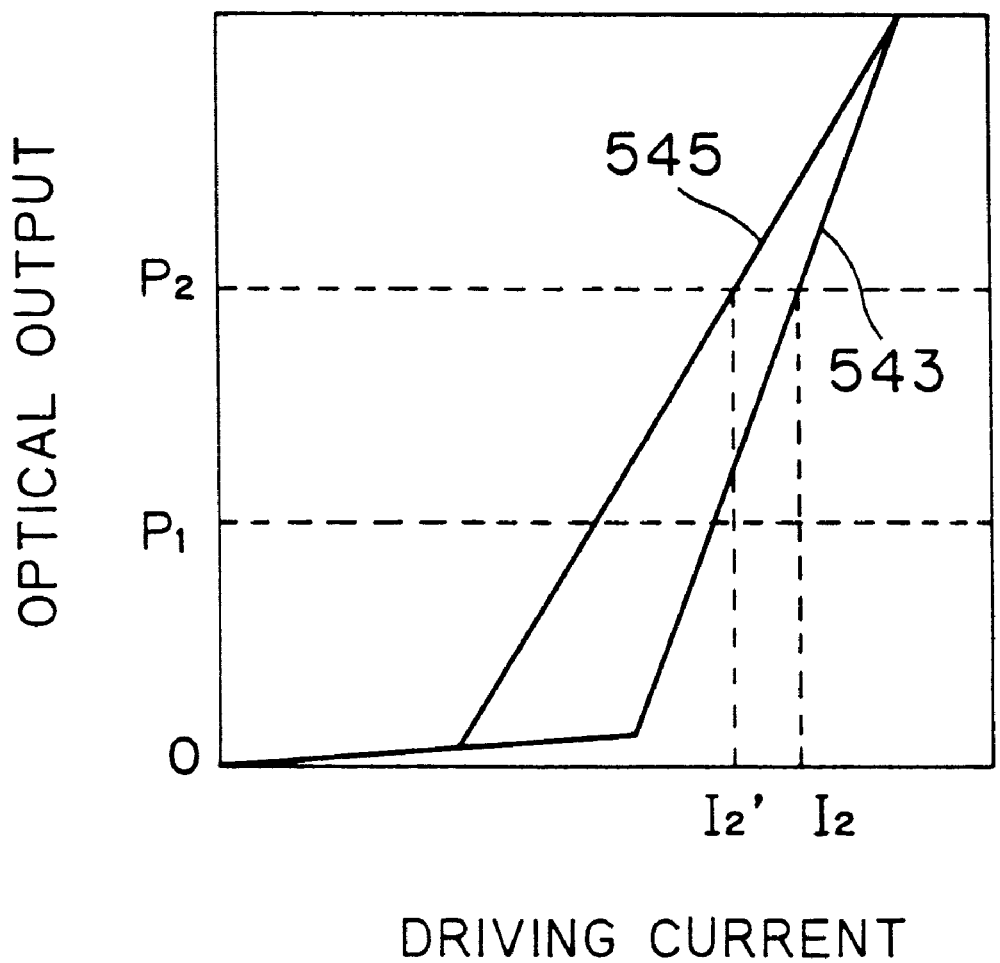
FIG. 53 is a current-optical output characteristic diagram of the semiconductor laser when the high frequency superpose is made large.

FIG. 53 is a current-optical output characteristic diagram of the semiconductor laser when the high frequency superpose is made larger. By adjusting the voltage V2 of the amplifying stage 442, at the optical output P2, it can be set so that the shift amount of the characteristic line 445 when high frequency superpose is performed with respect to the characteristic line 443 when high frequency superpose is not applied is the same as that at the optical output P1. Accordingly, by switching the high frequency superpose simultaneously with switch of the optical output, noise can be suppressed stably. Switch of voltage of the amplifying stage 442 of the high frequency superpose circuit 432 is achieved by the disk distinguishing circuit 427 distinguishing the kind of the optical information recording medium when the optical information recording medium 420 is set, the control device 429 transferring instructions of the most suitable driving conditions to the power supply circuit 431, and the power supply circuit 431 supplying a predetermine voltage to the amplifying stage 442 on the basis of the instructions.

23. Twenty-third Preferred Embodiment
<23-1. Device Structure>

Figure 54:
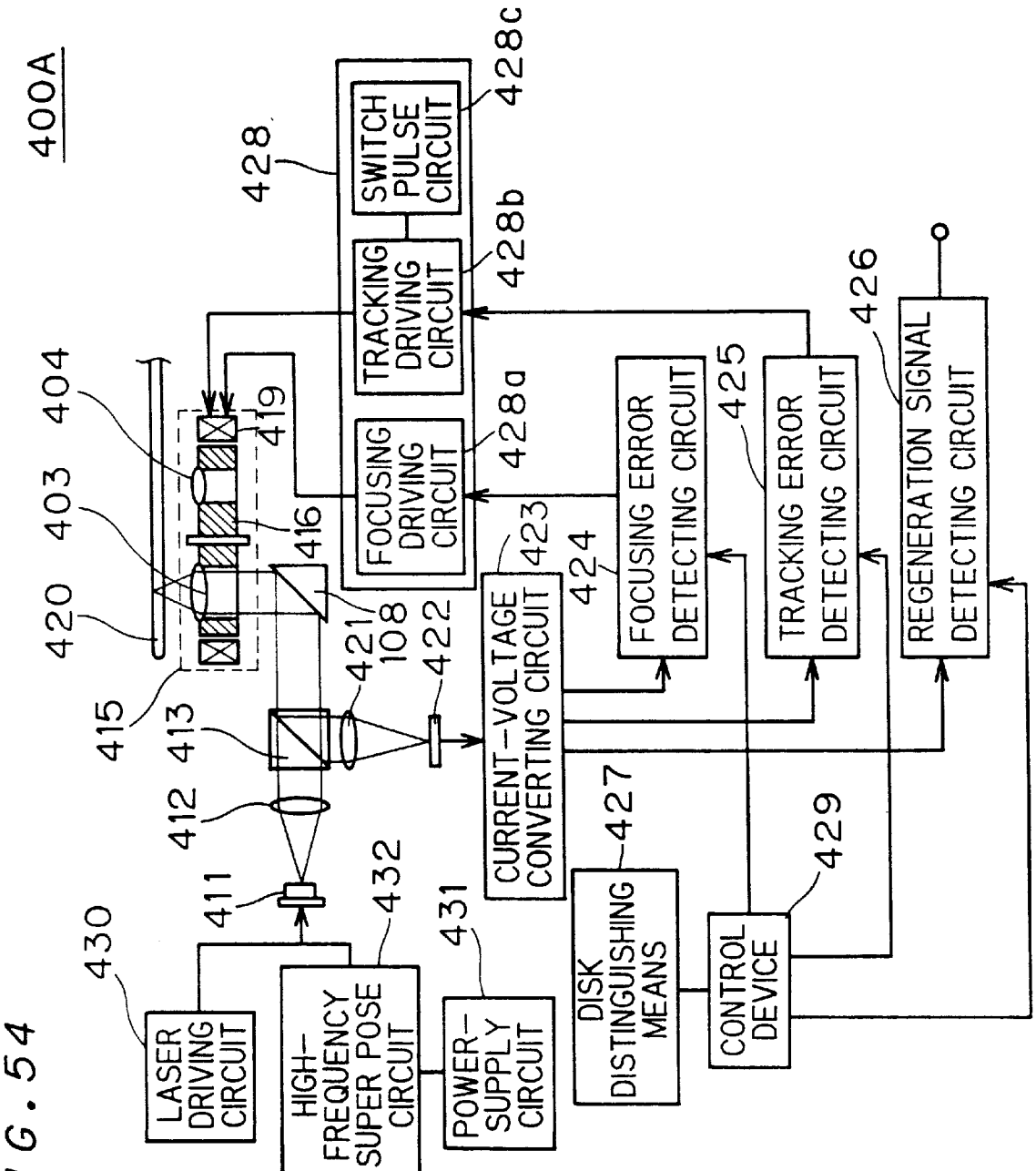
FIG. 54 is a diagram showing an optical system and a block circuit of an optical information recording/regenerating device in a twenty-third preferred embodiment of the present invention.

FIG. 54 is a diagram showing the structure of an optical system and an electric system of an optical information recording/regenerating device 400A in a twenty-third preferred embodiment of the present invention, where the same characters are allotted to the same structures as those in the optical information recording/regenerating device 400 of FIG. 45 and overlapping description is not repeated here. In this twenty-third preferred embodiment, the control signal outputted from the control device 429 is connected to the focusing error detecting circuit 424, the tracking error detecting circuit 425 and the regeneration signal detecting circuit 426, respectively.

In the twenty-second preferred embodiment, when objective lenses are switched for different kinds of optical information recording media, optical output of the semiconductor laser 411 is also switched at the same time to control so that the signal amplitude is constant. However, the amplification degree of the detected signal may be varied with the optical output of the semiconductor laser 411 being constant to control so that the signal amplitude is constant. In the twenty-third preferred embodiment, when the optical information recording medium 420 is installed, the disk distinguishing means 427 distinguishes a kind of the optical information recording medium, the control device 429 transfers instructions for the most suitable amplification degree to the focusing error detecting circuit 424, the tracking error detecting circuit 425 and the regeneration signal detecting circuit 426, respectively, and signals are outputted from the respective circuits on the basis of the amplification degree. Hence, according to the twenty-third preferred embodiment, signals with stable quality can be obtained even with different kinds of optical information recording media.

24. Twenty-fourth Preferred Embodiment
<24-1. Device Structure>

Figure 55:
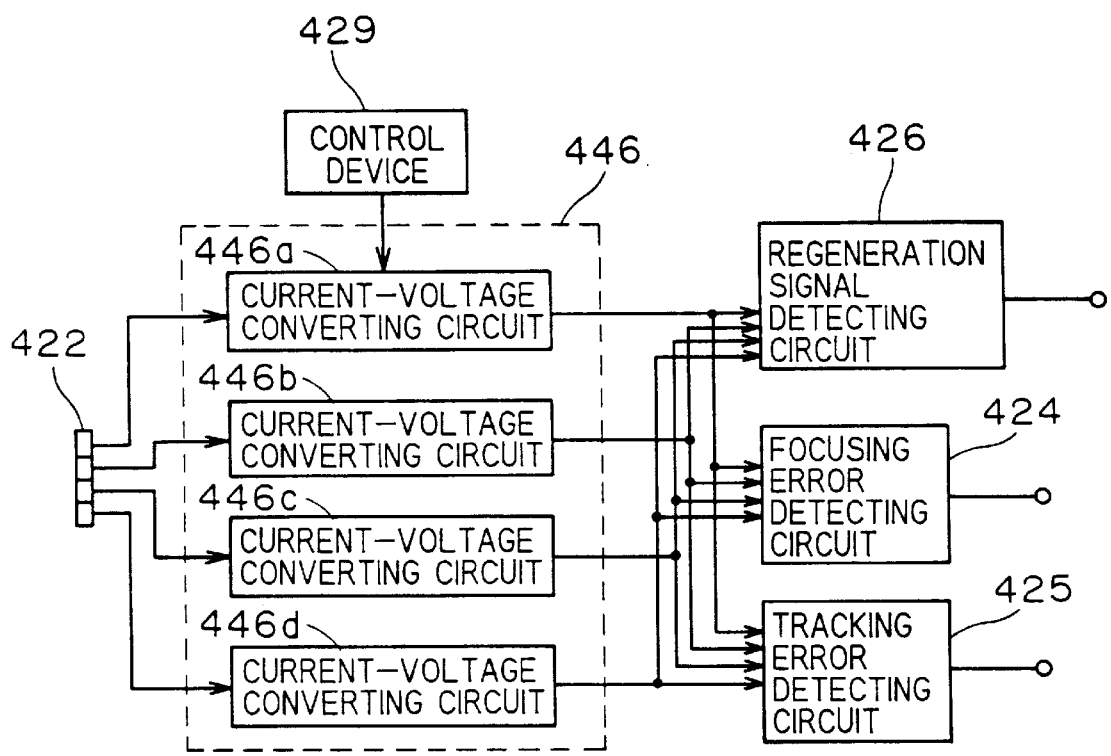
FIG. 55 is a block diagram showing a current-voltage converting circuit of a twenty-fourth preferred embodiment of the present invention.

FIG. 55 is a block diagram of a current-voltage converting circuit in a twenty-fourth preferred embodiment of the present invention, where the same characters are allotted to the same structures as those in FIG. 45 and overlapping description in not made here. In this preferred embodiment, the current-voltage converting circuit 46 connected to the photodetector 422 is formed of four current-voltage converting circuits 446a–446d with variable load resistances. Although a description is made here with four current-voltage converting circuits, it is a matter of course that the number of current-voltage converting circuits depends on the number of light receiving surfaces of the photodetector. Signal from the control device 429 is connected to the current-voltage converting circuits 446a–446d, respectively.

<24-2. Device Operation>

In the twenty-third preferred embodiment, the amplification degrees of the focusing error detecting circuit 424, the tracking error detecting circuit 425 and the regeneration signal detecting circuit 426 are switched when the objective lenses are switched for different kinds of optical information recording media, but load resistance values of the current-voltage converting circuits 446a–446d are switched in the twenty-fourth preferred embodiment, where when the optical information recording medium is installed, the disk distinguishing circuit 427 distinguishes a kind of the optical information recording medium, the control device 429 transfers instructions for the most suitable load resistance values to the current-voltage converting circuits 446a–446d, and respective circuits output signals on the basis of the load resistance values. Hence, according to the twenty-fourth preferred embodiment, signals with stable quality are obtained with different kinds of optical information recording media.

25. Twenty-fifth Preferred Embodiment

While the optical output is changed or a change is made in the electric circuit system when an objective lens is changed for an optical information recording medium of a different kind so that the amplitude of detected signal becomes constant, for example, in the twenty-second to twenty-fourth preferred embodiments described above, it is changed so that the sensitivity of detected signal becomes constant in the twenty-fifth preferred embodiment.

Figure 56A:
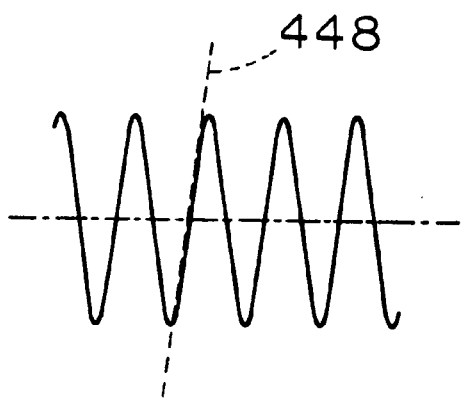
FIG. 56(A), FIG. 56(B) and FIG. 56(C) are tracking error signal diagrams obtained when regeneration is applied to different optical information recording media in a twenty-fifth preferred embodiment of the present invention.
Figure 56B:
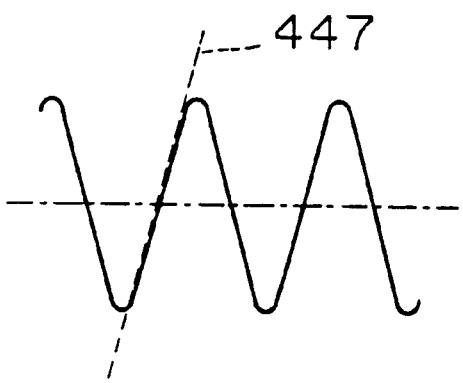

FIG. 56 is a tracking error signal diagram obtained when optical information recording media of different kinds are regenerated in the twenty-fifth preferred embodiment, where FIG. 56(A) is a tracking error signal diagram obtained when a first optical information recording medium is regenerated and FIG. 56(B) is a tracking error signal diagram when a second optical information recording medium with a track pitch larger than that of the first optical information recording medium is regenerated with the amplitude being the same as that of the first optical information recording medium. In FIG. 56(B), though the amplitude is the same as that of the first optical information recording medium, the inclination of the signal, i.e., the sensitivity line 447 is not the same as the sensitivity line 448 of the first optical information recording medium since the track pitch is larger.

Figure 56C:
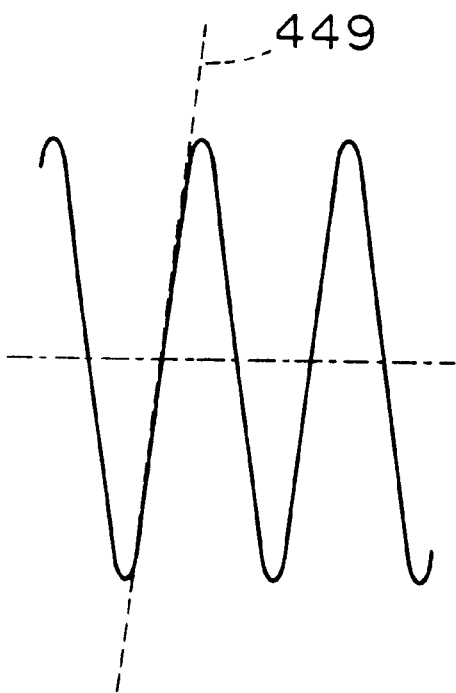

In FIG. 56(C), the optical output or the electric circuit system is switched so that the sensitivity line 449 of the signal of the second optical information recording medium becomes equal to the sensitivity line 448 of the first optical information recording medium, where the amplitude is larger than that in FIG. 56(A). As the sensitivity, rather than the amplitude, affects the control accuracy in follow-up of tracking, switching can be made so that the sensitivity is constant to keep the control accuracy constant. This is the same as to the focusing error signal.

26. Twenty-sixth Preferred Embodiment
<26-1. Device Structure>

Figure 57:
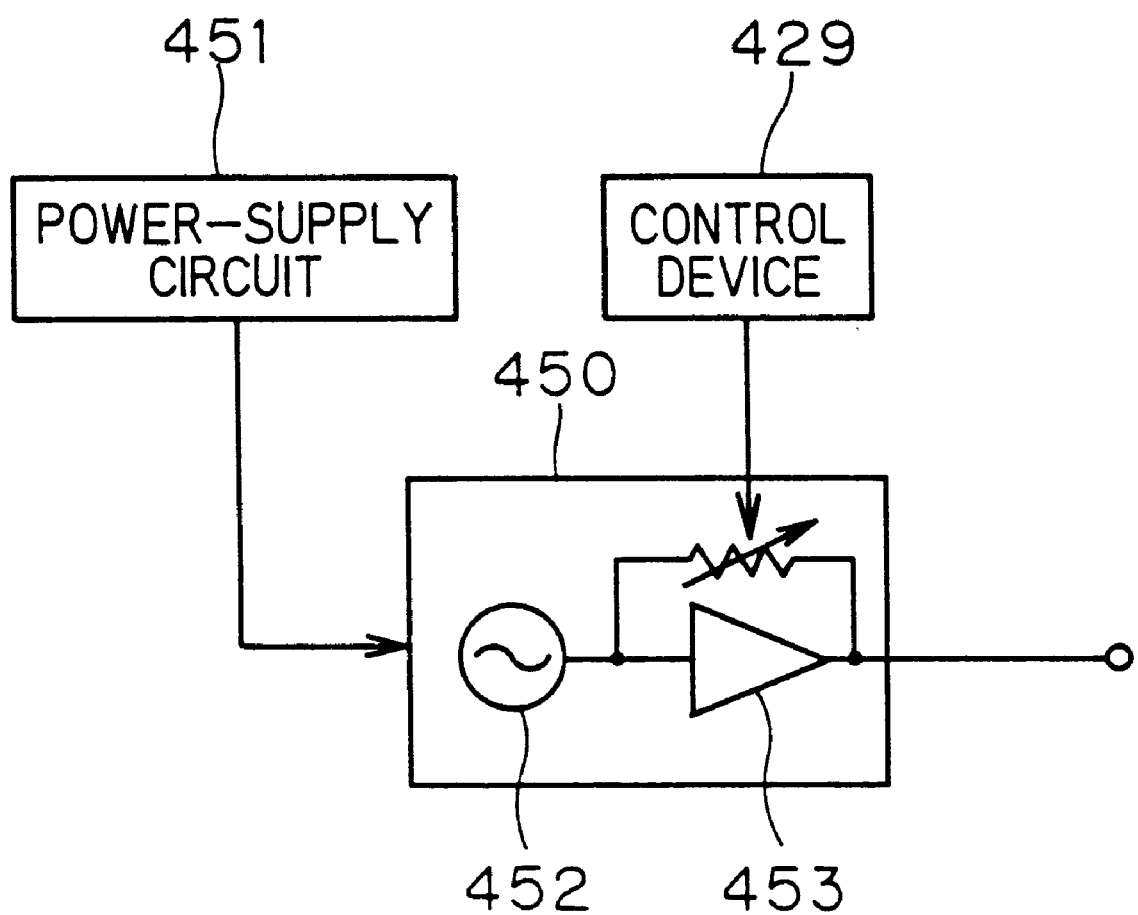
FIG. 57 is a block diagram showing the structure of a high frequency superpose circuit in a twenty-sixth preferred embodiment of the present invention.

FIG. 57 is a block diagram showing the structure of a high frequency superpose circuit in a twenty-sixth preferred embodiment of the present invention. In the figure, 450 denotes a high frequency superpose circuit, 451 denotes a power supply circuit for supplying a constant power-supply voltage to the high frequency superpose circuit 450, 452 denotes an oscillating stage, and 453 denotes an amplifying stage, where the control signal from the control device 429 is inputted to the amplifying stage 453, and which amplifying stage 453 is constructed so that the amplification degree can be changed on the basis of external control signal.

<26-2. Device Operation>

In this twenty-sixth preferred embodiment, when the optical information recording medium 420 is installed, the disk distinguishing circuit 427 distinguishes a kind of the optical information recording medium, the control device 429 transfers instructions for the most suitable amplification degree to the amplifying stage 453, and high frequency current is applied to the semiconductor laser 411 from the high frequency superpose circuit 450 on the basis of the amplification degree. Thus, the high frequency superpose is switched at the same time as the switch of the optical output, providing stable suppression of noise.

27. Twenty-seventh Preferred Embodiment

While switch of the optical output of the semiconductor laser 411, or switch of the amplification degree or the load resistance of the electric circuit system is independently made simultaneously with switch of an objective lens for an optical information recording medium of a different kind in the twenty-second through twenty-sixth preferred embodiments described above, they may be achieved in combination at the same time, or switch of amplification degree or load resistance may be achieved differently for each circuit.

Figure 58:
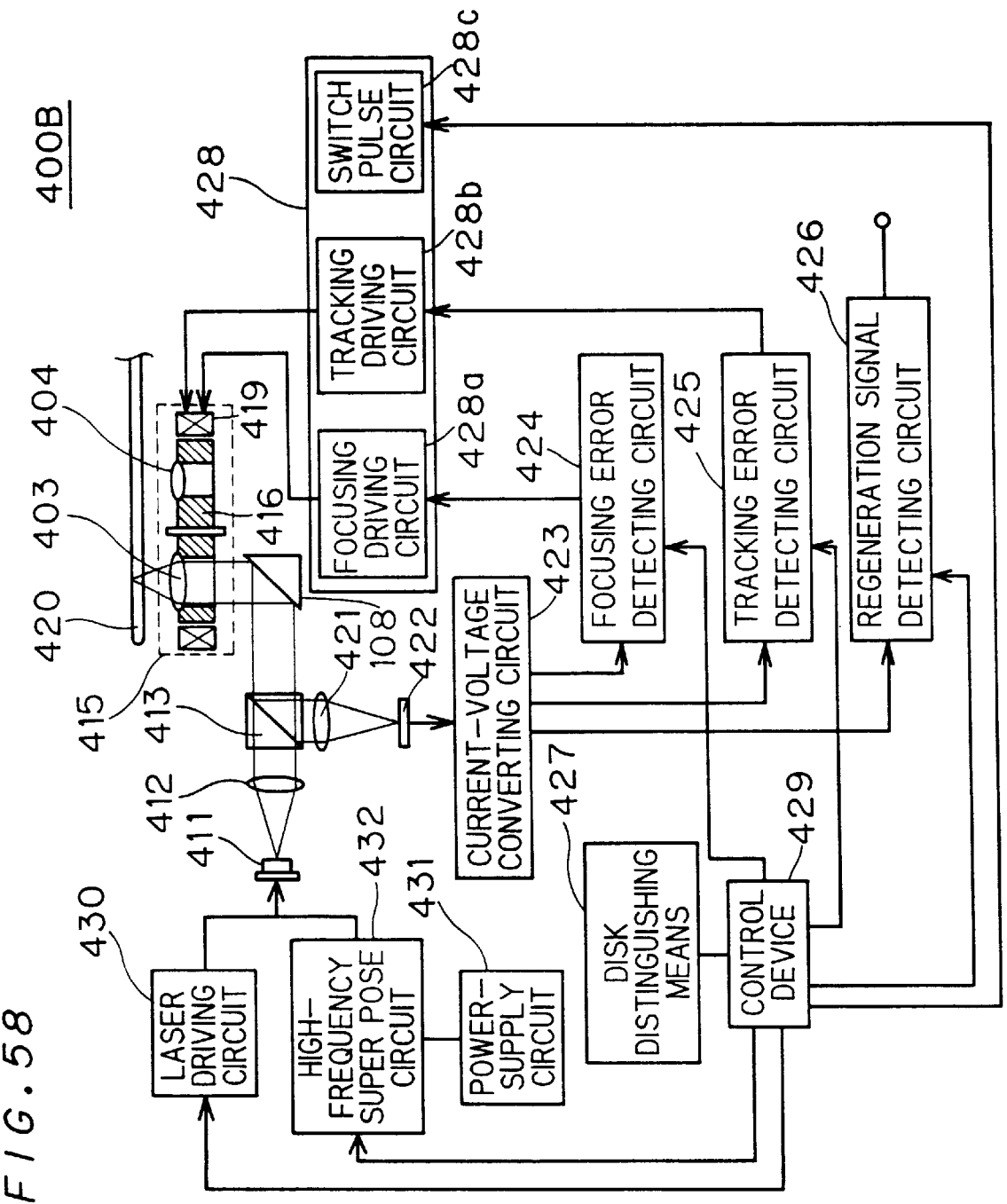
FIG. 58 is a diagram showing an optical system and a block circuit of an optical information recording/regenerating device in a twenty-seventh preferred embodiment of the present invention.

FIG. 58 shows the structure of an optical system and an electric system of an optical information recording/regenerating device 400B. The same reference characters are allotted to the same structures as those in the optical information recording/regenerating device 400 described referring to FIG. 45 and the optical information recordinglregenerating device 400A described referring to FIG. 54, and overlapping description is not repeated here.

While the amounts of switching the optical output or in the electric circuit system with switching of the objective lens for a different optical information recording medium are previously set with the kind of the optical information recording medium and the aperture diameter of the objective lens in the twenty-second through twenty-sixth preferred embodiments, signal may be actually detected to make correction as needed for the most suitable signal amplitude or signal sensitivity on the basis of the signal characteristics. This enables to absorb affections on the signal characteristics caused by fine variation of reflectance of surfaces of optical information recording media, even of optical information recording media of the same kinds.

Although the twenty-second through twenty-sixth preferred embodiments have shown examples in which two objective lenses are switched to each other, it is needless to say that three or more objective lenses may be switched to each other in the same way with switch of the optical output or in the electric circuit system.

28. Twenty-eighth Preferred Embodiment
<28-1. Device Structure>

FIG. 59 is a diagram showing the structure of an optical system and an electric circuit of an optical information recording/regenerating device 500 in a twenty-eighth preferred embodiment of the present invention. The same characters are allotted to the same structures as those in the optical information recording/regenerating device 400 according to the present invention described referring to FIG. 45, and overlapping description is not repeated here.

In FIG. 59, a diffraction grating 510 is provided between a collimator lens 411 and a beam splitter 413 and an objective lens driving device 515 is provided in the direction of reflection of the mirror 108. The lens holder 6 of the objective lens deriving device 515 is equipped with objective lenses 503 and 504.

A lens 421 and a photodetector 522 are provided in order in the direction of reflection of the beam splitter 413 seen from the optical information recording medium 420.

Here, as the objective lens driving device 515, the objective lens driving device 400 shown in FIG. 1 is used, for example. Accordingly, though overlapping description is not repeated here, the objective lenses 3 and 4 in FIG. 1 serve as the objective lenses 503 and 504 and the tracking magnets 107a and 107b and the tracking coils 121a and 121b are generically referred to as the driving mechanism 419.

<28-2. Device Operation>

Figure 60A:
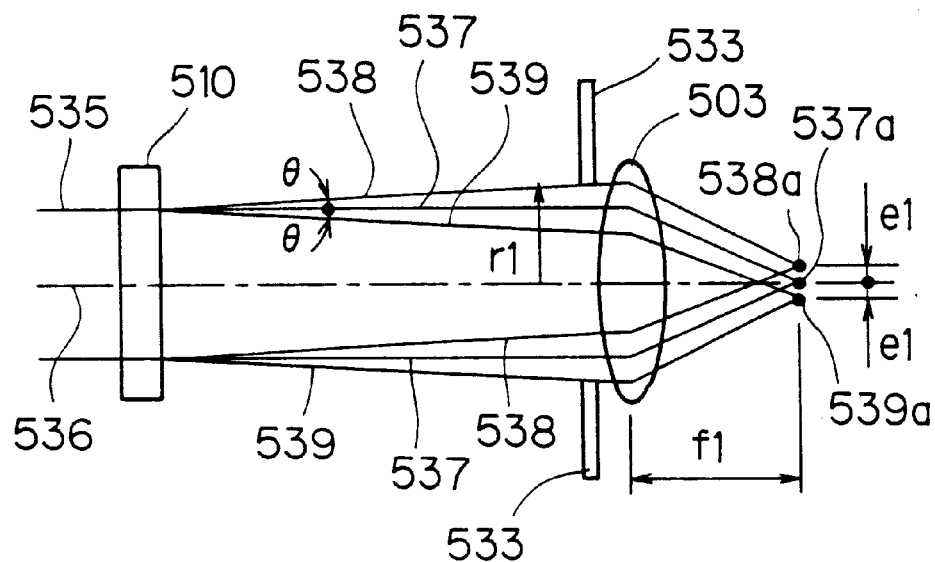
FIG. 60($a$) and FIG. 60($b$) are plan views showing an important part of the optical system emitting a laser beam in the twenty-eighth preferred embodiment of the present invention.
Figure 60B:
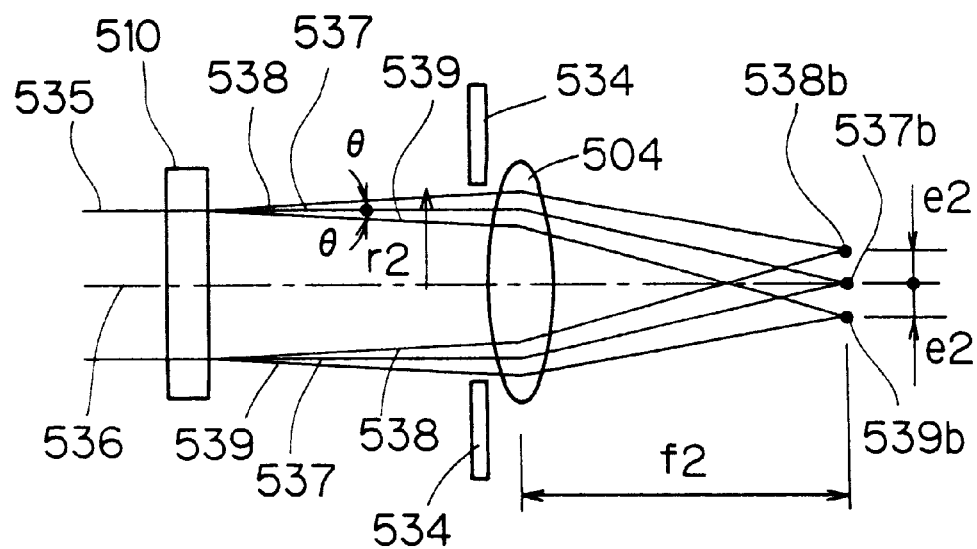

The same operations as those of the optical information recording/regenerating device 400 are not described here. Next, referring to FIG. 60, the relation between the optical characteristics of the objective lenses and condensed light spots will be described. FIG. 60 shows an important part of the optical system for applying laser beam to the optical information recording medium 420, which particularly shows the diffraction grating 510, the objective lens 503 and the objective lens 504. FIG. 60(a) shows the case of the objective lens 503 and FIG. 60(b) shows the case of the objective lens 504. The reference character 533 is a diaphragm provided on the incident side of the objective lens 503, which is a circular aperture with radius r1, for example. Similarly, 534 is a diaphragm provided on the incident side of the objective lens 504, which is a circular aperture with radius r2. The focal lengths of the objective lenses 503 and the objective lens 504 are f1 and f2, respectively, and it is assumed here that f1<f2. The reference character 535 denotes a laser beam coming out of the collimator lens 412. The laser beam 535 enters the diffraction grating 510 to be divided into the zero-order beam 537 not subject to the diffraction effect, the positive first-order beam 538 which is diffracted by +θ with respect to the optical axis 536, and the negative first-order beam 539 which is diffracted by −θ with respect to the optical axis 536.

In FIG. 60(a), the laser beam 537 parallel to the optical axis 536 is subject to the condensing effect of the objective lens 503 and forms a condensed light spot 537a on the optical axis 536. The laser beams 538 and 539 inclined by θ with respect to the optical axis 536 respectively form the condensed light spots 538a and 539a at positions displaced by e1 from the optical axis 536 due to the light condensing effect of the objective lens 503. This amount of displacement e1 is given by f1·θ using the focal length f1 of the objective lens 503. (· indicates multiplication) Similarly, in FIG. 60(b), the laser beam 535 forms the condensed light spot 537b on the optical axis 536.

The laser beams 538 and 539 inclined by θ with respect to the optical axis 536 respectively form condensed light spots 538b and 539b at positions displaced by e2 from the optical axis 536 by the light condensing effect of the objective lens 504. The displacement amount 2e is given by f2·θ using the focal length f2 of the objective lens 504. As the relation f1<f2 about the focal length exists as mentioned above, the relation e1<e2 holds about the displacement amount from the optical axis 536. These displacement amounts correspond to the intervals of the condensed light spots. The effective aperture diameter of the objective lens 503 is defined by the diaphragm 533 with the circular aperture with the radius r1, and the numerical aperture NA1 of the objective lens 503 defined by the aperture radius for the focal length is r1/f1. Similarly, the effective aperture diameter of the objective lens 504 is defined by the diaphragm 534 of the circular aperture with the radius r2, and the numerical aperture NA2 of the objective lens 504 is r2/f2. Generally, as a numerical aperture of a lens is larger, a smaller spot diameter can be formed. In FIG. 60, if r1 and r2 are similar, then NA1>NA2 from the relation of f1<f2. Accordingly, the objective lens 503 can form a smaller condensed light spot than the objective lens 504, thus obtaining a smaller spot interval.

Figure 61A:
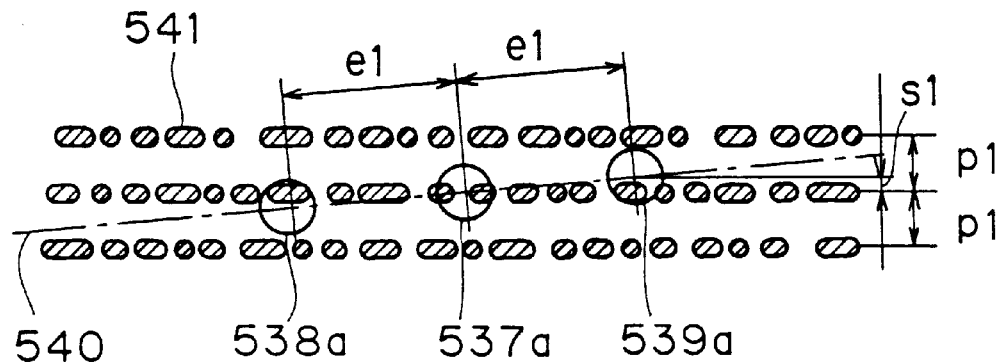
FIG. 61($a$) and FIG. 61($b$) are plan views showing the relation between the optical information recording media and condensed light spots in the twenty-eighth preferred embodiment of the present invention.
Figure 61B:
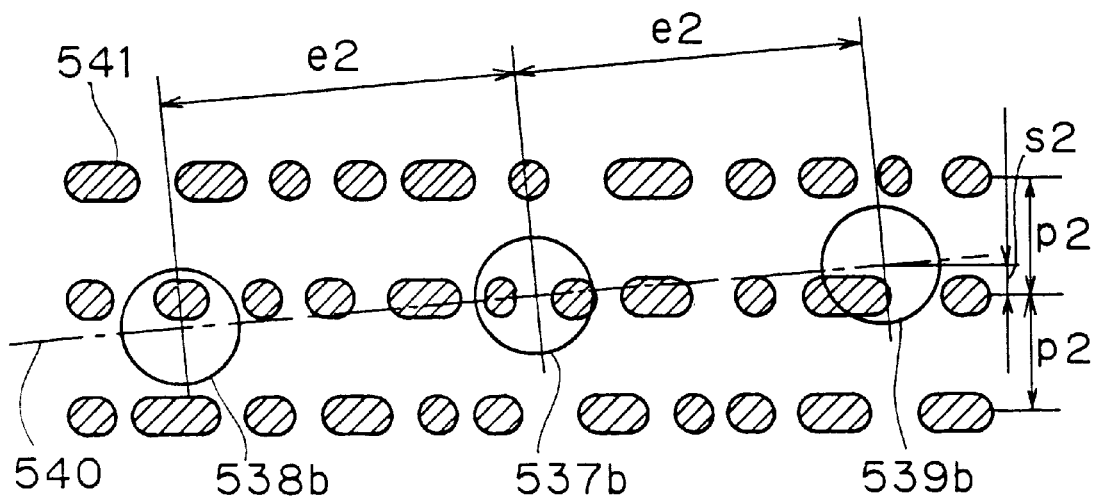
Figure 62:
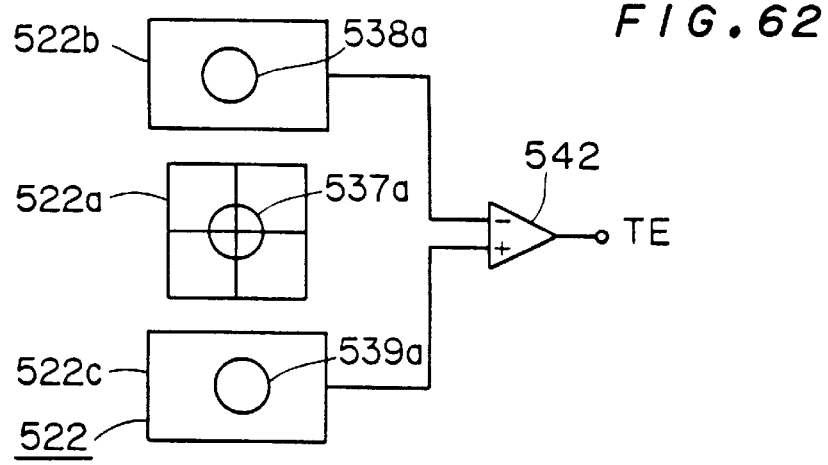
FIG. 62 is a plan view showing a light receiving surface configuration of the photodetector and a tracking error signal detection circuit connection diagram in the twenty-eighth preferred embodiment of the present invention.

Next, the method of detecting the tracking error will be specifically described using FIG. 61 and FIG. 62. FIG. 61 is a plan view showing the relation between the optical information recording medium and condensed light spots. FIG. 61(a) shows the case where the objective lens 503 is selected and information is regenerated with a high density optical information recording medium with small track pitch p1. FIG. 61(b) shows the case where the objective lens 504 is selected and information is regenerated with an optical information recording medium having track pitch p2 larger than p1. In FIG. 61(a), the condensed light spot line 540 connecting the three condensed light spots 537a–539a is only slightly inclined with respect to the line of the information pits 541, and the condensed light spot 537a with the zero-order beam 537 is disposed at the center of the information pits 541 to regenerate information. The two condensed light spots 538a and 539a with the diffracted laser beams are displaced in opposite directions with respect to the center condensed light spot 537a, and the displacement amount s1 thereof is about one fourth of the track pitch p1.

FIG. 62 is a plan view representing the shape of the light receiving surface of the photodetector 522 and a tracking error signal detecting circuit connection diagram. In the figure, 522a is a light receiving surface arranged to receive the reflected light of the condensed light spot 537a at the center, which is formed of a light receiving surface which is equally divided into four, for example. This is for the purpose of being adaptable to focusing error detection by the known astigmatism method, which is not described herein. The light receiving surfaces 522b and 522c are light receiving surfaces arranged on the opposite sides with the light receiving surface 522a interposed therebetween, which receive the reflected lights of the condensed light spots 538a and 539a, respectively. The output signals of the light receiving surfaces 522b and 522c are connected to differential input terminals of the differential amplifier 542.

FIG. 61(a) and FIG. 62 show the structure of a tracking error signal detecting method (differential push-pull method) by the known three-beam method, where the output signal TE of the differential amplifier 542 becomes a tracking error signal. In the three-beam method, it forms suitable conditions that the condensed light spots 538a and 539a on both ends are displaced from the information pit 541 line to each other by one fourth of the track pitch.

Next, when an optical information recording medium of a different kind with a track pitch larger than p1 undergoes regeneration, the objective lens 504 is selected and the condensed light spots are arranged as shown in FIG. 61(b). Here, if the tracking error detection by the three-beam method is made under the suitable conditions in the same way as shown in FIG. 61(a), the condensed light spots 538b and 539b on both ends must be displaced by about one fourth of the track pitch p2 in the opposite direction to each other with respect to the condensed light spot 537b in the center. Here, as the inclination of the condensed light spot line 540 is the same with respect to the direction in which the information pits 541 are arranged, the suitable conditions can be satisfied if the condensed light spot interval e2 is larger then e1 by the track pitch ratio p2/p1.

Since the condensed light spot interval is in proportion to the focal length of the objective lens as mentioned above, the tracking error detection by the three-beam method can be achieved under the suitable conditions by setting the focal length of the objective lens to be almost proportional to the track pitch. When the objective lens 504 is selected, the tracking error detection is made by the three-beam method with the reflected lights of the condensed light spots 538b and 539b on both ends being incident upon the light receiving surfaces 522b and 522c, respectively. Hence, it is clear from the description above that a single diffraction grating 510 for forming three beams and an optical system for tracking error detection are sufficient even in an optical information recording/regenerating device having a plurality of objective lenses.

Recording or regenerating with a small condensed light spot is essential for a high density optical information recording medium with the small track pitch p1. As the focal length f1 of the objective lens 503 is small in correspondence to the track pitch p1, its numerical aperture is apt to be large. Accordingly, the condensed light spot formed by the objective lens 503 is smaller than that by the objective lens 504, and setting the focal length of the objective lens to be almost proportional to the track pitch forms suitable conditions also from the point of view of the condensed light spot.

Figure 63A:
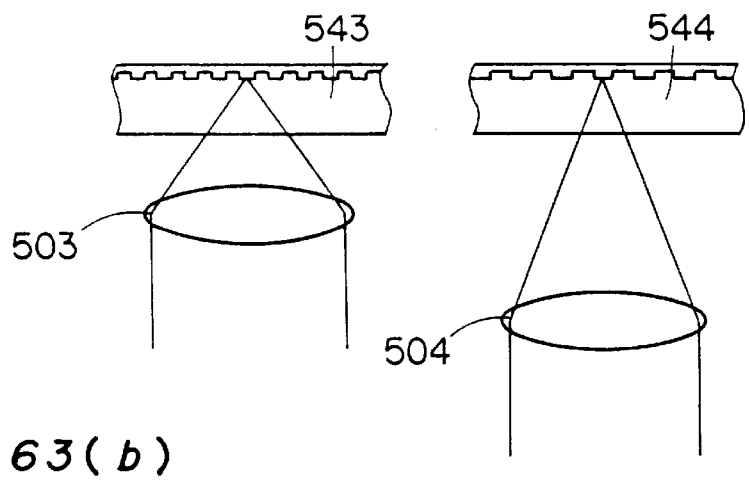
FIG. 63($a$) and FIG. 63($b$) are side views showing the relation between the optical information recording media of different kinds and the objective lenses in the twenty-eighth preferred embodiment of the present invention.

FIG. 63 is a side view showing the relation between the optical information recording media species and objective lenses, where FIG. 63(A) shows the relation between optical information recording media with the same substrate thickness and different recording densities and objective lenses. The reference character 543 is a high density optical information recording medium, to which the objective lens 503 with a small focal length is applied. The reference character 544 denotes a conventional optical information recording medium, to which the objective lens 504 with a large focal length is applied. In the case of FIG. 63(A), the two lenses are designed so that the aberration becomes the smallest for the same substrate thickness.

Figure 63B:
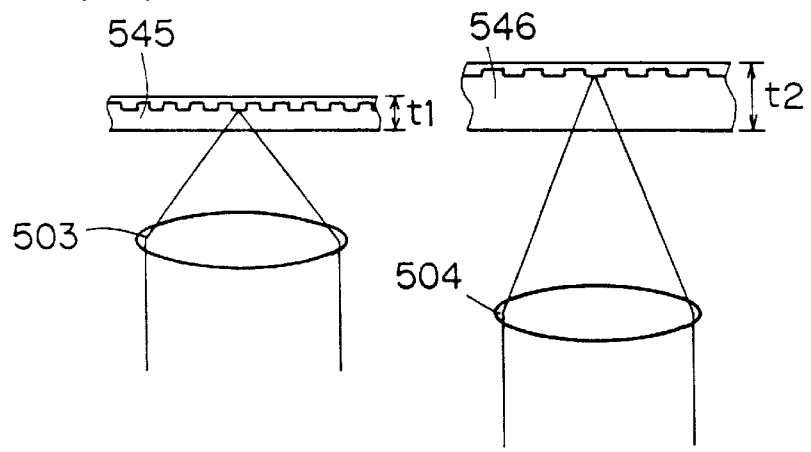

FIG. 63(B) shows the relation between optical information recording media with different substrate thicknesses and recording densities and objective lenses. The reference character 545 denotes a high density optical information recording medium with a substrate thickness t1. In this case, the objective lens 503 with a small focal length is applied, the objective lens 503 being designed so that the aberration becomes the smallest for the substrate thickness t1. The reference character 546 shows a conventional optical information recording medium with a substrate thickness t2. In this case, the objective lens 504 with a larger focal length is applied, the objective lens 504 being designed so that the aberration becomes the smallest for the substrate thickness t2. As described above, by providing objective lenses which satisfy optical characteristics required for applied optical information recording media and switching the lenses, recording and regenerating can be made with optical information recording media of different kinds.

29. Twenty-ninth Preferred Embodiment

<29-1. Device Structure>

Figure 64:
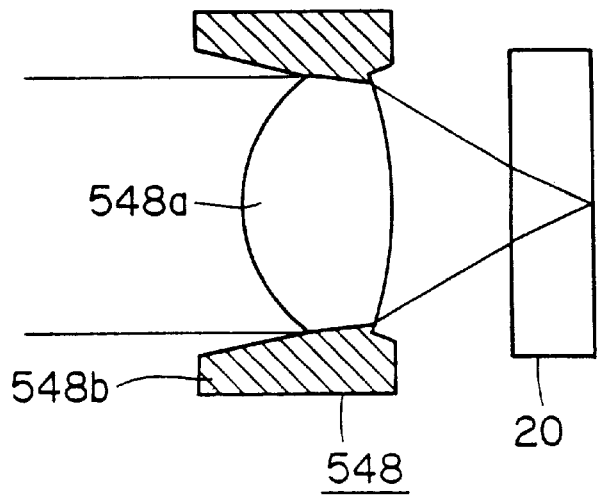
FIG. 64 is a sectional view showing an objective lens in an optical information recording/regenerating device in a twenty-ninth preferred embodiment of the present invention.

FIG. 64 is a sectional view showing an objective lens of an optical information recording/regenerating device in a twenty-ninth preferred embodiment of the present invention. The reference character 548 denotes an objective lens, which includes an integrally formed lens portion 548a and mirror frame portion 548b (the shadowed part).

<29-2. Device Operation>

The mirror frame portion 548b has a function as a diaphragm for limiting the aperture of the lens portion 548a, so that it is not necessary to provide the diaphragm 533 or 534 shown in FIG. 34 when the objective lens 548 is of a predetermined numerical aperture.

It is a matter of course that an objective lens with a diaphragm and an objective lens having no diaphragm may be mixed in a plurality of objective lenses in a single optical information recording/regenerating device.

30. Thirties Preferred Embodiment

<30-1. Device Structure>

Figure 65A:
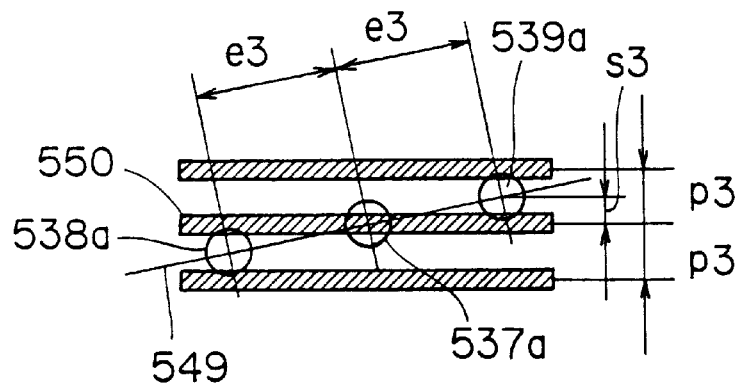
FIG. 65($a$) and FIG. 65($b$) are plan views showing the relation between optical information recording media and condensed light spots in a thirtieth preferred embodiment of the present invention.
Figure 65B:
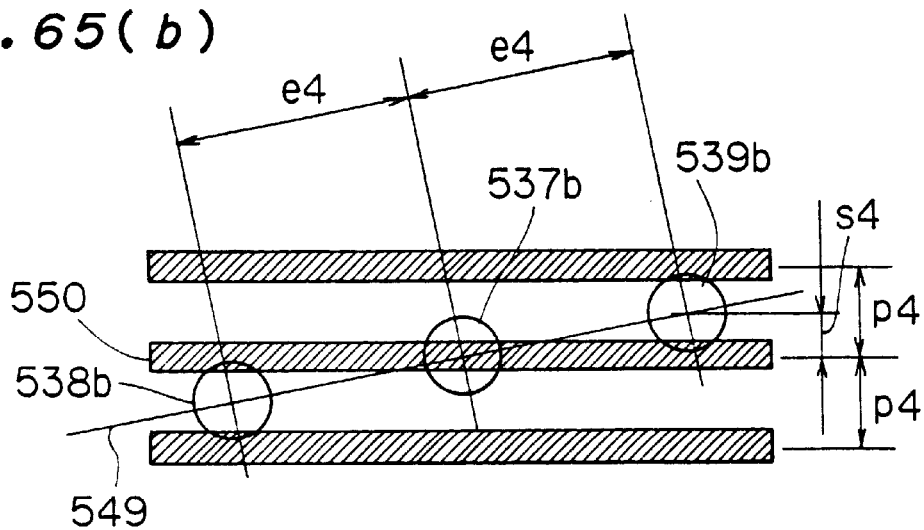

Next, a thirtieth preferred embodiment of the present invention will be described referring to FIG. 65 and FIG. 66. FIG. 65 is a plan view showing the relation between an optical information recording medium and condensed light spots. FIG. 65(a) shows recording or regeneration of information with a high density optical information recording medium having small track pitch p3 with the objective lens 503 being selected. FIG. 65(b) shows recording and regeneration of information with an optical information recording medium having larger track pitch p4 than p3 with the objective lens 504 being selected.

<30-2. Device Operation>

In FIG. 65(a), the condensed light spot line 549 connecting the three condensed light spots 537a–539a is slightly inclined with respect to the guide groove 550, and the condensed light spot 537a by the zero-order beam 37 is disposed at the center of the guide groove 550 to record or regenerate signals. The two condensed light spots 538a and 539a by diffracted laser beams are displaced in opposite directions to each other with respect to the condensed light spot 537a at the center, and the displacement amount s3 is about a half of the track pitch p3.

Figure 66:
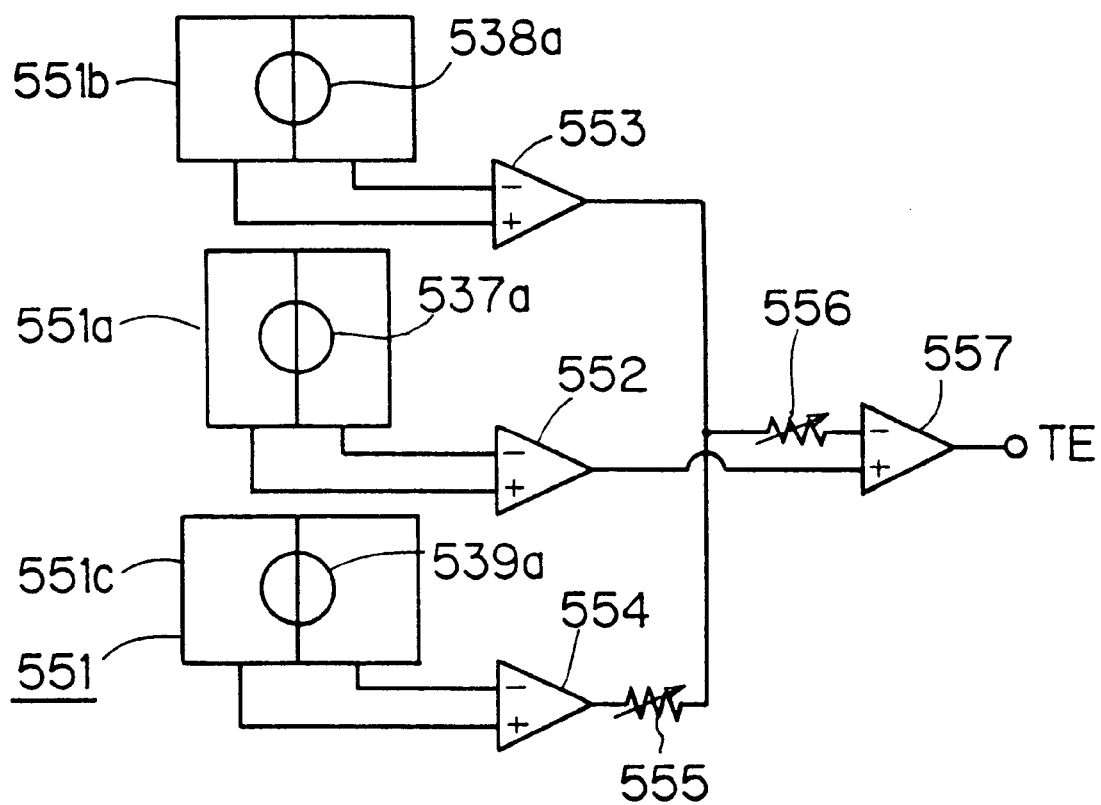
FIG. 66 is a plan view showing a light receiving surface configuration of the photodetector and a tracking error signal detecting circuit connection diagram.
Figure 67:
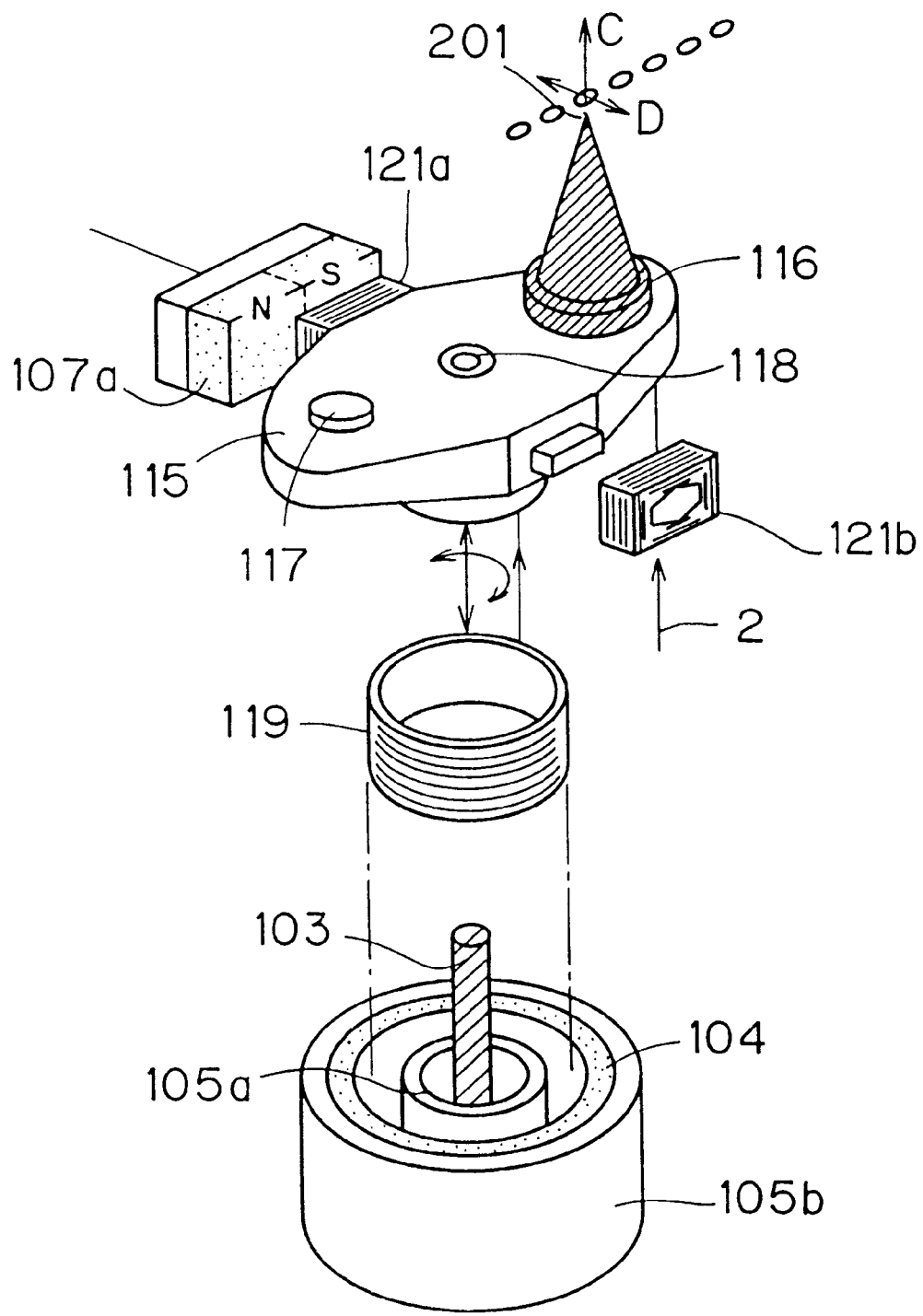
FIG. 67 is a perspective view of a conventional objective lens driving device.

FIG. 66 is a plan view showing the configuration of the light receiving surface of the photodetector 551 corresponding to the photodetector 522 of FIG. 62 and a tracking error signal detecting circuit connection diagram. The reference character 551a denotes a light receiving surface divided into two in the direction along the guide groove, for example, which is arranged to receive the reflected light of the condensed light spot 537a at the center around the dividing line of the light receiving surface. The light receiving surfaces 551b and 551c are arranged on opposite sides with the light receiving surface 551a interposed therebetween, which are also divided into two in the direction along the guide groove and arranged to receive the reflected lights of the condensed light spots 538a and 538a around the dividing lines of the light receiving surfaces, respectively. The output signals of the two-divided light receiving surfaces 551a–551c are respectively inputted to differential input terminals of the differential amplifiers 552–554. The output signals from the light receiving surfaces on the same side with respect to the dividing line of the respectively two-divided light receiving surfaces 551a–551c are inputted to the same polarity side of the differential amplifiers 552–554. The output signal of the differential amplifier 554 is connected to the variable amplifier 555. The output signal of the differential amplifier 553 and the output signal of the variable amplifier 555 are synthesized and connected to the variable amplifier 556. The output signal from the variable amplifier 556 is connected to the differential input terminal of the differential amplifier 557.

The method of detecting the tracking error described above is called a differential push-pull method, and the principle of the signal detection is shown in Japanese Patent Laying-Open No. 61-94246, so its description is not further made herein. The output signal TE of the differential amplifier 557 becomes a tracking error signal. In the differential push-pull method, it forms suitable conditions that the condensed light spots 538a and 539a on both ends are displaced with each other from the guide groove 550 by a half with respect to the track pitch.

Next, when information is recorded or regenerated with an optical information recording medium of a different kind with a guide groove larger than p1, the objective lens 504 is selected and condensed light spots are arranged as shown in FIG. 65(b). Here, if the tracking error detection by the differential push-pull method is to be made under the suitable conditions the same as FIG. 65(a), the condensed light spots 538b and 539b on both ends must be displaced by about a half of the track pitch p2 in the opposite directions to each other with respect to the condensed light spot 537b at the center. Now, as the inclination of the condensed light spot line 549 with respect to the direction of the guide groove 550 is the same, the suitable conditions can be satisfied if the condensed light spot interval e2 is larger than e1 by the track pitch ratio p2/p1. Similarly to the twenty-eighth preferred embodiment, since the condensed light spot interval is in proportion to the focal length of the objective lens as described above, the tracking error detection by the differential push-pull method can be made under suitable conditions by setting the focal length of the objective lens to be almost proportional to the track pitch.

When the objective lens 504 is selected, the tracking error detection by the differential push-pull method is made with the reflected light of the condensed light spot 537b at the center being incident upon the light receiving surface 551a and the reflected lights of the condensed light spots 538b and 539b on both ends being respectively incident upon the light receiving surfaces 551b and 551c.

Similarly to the twenty-eighth preferred embodiment, it forms suitable conditions to set the focal length of the objective lens to be almost in proportion to the track pitch also from the point of view of the size of the condensed light spot given by the numerical aperture.

Although the above description has shown cases of switching two objective lenses, it is a matter of course that three or more objective lenses may be provided.

While the invention has been described in detail, the foregoing description is in all aspects illustrative and not restrictive. It is understood that numerous other modifications and variations can be devised without departing from the scope of the invention.

We claim:

1. An objective lens driving device, comprising:

a lens holder pivotable around and movable along an axis line;

a plurality of objective lenses provided on said lens holder in positions eccentrically displaced by almost equal distances from said axis line;

driving means for driving a light spot on an optical information recording medium in a focus direction and a direction across a track by moving and turning said lens holder along and around said axis line, said objective lenses being substantially symmetrically disposed about a center line perpendicular to the axis at predetermined arrangement angles thereto;

a fixing base for holding said lens holder; and means for outputting a distinguishment signal corresponding to the kind of said optical information recording medium to be illuminated by the light spot, said driving means including, a plurality of coils equal in number to the number of the plurality of objective lenses provided on one of said lens holder and said fixing base; and a plurality of magnets greater in number than the number of objective lenses, fixed to predetermined positions on the other of said lens holder and said fixing base at arrangement angles substantially equal to the arrangement angles of the objective lenses, each of said magnets being bi-polar magnetized with two poles arranged in the direction of pivoting of said lens holder around said axis line, when one of said plurality of objective lenses is selected according to said distinguishment signal, said driving means driving at least one of said coils to drive the coil in the desired direction by interaction with both of said two magnet poles to move a desired objective lens into a luminous flux of a light beam to form a predetermined light spot corresponding to the kind of said optical information recording medium to be illuminated by the light spot.

2. The objective lens driving device of claim 1, wherein said plurality of coils are provided on said lens holder and plurality of magnets are provided on said fixing base.

3. The objective lens driving device of claim 2, wherein said plurality of coils are connected to power supplying means for supplying electric power, and said power supplying means being arranged substantially symmetrically about said axis line of said lens holder.

4. The objective lens driving device of claim 2, further comprising means for detecting a turned position of said lens holder.

5. The objective lens driving device of claim 2, wherein said lens holder has steps each of which is used to mount each of said plurality of objective lenses.

6. The objective lens driving device of claim 2, wherein said plurality of magnets are individually provided on said fixing base almost equal distances away from said axis line, said plurality of coils being disposed on sides of said lens holder to face one of the two poles of at least some of said plurality of magnets when said coils are not energized said lens holder turning and said plurality of objective lenses moving through interaction of magnetic force produced by said plurality of coils when energized with magnetic force produced by said plurality of magnets.

7. The objective lens driving device of claim 2, wherein said plurality of magnets individually provided on said fixing base almost equal distances away from said axis line, at least one pair of coils out of said plurality of coils are disposed on sides of said lens holder so as to face said plurality of magnets when not energized and at least another one pair of coils are disposed on sides of said lens holder at an angle almost equal to that which centers said axis line with respect to said plurality of objective lenses, said driving means further has a plurality of magnetic materials disposed inside said plurality of coils to aid in centering a said coil with respect to an associated magnet pole.

8. The objective lens driving device of claim 2, wherein the operation of moving said light spot in said direction across said track and the operation of selecting and moving into the luminous flux one of said plurality of objective lenses are made by using said driving means partially in common.

9. The objective lens driving device of claim 2, wherein said plurality of objective lenses individually have different numerical apertures, and one of said plurality of objective lenses that has the smallest numerical aperture is located closest to the center of rotation of said optical information recording medium.

10. The objective lens driving device of claim 2, wherein said plurality of objective lenses individually have different working distances, and one of said plurality of objective lenses that has the largest working distance is located closest to the rotation center of said optical information recording medium.

11. The objective lens driving device of claim 2, wherein said fixing base has a first fixing base serving as a base; and a second fixing base for holding said lens holder, and wherein said first fixing base has a partial spherical portion on a lower surface side and a cavity on an upper surface side corresponding to said partial spherical portion, and said second fixing base is fixed to said cavity of said first fixing base.

12. The objective lens driving device of claim 2, wherein said fixing base has a partial spherical portion on a lower surface side, and said partial spherical portion has its center in the vicinity of an intersection of a plane parallel to said optical information recording medium including a principal point of said objective lens and said axis line.

13. The objective lens driving device of claim 2, wherein said fixing base has a spherical portion whose center is located in the vicinity of an intersection of a plane parallel to said optical information recording medium including a principal point of said objective lens and said axis line;

a hole into which a supporting shaft serving as said axis line can be inserted;

a cylindrical portion formed almost coaxial with said hole; and a plurality of side walls.

14. The objective lens driving device of claim 2, wherein said lens holder has an engaging portion for positioning arrangement of said plurality of objective lenses and fixing said plurality of objective lenses by engagement.

15. The objective lens driving device of claim 2, wherein said plurality of objective lenses are arranged in positions almost symmetrical about said axis line on said lens holder.

16. An optical information processing device, comprising:

an objective lens driving device including, a lens holder turnable around and movable along an axis line, a plurality of objective lenses provided on said lens holder in positions eccentrically displaced by almost equal distances from said axis line, driving means for driving a light spot on an optical information recording medium in a focus direction and a direction across a track by moving and turning said lens holder along and around said axis line, a fixing base for holding said lens holder; and means for outputting a distinguishment signal corresponding to the kind of said optical information recording medium, said driving means having, a plurality of coils equal to the number of the plurality of objective lenses provided on one of said lens holder and said fixing base; and a plurality of magnets fixed to predetermined positions on the other of said lens holder and said fixing base, each of said magnets being bi-polar magnetized with two poles arranged in the direction of pivoting of said lens holder around said axis line, said objective lens driving device selecting one of said plurality of objective lenses according to said distinguishment signal, said driving means driving at least one of said coils to cause the coil to be driven in the desired direction by interaction with both of said two magnet poles to move said selected one of said plurality of objective lenses into a luminous flux of a light beam to form a predetermined light spot corresponding to the kind of said optical information recording medium, said optical information processing device further comprising
- a light source serving as a source of said light spot;
- a first optical element for dividing a light beam emitted from said light source into a plurality of divided light beams at a predetermined ratio;
- a second optical element for reflecting the divided light beams at a predetermined angle to change the light beam paths, while partially transmitting a light beam reflected from said optical information recording medium;
- a third optical element for aligning said plurality of divided light beams reflected by said second optical element to render the reflected beams substantially parallel;
- a fourth optical element for almost totally reflecting said plurality of divided light beams made parallel by said third optical element, said fourth optical element directing said divided light beams at a predetermined angle to enter through the selected said objective lens to reflect from said optical information recording medium and be returned through said objective lens as a reflected information modulator beam, said fourth optical element substantially totally reflecting said reflected information modulator beam to direct it to said second element; and
- a light receiving element for receiving said reflected light beam after passing through said second optical element.

17. The optical information processing device of claim 16, wherein said plurality of coils are provided on said lens holder and said plurality of magnets are greater in number than the number of objective lenses and are provided on said fixing base.

18. The optical information processing device of claim 17, further comprising:
- a current voltage converting circuit;
- a focusing error generating circuit;
- a tracking error generating circuit;
- a regeneration signal detecting circuit;
- a circuit for generating a pulse current when said selected one of said plurality of objective lenses corresponding to said distinguishment signal is not disposed in an optical path; and
- a driving device driving circuit for driving said objective lens driving device.

19. The optical information processing device of claim 18, wherein said light source is a laser light source, said optical information recording/regenerating device further comprising:
- high frequency current driving means for controlling a noise of said laser light source;
- a driving circuit for driving said high frequency current driving means; and
- means for switching light intensity of a laser beam emitted from said laser light source correspondingly to said selected one of said plurality of objective lenses.

20. The optical information processing device of claim 18, further comprising:

signal detecting means for detecting an information signal and an error signal out of an output signal of a photodetector; and means for switching an amplification degree of said signal detecting means correspondingly to said selected one of said plurality of objective lenses.

21. The optical information processing device of claim 20, further comprising:

means for switching light intensity of a laser beam emitted from said laser light source correspondingly to said selected one of said plurality of objective lenses.

22. The optical information processing device of claim 20, wherein said plurality of objective lenses individually have different aperture diameters or numerical apertures.

23. The optical information processing device of claim 20, wherein said signal detecting means includes means for correcting said amplification degree of said signal detecting means on the basis of the kind of said information recording medium and magnitude of said laser beam which is reflected.

24. The optical information processing device of claim 17, wherein said light source is a laser light source, said first optical element divides a laser beam emitted from said laser light source into at least into three laser beams, said first optical element directing said three laser beams to said selected one of said plurality of objective lenses to be condensed and supplied to said optical information recording medium as three condensed light spots and further inclines said laser beam by a predetermined angle so that a pitch of information track of said optical information recording medium and a spot interval of said three condensed light spots formed by said selected one of said plurality of objective lenses are in proportion to each other.

25. The optical information processing device of claim 24, wherein said plurality of objective lenses individually have different focal lengths.

26. The optical information processing device of claim 24, wherein said plurality of objective lenses individually have different working distances.

27. The optical information processing device of claim 24, wherein said pitch of information track of said optical information recording medium and a focal length of said selected one of said plurality of objective lenses are in proportion to each other.

* * * * *